(12) United States Patent
Zheng et al.

(10) Patent No.: US 11,367,539 B2
(45) Date of Patent: Jun. 21, 2022

(54) METHODS OF MANIPULATING PARTICLES ON SOLID SUBSTRATES VIA OPTOTHERMALLY-GATED PHOTON NUDGING

(71) Applicant: BOARD OF REGENTS, THE UNIVERSITY OF TEXAS SYSTEM, Austin, TX (US)

(72) Inventors: Yuebing Zheng, Austin, TX (US); Jingang Li, Austin, TX (US)

(73) Assignee: Board of Trustees, The University of Texas System, Austin, TX (US)

( * ) Notice: Subject to any disclaimer, the term of this patent is extended or adjusted under 35 U.S.C. 154(b) by 0 days.

(21) Appl. No.: 17/103,240

(22) Filed: Nov. 24, 2020

(65) Prior Publication Data

US 2021/0158988 A1 May 27, 2021

Related U.S. Application Data

(60) Provisional application No. 62/941,087, filed on Nov. 27, 2019.

(51) Int. Cl.
*G21K 1/00* (2006.01)
*G01N 21/65* (2006.01)

(52) U.S. Cl.
CPC .......... *G21K 1/006* (2013.01); *G01N 21/658* (2013.01)

(58) Field of Classification Search
CPC .............................. B82Y 40/00; G21K 1/006
See application file for complete search history.

(56) References Cited

U.S. PATENT DOCUMENTS

| | | | | |
|---|---|---|---|---|
| 10,281,398 B2* | 5/2019 | Zheng | ................... | G01N 21/553 |
| 10,620,121 B2* | 4/2020 | Zheng | ................... | G01N 15/14 |
| 10,640,873 B2* | 5/2020 | Zheng | ................... | C23C 18/182 |
| 11,060,976 B2* | 7/2021 | Zheng | ................... | G01N 21/01 |
| 2015/0380120 A1* | 12/2015 | Wereley | ................... | G21K 1/006 |
| | | | | 250/251 |
| 2020/0264101 A1* | 8/2020 | Zheng | ................... | B32B 27/36 |
| 2021/0311397 A1* | 10/2021 | Zheng | ................... | G03F 7/2053 |

OTHER PUBLICATIONS

Alam MS et al. Nondestructive approach for additive nanomanufacturing of metallic nanostructures in the air. ACS Omega 3, 1213-1219 (2018).
Baffou G et al. Thermo-plasmonics: Using metallic nanostructures as nano-sources of heat. Laser Photonics Rev. 7, 171-187 (2013).
Bezrodna T et al. IR-study of thermotropic phase transitions in cetyltrimethylammonium bromide powder and film. J. Mol. Struct. 973, 47-55 (2010).
Casson BD et al. Phase transitions in mixed monolayers of sodium dodecyl sulfate and dodecanol at the air/water interface. J. Phys. Chem. B 102, 7434-7441 (1998).
Chini SF et al. Understanding pattern collapse in photolithography process due to capillary forces. Langmuir 26, 13707-13714 (2010).

(Continued)

*Primary Examiner* — Wyatt A Stoffa
(74) *Attorney, Agent, or Firm* — Meunier Carlin & Curfman LLC

(57) ABSTRACT

Disclosed herein are methods of manipulating particles on solid substrates via optothermally-gated photon nudging.

16 Claims, 40 Drawing Sheets

(56) References Cited

OTHER PUBLICATIONS

Danov K et al. Influence of the surface viscosity on the hydrodynamic resistance and surface diffusivity of a large brownian particle. J. Colloid. Interface Sci. 175, 36-45 (1995).
Do J et al. Two-color laser printing of individual gold nanorods. Nano Lett. 13, 4164-4168 (2013).
Fu YH et al. Directional visible light scattering by silicon nanoparticles. Nat. Commun. 4, 1527 (2013).
Gonzalez-Rubio G et al. Reshaping, fragmentation, and assembly of gold nanoparticles assisted by pulse lasers. Acc. Chem. Res. 49, 678-686 (2016).
Grier DG. A revolution in optical manipulation. Nature 424, 810-816 (2003).
Guler U et al. Colloidal plasmonic titanium nitride nanoparticles: properties and applications. Nanophotonics 4, 269-276 (2015).
Huang F et al. Actively tuned plasmons on elastomerically driven Au nanoparticle dimers. Nano Lett. 10, 1787-1792 (2010).
Jamshidi A et al. Nanopen: Dynamic, low-power, and light-actuated patterning of nanoparticles. Nano Lett. 9, 2921-2925 (2009).
Jones S et al. Photothermal heating of plasmonic nanoantennas: Influence on trapped particle dynamics and colloid distribution. ACS Photonics 5, 2878-2887 (2018).
Juan ML et al. Plasmon nano-optical tweezers. Nat. Photonics 5, 349-356 (2011).
Junno T et al. Controlled manipulation of nanoparticles with an atomic-force microscope. Appl. Phys. Lett. 66, 3627-3629 (1995).
Kim JW et al. Synthesis of nonspherical colloidal particles with anisotropic properties. J. Am. Chem. Soc. 128, 14374-14377 (2006).
Kim S et al. Atomic force microscope nanomanipulation with simultaneous visual guidance. ACS Nano 3, 2989-2994 (2009).
Knight MW et al. Aluminum for plasmonics. ACS Nano 8, 834-840 (2014).
Kralchevsky PA et al. Capillary interactions between particles bound to interfaces, liquid films and biomembranes. Adv. Colloid. Interfaces 85, 145-192 (2000).
Lepeshov S et al. Tunable resonance coupling in single si nanoparticle-monolayer WS2 structures. ACS Appl. Mater. Interfaces 10, 16690-16697 (2018).
Li J et al. Optical nanoprinting of colloidal particles and functional structures. ACS Nano, 13(4), 3783-3795 (2019), Mar. 2019.
Li J et al. Opto-thermophoretic tweezers and assembly. J. Micro Nano-Manuf. 6, 040801 (2018).
Li T et al. UV absorption-spectra of polystyrene. Polym. Bull. 25, 211-216 (1991).
Li X et al. Pd-on-NiCu nanosheets with enhanced electro-catalytic performances for methanol oxidation. J. Alloys Compd. 685, 42-49 (2016).
Lin L et al. All-optical reconfigurable chiral metal-molecules. Mater. Today 2019, 25, 10-20, May 2019.
Lin L et al. Bubble-pen lithography. Nano Lett. 16, 701-708 (2016).
Lin L et al. Optothermal manipulations of colloidal particles and living cells. Acc. Chem. Res. 51, 1465-1474 (2018).
Lin L et al. Opto-thermoelectric nanotweezers. Nat. Photonics 12, 195-201 (2018).
Lin L et al. Optothermoplasmonic nanolithography for on-demand patterning of 2D materials. Adv. Funct. Mater. 28, 1803990 (2018).
Liu J et al. Super structural raman nanosensors with integrated dual functions for ultrasensitive detection and tunable release of molecules. Chem. Mater. 30, 5256-5263 (2018).
Matijevic E. Production of monodispersed colloidal particles. Ann. Rev. Mater. Sci. 15, 483-516 (1985).
Ndukaife JC et al. Long-range and rapid transport of individual nano-objects by a hybrid electrothermoplasmonic tweezer. Nat. Nanotechnol. 2016, 11, 53-59.
Nedev et al. Optical Force Stamping Lithography. Nano Lett. 2011, 11, 5066-5070.
Ni S et al. Programmable colloidal molecules from sequential capillarity-assisted particle assembly. Sci. Adv. 2, e1501779 (2016).
Nosonovsky M. Model for solid-liquid and solid-solid friction of rough surfaces with adhesion hysteresis. J. Chem. Phys. 126, 224701 (2007).
Person S et al. Demonstration of zero optical backscattering from single nanoparticles. Nano Lett. 13, 1806-1809 (2013).
Petkov JT et al. Precise method for measuring the shear surface viscosity of surfactant monolayers. Langmuir 12, 2650-2653 (1996).
Plimpton S. Fast parallel algorithms for short-range molecular dynamics. J. Comput. Phys. 117, 1-19(1995).
Qian B et al. Harnessing thermal fluctuations for purposeful activities: The manipulation of single micro-swimmers by adaptive photon nudging. Chem. Sci. 4, 1420-1429 (2013).
Rajeeva BB et al. High-Resolution Bubble Printing of Quantum Dots. ACS Appl. Mater. Interfaces 2017, 9, 16725-16733.
Renaut C et al. Reshaping the second-order polar response of hybrid metal-dielectric nanodimers. Nano Lett. 19, 877-884 (2019), Jan. 2019.
Requicha AAG. Nanorobots, NEMS, and nanoassembly. Proc. IEEE 9, 1922-1933 (2003).
Scarabelli L et al. Monodisperse gold nano triangles: Size control, large-scale self-assembly, and performance in surface-enhanced raman scattering. ACS Nano 8, 5833-5842 (2014).
Schaefer DM et al. Fabrication of two-dimensional arrays of nanometer-size clusters with the atomic force microscope. Appl. Phys. Lett. 66, 1012-1014 (1995).
Selmke M et al. Theory for controlling individual self-propelled micro-swimmers by photon nudging I: Directed transport. Phys. Chem. Chem. Phys. 20, 10502-10520 (2018).
Shafiei F et al. A subwavelength plasmonic metamolecule exhibiting magnetic-based optical Fano resonance. Nat. Nanotechnol. 2013, 8, 95-99.
Shi J et al. Modular assembly of optical nanocircuits. Nat. Commun. 2014, 5, 3896.
Sitti M. Atomic force microscope probe based controlled pushing for nano-tribological characterization. IEEE/ASME Trans. Mechatronics 9, 343-349 (2004).
Sun H. COMPASS: An ab initio force-field optimized for condensed-phase applications overview with details on alkane and benzene compounds. J. Phys. Chem. B 102, 7338-7364 (1998).
Talapin DV et al. Prospects of colloidal nanocrystals for electronic and optoelectronic applications. Chem. Rev. 110, 389-458 (2010).
Tian YC et al. Impedance spectroscopic study on rotator and disordered phases in trimethylammonium chlorides. J. Phys. Chem. C 120, 23905-23909 (2016).
Tiguntseva EY et al. Light-emitting halide perovskite nanoantennas. Nano Lett. 18, 1185-1190 (2018).
Tiguntseva EY et al. Tunable hybrid fano resonances in halide perovskite nanoparticles. Nano Lett. 18, 5522-5529 (2018).
Urban AS et al. Laser printing single gold nanoparticles. Nano Lett. 10, 4794-4798 (2010).
Walker D et al. Capture of 2D microparticle arrays via a UV-triggered thiol-yne "click" reaction. Adv. Mater. 28, 9846-9850 (2016).
Wang YR et al. Resolving the bond angle of a plasmonic metamolecule. Optica 4, 1092-1097 (2017).
Wilson BK et al. Nanostructure-enhanced laser tweezers for efficient trapping and alignment of particles. Opt. Express 18, 16005-16013 (2010).
Wu MC. Optoelectronic tweezers. Nat. Photonics 5, 322-324 (2011).
Ye X et al. Improved size-tunable synthesis of monodisperse gold nanorods through the use of aromatic additives. ACS Nano 6, 2804-2817 (2012).
Zhao Y et al. Synthesis and optical properties of TiO2 nanoparticles. Mater. Lett. 61, 79-83 (2007).
Zhigunov DM et al. Femtosecond laser printing of single Ge and SiGe nanoparticles with electric and magnetic optical resonances. ACS Photonics 5, 977-983 (2018).

* cited by examiner

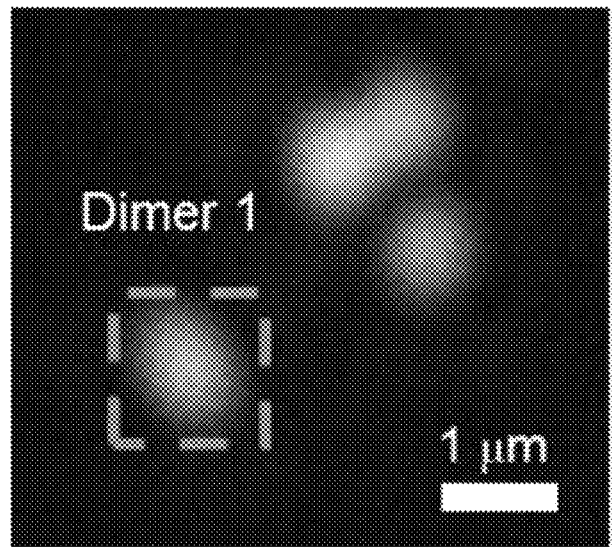
*Figure 22A*
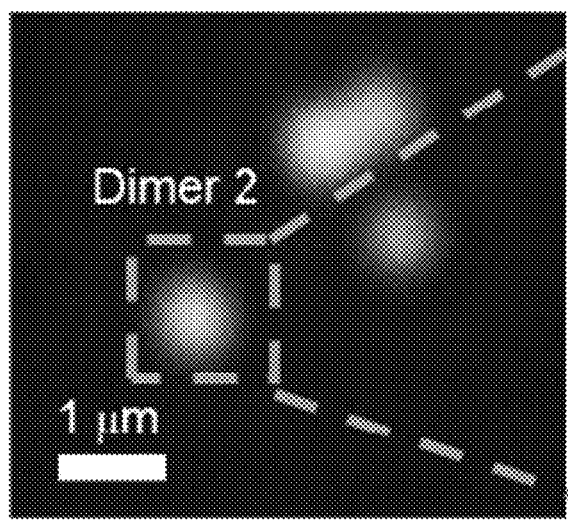 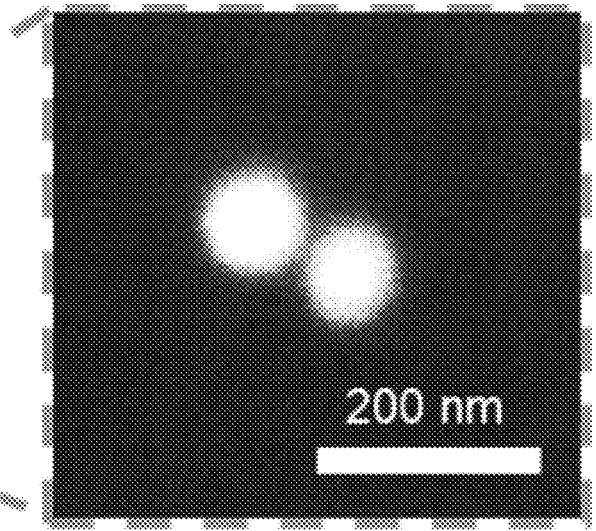
*Figure 22B*  *Figure 22C*

METHODS OF MANIPULATING PARTICLES ON SOLID SUBSTRATES VIA OPTOTHERMALLY-GATED PHOTON NUDGING

CROSS-REFERENCE TO RELATED APPLICATIONS

This application claims the benefit of priority to U.S. Provisional Application No. 62/941,087 filed Nov. 27, 2019, which is hereby incorporated herein by reference in its entirety.

STATEMENT OF GOVERNMENT SUPPORT

This invention was made with government support under Grant No. GM128446 awarded by the National Institutes of Health, Grant No. CMMI1761743 awarded by the National Science Foundation, Grant No. W911NF-17-1-0561 awarded by the Army Research Office and Grant No. 80NSSC17K0520 awarded by National Aeronautics and Space Administration (NASA). The government has certain rights in the invention.

BACKGROUND

Constructing colloidal particles into functional nanostructures, materials, and devices is a promising yet challenging direction. Many optical techniques have been developed to trap, manipulate, assemble, and print colloidal particles from aqueous solution into desired configurations on solid substrates. However, these techniques operating in liquid environments generally suffer from pattern collapses and Brownian motion. van der Waals interactions are strong enough to be exploited to firmly bond particles on the substrate; however, reconfigurable patterning becomes impossible, which prevents the on-demand construction of active nano-architectures.

An alternative strategy to overcome these limitations is to dynamically manipulate nanoparticles on a solid substrate, such as using atomic force microscopy (AFM). Unfortunately, AFM manipulation relies on physically pushing the particle with a sharp AFM tip, which often causes undesired tip and particle deformation as well as particle adhesion to the tip. In comparison to the solid-liquid interfaces, the van der Waals friction at the solid-solid interfaces is much stronger, which makes the manipulation of particles on solid substrates a considerable challenge. Thus, a key to the effective manipulation of particles on a solid substrate lies in the modulation of interfacial interactions to reduce the friction forces.

The compositions, methods, and systems discussed herein addresses these and other needs.

SUMMARY

In accordance with the purposes of the disclosed compositions, methods, and systems as embodied and broadly described herein, the disclosed subject matter relates to methods of manipulating particles on solid substrates via optothermally-gated photon nudging.

For example, disclosed herein are methods comprising: illuminating a first location of the optothermal system with electromagnetic radiation, wherein the optothermal system comprises: a substrate having a first surface; a surfactant layer disposed on the first surface of the substrate, wherein the surfactant layer is a solid thin film; and an optothermal particle disposed on the surfactant layer, such that the surfactant layer is between the optothermal particle and the first surface of the substrate; wherein the optothermal particle is in thermal contact with the surfactant layer; and wherein the first location of the optothermal system includes at least a portion of the optothermal particle such that: the optothermal particle converts at least a portion of the electromagnetic radiation into thermal energy, wherein the thermal energy converted by the optothermal particle is sufficient to generate a manipulation region at a location of the surfactant layer proximate to the first location of the optothermal system; and the optothermal particle scatters at least a portion of the electromagnetic radiation, thereby producing a radiation-pressure force on the optothermal particle; thereby: generating the manipulation region at the location of the surfactant layer proximate to the first location of the optothermal system, wherein the manipulation region has a temperature sufficient to induce a first-order phase transition from a solid phase to a liquid or quasi-liquid phase in the portion of the surfactant layer within the manipulation region; inducing the first-order phase transition in the portion of the surfactant layer within the manipulation region; producing the radiation-pressure force on the optothermal particle, wherein the radiation-pressure force is sufficient to translate the optothermal particle from a first location within the manipulation region to a second location within the manipulation region; and translating the optothermal particle from the first location within the manipulation region to the second location within the manipulation region.

In some examples, the substrate comprises glass, quartz, silicon dioxide, silicon nitride, a polymer, or a combination thereof.

In some examples, the optothermal particle comprises a plasmonic particle and the electromagnetic radiation comprises a wavelength that overlaps with at least a portion of the plasmon resonance energy of the plasmonic particle such that the manipulation region is generated by plasmon-enhanced photothermal effects. In some examples, the plasmonic particle comprises a metal selected from the group consisting of Au, Ag, Pd, Pt, Cu, Cr, Al, Mg, Ni, and combinations thereof. In some examples, the optothermal particle has an average particle size of from 10 nanometers (nm) to 20 micrometers ($\mu$m). In some examples, the optothermal particle has an average particle size of from 40 nm to 3 $\mu$m. In some examples, the optothermal particle has an isotropic shape or an anisotropic shape. In some examples, the optothermal particle has a shape that is substantially spherical, rod-like, or triangular.

In some examples, the electromagnetic radiation has a power density of from 0.1 mW/$\mu$m$^2$ to 15 mW/$\mu$m$^2$. In some examples, the electromagnetic radiation has a power density of from 0.2 to 2 mW/$\mu$m$^2$. In some examples, the electromagnetic radiation has a power of from 0.1 mW to 5 mW.

In some examples, the electromagnetic radiation is provided by a light source and the light source is an artificial light source. In some examples, the artificial light source comprises a laser. In some examples, the light source is configured to illuminate a mirror and the mirror is configured to reflect the electromagnetic radiation from the light source to illuminate the first location of the optothermal system. In some examples, the mirror comprises a plurality of mirrors. In some examples, the light source is configured to illuminate a digital micromirror device comprising a plurality of mirrors, the digital micromirror device is configured to reflect the electromagnetic radiation from the light source to illuminate the first location of the optothermal system.

In some examples, the surfactant layer comprises cetrimonium bromide (CTAB), cetrimonium chloride (CTAC), sodium dodecyl sulfate (SDS), poly(methyl methacrylate) (PMMA), or a combination thereof. In some examples, the surfactant layer has an average thickness of from 10 nm to 500 nm.

In some examples, the manipulation region has an average diameter of from 100 nm to 10 μm. In some examples, the temperature sufficient to induce a first-order phase transition from a solid phase to a liquid or quasi-liquid phase is from 350 K to 700 K. In some examples, the optothermal particle is translated at an average speed of from 0.01 to 10 μm/s. In some examples, the optothermal particle is translated in an amount of time of from 0.1 seconds to 10 minutes. In some examples, the optothermal particle is translated over an average distance of from 10 nm to 100 μm. In some examples, the optothermal particle is not damaged during the method.

In some examples, the methods further comprise illuminating a second location of the optothermal system with electromagnetic radiation, wherein the optothermal system further comprises: a second optothermal particle disposed on the surfactant layer, such that the surfactant layer is between the second optothermal particle and the first surface of the substrate; wherein the second optothermal particle is in thermal contact with the surfactant layer; and wherein the second location of the optothermal system includes at least a portion of the second optothermal particle such that: the second optothermal particle converts at least a portion of the electromagnetic radiation into thermal energy, wherein the thermal energy converted by the second optothermal particle is sufficient to generate a second manipulation region at a location of the surfactant layer proximate to the second location of the optothermal system; and the second optothermal particle scatters at least a portion of the electromagnetic radiation, thereby producing a radiation-pressure force on the second optothermal particle; thereby: generating the second manipulation region at the location of the surfactant layer proximate to the second location of the optothermal system, wherein the manipulation region has a temperature sufficient to induce a first-order phase transition from a solid phase to a liquid or quasi-liquid phase in the portion of the surfactant layer within the second manipulation region; inducing the first-order phase transition in the portion of the surfactant layer within the second manipulation region; producing the radiation-pressure force on the second optothermal particle, wherein the radiation-pressure force is sufficient to translate the second optothermal particle from a first location within the second manipulation region to a second location within the second manipulation region; and translating the second optothermal particle from the first location within the second manipulation region to the second location within the second manipulation region.

In some examples, the substrate is translocated to illuminate the second location. In some examples, the electromagnetic radiation is provided by a light source, and the light source is translocated to illuminate the second location. In some examples, the electromagnetic radiation is provided by a light source, the light source being configured to illuminate a mirror and the mirror is configured to reflect the electromagnetic radiation from the light source to illuminate the optothermal system, and the mirror is translocated to illuminate the second location. In some examples, the electromagnetic radiation is provided by a light source, the light source being configured to illuminate a plurality of mirrors and the plurality of mirrors are configured to reflect the electromagnetic radiation from the light source to illuminate the optothermal system, and one or more of the plurality of mirrors is translocated to illuminate the second location. In some examples, the electromagnetic radiation is provided by a light source, the light source being configured to illuminate a digital micromirror device comprising a plurality of mirrors and the digital micromirror device is configured to reflect the electromagnetic radiation from the light source to illuminate the optothermal system, and one or more of the plurality of mirrors is translocated to illuminate the second location.

In some examples, the methods further comprise illuminating a third location of the optothermal system with electromagnetic radiation, wherein the third location of the optothermal system includes at least a portion of the optothermal particle, such that: the optothermal particle converts at least a portion of the electromagnetic radiation into thermal energy, wherein the thermal energy converted by the optothermal particle is sufficient to generate a third manipulation region at a location of the surfactant layer proximate to the third location of the optothermal system; and the optothermal particle scatters at least a portion of the electromagnetic radiation, thereby producing a radiation-pressure force on the optothermal particle; thereby: generating the third manipulation region at the location of the surfactant layer proximate to the third location of the optothermal system, wherein the third manipulation region has a temperature sufficient to induce a first-order phase transition from a solid phase to a liquid or quasi-liquid phase in the portion of the surfactant layer within the third manipulation region; inducing the first-order phase transition in the portion of the surfactant layer within the third manipulation region; producing the radiation-pressure force on the optothermal particle, wherein the radiation-pressure force is sufficient to translate the optothermal particle from a first location within the third manipulation region to a second location within the third manipulation region; and translating the optothermal particle from the first location within the third manipulation region to the second location within the third manipulation region.

In some examples, the substrate is translocated to illuminate the third location. In some examples, the electromagnetic radiation is provided by a light source, and the light source is translocated to illuminate the third location. In some examples, the electromagnetic radiation is provided by a light source, the light source being configured to illuminate a mirror and the mirror is configured to reflect the electromagnetic radiation from the light source to illuminate the optothermal system, and the mirror is translocated to illuminate the third location. In some examples, the electromagnetic radiation is provided by a light source, the light source being configured to illuminate a plurality of mirrors and the plurality of mirrors are configured to reflect the electromagnetic radiation from the light source to illuminate the optothermal system, and one or more of the plurality of mirrors is translocated to illuminate the third location. In some examples, the electromagnetic radiation is provided by a light source, the light source being configured to illuminate a digital micromirror device comprising a plurality of mirrors and the digital micromirror device is configured to reflect the electromagnetic radiation from the light source to illuminate the optothermal system, and one or more of the plurality of mirrors is translocated to illuminate the third location.

In some examples, the methods further comprise removing the illumination such that the portion of the surfactant layer within the first manipulation region, the second manipulation region, the third manipulation region, or a combination thereof re-solidifies, thereby forming a patterned optothermal system. In some examples, the methods further comprise removing the surfactant layer from the patterned optothermal system. In some examples, removing the surfactant layer comprises dissolving the surfactant layer in a solvent.

Also disclosed herein are methods comprising: illuminating a first location of an optothermal system with electromagnetic radiation; wherein the optothermal system comprises: an optothermal substrate having a first surface; a surfactant layer disposed on the first surface of the substrate, wherein the surfactant layer is a solid thin film; and a particle disposed on the surfactant layer, such that the surfactant layer is between the particle and the first surface of the substrate; wherein the first location includes at least a portion of the particle such that the particle scatters at least a portion of the electromagnetic radiation, thereby producing a radiation-pressure force on the particle; wherein the optothermal substrate converts at least a portion of the electromagnetic radiation into thermal energy, wherein the thermal energy converted by the optothermal substrate is sufficient to generate a manipulation region at a location of the surfactant layer proximate to the first location of the optothermal system; and wherein the optothermal substrate is in thermal contact with the surfactant layer; thereby: generating the manipulation region at the location of the surfactant layer proximate to the first location of the optothermal system, wherein the manipulation region has a temperature sufficient to induce a first-order phase transition from a solid phase to a liquid or quasi-liquid phase in the portion of the surfactant layer within the manipulation region; inducing the first-order phase transition in the portion of the surfactant layer within the manipulation region; producing the radiation-pressure force on the particle, wherein the radiation-pressure force is sufficient to translate the particle from a first location within the manipulation region to a second location within the manipulation region; and translating the particle from the first location within the manipulation region to the second location within the manipulation region.

In some examples, the particle comprises a metal particle, a semiconductor particle, an inorganic particle, or a combination thereof. In some examples, the particle comprises a semiconductor particle, the semiconductor particle comprising a semiconductor selected from the group consisting of GeAs, GaAs, $TiO_2$, Si, and combinations thereof. In some examples, the particle comprises an inorganic particle comprising an inorganic perovskite. In some examples, the particle comprises an inorganic particle comprising barium titanate, titanium nitride, or a combination thereof. In some examples, the particle has an average particle size of from 10 nanometers (nm) to 20 micrometers (μm). In some examples, the particle has an isotropic shape or an anisotropic shape.

In some examples, the optothermal substrate comprises a plasmonic substrate, a metal substrate, a dielectric substrate, or a combination thereof. In some examples, the optothermal substrate comprises a plasmonic substrate and the electromagnetic radiation comprises a wavelength that overlaps with at least a portion of the plasmon resonance energy of the plasmonic substrate such that the manipulation region is generated by plasmon-enhanced photothermal effects. In some examples, the plasmonic substrate comprises a plurality of plasmonic particles. In some examples, the plurality of plasmonic particles comprise a plurality of metal particles. In some examples, the plurality of metal particles comprise a metal selected from the group consisting of Au, Ag, Pd, Pt, Cu, Cr, Al, Mg, Ni, and combinations thereof. In some examples, the plurality of plasmonic particles have an average particle size of from 10 nm to 300 nm. In some examples, the plurality of plasmonic particles are substantially spherical in shape.

In some examples, the methods further comprise making the plasmonic substrate by depositing the plurality of plasmonic particles on a substrate. In some examples, depositing the plurality of plasmonic particles comprises printing, lithographic deposition, electron beam deposition, thermal deposition, spin coating, drop-casting, zone casting, dip coating, blade coating, spraying, vacuum filtration, or combinations thereof.

In some examples, the methods further comprise making the plasmonic substrate by thermally annealing a film of a plasmonic metal deposited on a substrate, thereby forming the plurality of plasmonic particles on the substrate. In some examples, the methods further comprise depositing the film of the plasmonic metal on the substrate. In some examples, the film of the plasmonic metal has an average thickness of from 2 nm to 200 nm. In some examples, thermally annealing the film comprises heating the film at a temperature of from 400° C. to 600° C. In some examples, the film is thermally annealed for from 0.5 hour to 24 hours.

In some examples, the electromagnetic radiation has a power density of from 0.1 mW/μm$^2$ to 15 mW/μm$^2$. In some examples, the electromagnetic radiation has a power density of from 0.2 to 2 mW/μm$^2$. In some examples, the electromagnetic radiation has a power of from 0.1 mW to 5 mW.

In some examples, the electromagnetic radiation is provided by a light source and the light source is an artificial light source. In some examples, the artificial light source comprises a laser. In some examples, the light source is configured to illuminate a mirror and the mirror is configured to reflect the electromagnetic radiation from the light source to illuminate the first location of the optothermal system. In some examples, the mirror comprises a plurality of mirrors. In some examples, the light source is configured to illuminate a digital micromirror device comprising a plurality of mirrors, the digital micromirror device is configured to reflect the electromagnetic radiation from the light source to illuminate the first location of the optothermal system.

In some examples, the surfactant layer comprises cetrimonium bromide (CTAB), cetrimonium chloride (CTAC), sodium dodecyl sulfate (SDS), poly(methyl methacrylate) (PMMA), or a combination thereof. In some examples, the surfactant layer has an average thickness of from 10 nm to 500 nm.

In some examples, the manipulation region has an average diameter of from 100 nm to 10 μm. In some examples, the temperature sufficient to induce a first-order phase transition from a solid phase to a liquid or quasi-liquid phase is from 350 K to 700 K. In some examples, the particle is translated at an average speed of from 0.01 to 10 μm/s. In some examples, the particle is translated in an amount of time of from 0.1 seconds to 10 minutes. In some examples, the particle is translated over an average distance of from 10 nm to 100 μm. In some examples, the particle is not damaged during the method.

In some examples, the methods further comprise illuminating a second location of the optothermal system with electromagnetic radiation, wherein the optothermal system further comprises: a second particle disposed on the surfactant layer, such that the surfactant layer is between the second particle and the first surface of the substrate; wherein the second location includes at least a portion of the second particle such that the second particle scatters at least a portion of the electromagnetic radiation, thereby producing a radiation-pressure force on the second particle; and wherein the optothermal substrate converts at least a portion of the electromagnetic radiation into thermal energy, wherein the thermal energy converted by the optothermal substrate is sufficient to generate a second manipulation region at a location of the surfactant layer proximate to the second location of the optothermal system; thereby: generating the second manipulation region at the location of the surfactant layer proximate to the second location of the optothermal system, wherein the second manipulation region has a temperature sufficient to induce a first-order phase transition from a solid phase to a liquid or quasi-liquid phase in the portion of the surfactant layer within the second manipulation region; inducing the first-order phase transition in the portion of the surfactant layer within the second manipulation region; producing the radiation-pressure force on the second particle, wherein the radiation-pressure force is sufficient to translate the second particle from a first location within the second manipulation region to a second location within the second manipulation region; and translating the second particle from the first location within the second manipulation region to the second location within the second manipulation region.

In some examples, the optothermal substrate is translocated to illuminate the second location. In some examples, the electromagnetic radiation is provided by a light source, and the light source is translocated to illuminate the second location. In some examples, the electromagnetic radiation is provided by a light source, the light source being configured to illuminate a mirror and the mirror is configured to reflect the electromagnetic radiation from the light source to illuminate the optothermal system, and the mirror is translocated to illuminate the second location. In some examples, the electromagnetic radiation is provided by a light source, the light source being configured to illuminate a plurality of mirrors and the plurality of mirrors are configured to reflect the electromagnetic radiation from the light source to illuminate the optothermal system, and one or more of the plurality of mirrors is translocated to illuminate the second location. In some examples, the electromagnetic radiation is provided by a light source, the light source being configured to illuminate a digital micromirror device comprising a plurality of mirrors and the digital micromirror device is configured to reflect the electromagnetic radiation from the light source to illuminate the optothermal system, and one or more of the plurality of mirrors is translocated to illuminate the second location.

In some examples, the methods further comprise illuminating a third location of the optothermal system with electromagnetic radiation, wherein the third location of the optothermal system includes at least a portion of the particle, such that: wherein the particle scatters at least a portion of the electromagnetic radiation, thereby producing a radiation-pressure force on the particle; and wherein the optothermal substrate converts at least a portion of the electromagnetic radiation into thermal energy, wherein the thermal energy converted by the optothermal substrate is sufficient to generate a third manipulation region at a location of the surfactant layer proximate to the third location of the optothermal system; thereby: generating the third manipulation region at the location of the surfactant layer proximate to the third location of the optothermal system, wherein the third manipulation region has a temperature sufficient to induce a first-order phase transition from a solid phase to a liquid or quasi-liquid phase in the portion of the surfactant layer within the third manipulation region; inducing the first-order phase transition in the portion of the surfactant layer within the third manipulation region; producing the radiation-pressure force on the particle, wherein the radiation-pressure force is sufficient to translate the particle from a first location within the third manipulation region to a second location within the third manipulation region; and translating the particle from the first location within the third manipulation region to the second location within the third manipulation region.

In some examples, the optothermal substrate is translocated to illuminate the third location. In some examples, the electromagnetic radiation is provided by a light source, and the light source is translocated to illuminate the third location. In some examples, the electromagnetic radiation is provided by a light source, the light source being configured to illuminate a mirror and the mirror is configured to reflect the electromagnetic radiation from the light source to illuminate the optothermal system, and the mirror is translocated to illuminate the third location. In some examples, the electromagnetic radiation is provided by a light source, the light source being configured to illuminate a plurality of mirrors and the plurality of mirrors are configured to reflect the electromagnetic radiation from the light source to illuminate the optothermal system, and one or more of the plurality of mirrors is translocated to illuminate the third location. In some examples, the electromagnetic radiation is provided by a light source, the light source being configured to illuminate a digital micromirror device comprising a plurality of mirrors and the digital micromirror device is configured to reflect the electromagnetic radiation from the light source to illuminate the optothermal system, and one or more of the plurality of mirrors is translocated to illuminate the third location.

In some examples, the methods further comprise removing the illumination such that the portion of the surfactant layer within the first manipulation region, the second manipulation region, the third manipulation region, or a combination thereof re-solidifies, thereby forming a patterned optothermal system. In some examples, the methods further comprise removing the surfactant layer from the patterned optothermal system. In some examples, removing the surfactant layer comprises dissolving the surfactant layer in a solvent.

Also disclosed herein are methods comprising: illuminating a first location of an optothermal system with electromagnetic radiation; wherein the optothermal system comprises: an optothermal substrate having a first surface; a surfactant layer disposed on the first surface of the substrate, wherein the surfactant layer is a solid thin film; and an optothermal particle disposed on the surfactant layer, such that the surfactant layer is between the optothermal particle and the first surface of the substrate; wherein the optothermal substrate and the optothermal particle are in thermal contact with the surfactant layer; wherein the first location includes at least a portion of the optothermal particle such that the optothermal particle scatters at least a portion of the electromagnetic radiation, thereby producing a radiation-pressure force on the optothermal particle; wherein the optothermal substrate and the optothermal particle each converts at least a portion of the electromagnetic radiation into thermal energy; wherein the thermal energy converted by the optothermal substrate, the optothermal particle, or a combination thereof is sufficient to generate a manipulation region at a location of the surfactant layer proximate to the first location of the optothermal system; thereby: generating the manipulation region at the location of the surfactant layer proximate to the first location of the optothermal system, wherein the manipulation region has a temperature sufficient to induce a first-order phase transition from a solid phase to a liquid or quasi-liquid phase in the portion of the surfactant layer within the manipulation region; inducing the first-order phase transition in the portion of the surfactant layer within the manipulation region; producing the radiation-pressure force on the optothermal particle, wherein the radiation-pressure force is sufficient to translate the optothermal particle from a first location within the manipulation region to a second location within the manipulation region; and translating the optothermal particle from the first location within the manipulation region to the second location within the manipulation region.

In some examples, the optothermal particle comprises a plasmonic particle and the electromagnetic radiation comprises a wavelength that overlaps with at least a portion of the plasmon resonance energy of the plasmonic particle such that the manipulation region is generated by plasmon-enhanced photothermal effects. In some examples, the plasmonic particle comprises a metal selected from the group consisting of Au, Ag, Pd, Pt, Cu, Cr, Al, Mg, Ni, and combinations thereof. In some examples, the optothermal particle has an average particle size of from 10 nanometers (nm) to 20 micrometers ($\mu$m). In some examples, the optothermal particle has an average particle size of from 40 nm to 3 $\mu$m. In some examples, the optothermal particle has an isotropic shape or an anisotropic shape. In some examples, the optothermal particle has a shape that is substantially spherical, rod-like, or triangular.

In some examples, the optothermal substrate comprises a plasmonic substrate, a metal substrate, a dielectric substrate, or a combination thereof. In some examples, the optothermal substrate comprises a plasmonic substrate and the electromagnetic radiation comprises a wavelength that overlaps with at least a portion of the plasmon resonance energy of the plasmonic substrate such that the manipulation region is generated by plasmon-enhanced photothermal effects. In some examples, the plasmonic substrate comprises a plurality of plasmonic particles. In some examples, the plurality of plasmonic particles comprise a plurality of metal particles. In some examples, the plurality of metal particles comprise a metal selected from the group consisting of Au, Ag, Pd, Pt, Cu, Cr, Al, Mg, Ni, and combinations thereof. In some examples, the plurality of plasmonic particles have an average particle size of from 10 nm to 300 nm. In some examples, the plurality of plasmonic particles are substantially spherical in shape.

In some examples, the methods further comprise making the plasmonic substrate by depositing the plurality of plasmonic particles on a substrate. In some examples, depositing the plurality of plasmonic particles comprises printing, lithographic deposition, electron beam deposition, thermal deposition, spin coating, drop-casting, zone casting, dip coating, blade coating, spraying, vacuum filtration, or combinations thereof.

In some examples, the methods further comprise making the plasmonic substrate by thermally annealing a film of a plasmonic metal deposited on a substrate, thereby forming the plurality of plasmonic particles on the substrate. In some examples, the methods further comprise depositing the film of the plasmonic metal on the substrate. In some examples, the film of the plasmonic metal has an average thickness of from 2 nm to 200 nm. In some examples, thermally annealing the film comprises heating the film at a temperature of from 400° C. to 600° C. In some examples, the film is thermally annealed for from 0.5 hour to 24 hours.

In some examples, the electromagnetic radiation has a power density of from 0.1 mW/$\mu$m$^2$ to 15 mW/$\mu$m$^2$. In some examples, the electromagnetic radiation has a power density of from 0.2 to 2 mW/$\mu$m$^2$. In some examples, the electromagnetic radiation has a power of from 0.1 mW to 5 mW. In some examples, the electromagnetic radiation is provided by a light source and the light source is an artificial light source. In some examples, the artificial light source comprises a laser. In some examples, the light source is configured to illuminate a mirror and the mirror is configured to reflect the electromagnetic radiation from the light source to illuminate the first location of the optothermal system. In some examples, the mirror comprises a plurality of mirrors. In some examples, the light source is configured to illuminate a digital micromirror device comprising a plurality of mirrors, the digital micromirror device is configured to reflect the electromagnetic radiation from the light source to illuminate the first location of the optothermal system.

In some examples, the surfactant layer comprises cetrimonium bromide (CTAB), cetrimonium chloride (CTAC), sodium dodecyl sulfate (SDS), poly(methyl methacrylate) (PMMA), or a combination thereof. In some examples, the surfactant layer has an average thickness of from 10 nm to 500 nm.

In some examples, the manipulation region has an average diameter of from 100 nm to 10 $\mu$m. In some examples, the temperature sufficient to induce a first-order phase transition from a solid phase to a liquid or quasi-liquid phase is from 350 K to 700 K. In some examples, the optothermal particle is translated at an average speed of from 0.01 to 10 $\mu$m/s. In some examples, the optothermal particle is translated in an amount of time of from 0.1 seconds to 10 minutes. In some examples, the optothermal particle is translated over an average distance of from 10 nm to 100 $\mu$m. In some examples, the optothermal particle is not damaged during the method.

In some examples, the methods further comprise illuminating a second location of the optothermal system with electromagnetic radiation, wherein the optothermal system further comprises: a second optothermal particle disposed on the surfactant layer, such that the surfactant layer is between the second optothermal particle and the first surface of the substrate; wherein the optothermal substrate and the second optothermal particle are in thermal contact with the surfactant layer; wherein the first location includes at least a portion of the second optothermal particle such that the second optothermal particle scatters at least a portion of the electromagnetic radiation, thereby producing a radiation-pressure force on the second optothermal particle; wherein the optothermal substrate and the second optothermal particle each converts at least a portion of the electromagnetic radiation into thermal energy; wherein the thermal energy converted by the optothermal substrate, the second optothermal particle, or a combination thereof is sufficient to generate a second manipulation region at a location of the surfactant layer proximate to the second location of the optothermal system; thereby: generating the second manipulation region at the location of the surfactant layer proximate to the second location of the optothermal system, wherein the second manipulation region has a temperature sufficient to induce a first-order phase transition from a solid phase to a liquid or quasi-liquid phase in the portion of the surfactant layer within the second manipulation region; inducing the first-order phase transition in the portion of the surfactant layer within the second manipulation region; producing the radiation-pressure force on the second optothermal particle, wherein the radiation-pressure force is sufficient to translate the second optothermal particle from a first location within the second manipulation region to a second location within the second manipulation region; and translating the second optothermal particle from the first location within the second manipulation region to the second location within the second manipulation region.

In some examples, the optothermal substrate is translocated to illuminate the second location. In some examples, the electromagnetic radiation is provided by a light source, and the light source is translocated to illuminate the second location. In some examples, the electromagnetic radiation is provided by a light source, the light source being configured to illuminate a mirror and the mirror is configured to reflect the electromagnetic radiation from the light source to illuminate the optothermal system, and the mirror is translocated to illuminate the second location. In some examples, the electromagnetic radiation is provided by a light source, the light source being configured to illuminate a plurality of mirrors and the plurality of mirrors are configured to reflect the electromagnetic radiation from the light source to illuminate the optothermal system, and one or more of the plurality of mirrors is translocated to illuminate the second location. In some examples, the electromagnetic radiation is provided by a light source, the light source being configured to illuminate a digital micromirror device comprising a plurality of mirrors and the digital micromirror device is configured to reflect the electromagnetic radiation from the light source to illuminate the optothermal system, and one or more of the plurality of mirrors is translocated to illuminate the second location.

In some examples, the methods further comprise illuminating a third location of the optothermal system with electromagnetic radiation, wherein the third location of the optothermal system includes at least a portion of the optothermal particle, such that: the optothermal particle scatters at least a portion of the electromagnetic radiation, thereby producing a radiation-pressure force on the optothermal particle; wherein the optothermal substrate and the optothermal particle each converts at least a portion of the electromagnetic radiation into thermal energy; wherein the thermal energy converted by the optothermal substrate, the optothermal particle, or a combination thereof is sufficient to generate a third manipulation region at a location of the surfactant layer proximate to the third location of the optothermal system; thereby: generating the third manipulation region at the location of the surfactant layer proximate to the third location of the optothermal system, wherein the third manipulation region has a temperature sufficient to induce a first-order phase transition from a solid phase to a liquid or quasi-liquid phase in the portion of the surfactant layer within the third manipulation region; inducing the first-order phase transition in the portion of the surfactant layer within the third manipulation region; producing the radiation-pressure force on the optothermal particle, wherein the radiation-pressure force is sufficient to translate the optothermal particle from a first location within the third manipulation region to a second location within the third manipulation region; and translating the optothermal particle from the first location within the third manipulation region to the second location within the third manipulation region.

In some examples, the optothermal substrate is translocated to illuminate the third location. In some examples, the electromagnetic radiation is provided by a light source, and the light source is translocated to illuminate the third location. In some examples, the electromagnetic radiation is provided by a light source, the light source being configured to illuminate a mirror and the mirror is configured to reflect the electromagnetic radiation from the light source to illuminate the optothermal system, and the mirror is translocated to illuminate the third location. In some examples, the electromagnetic radiation is provided by a light source, the light source being configured to illuminate a plurality of mirrors and the plurality of mirrors are configured to reflect the electromagnetic radiation from the light source to illuminate the optothermal system, and one or more of the plurality of mirrors is translocated to illuminate the third location. In some examples, the electromagnetic radiation is provided by a light source, the light source being configured to illuminate a digital micromirror device comprising a plurality of mirrors and the digital micromirror device is configured to reflect the electromagnetic radiation from the light source to illuminate the optothermal system, and one or more of the plurality of mirrors is translocated to illuminate the third location.

In some examples, the methods further comprise removing the illumination such that the portion of the surfactant layer within the first manipulation region, the second manipulation region, the third manipulation region, or a combination thereof re-solidifies, thereby forming a patterned optothermal system. In some examples, the methods further comprise removing the surfactant layer from the patterned optothermal system. In some examples, removing the surfactant layer comprises dissolving the surfactant layer in a solvent.

Also disclosed herein are patterned optothermal systems made by any of the methods disclosed herein.

Also disclosed herein are methods of use of the patterned optothermal systems disclosed herein. For example, the methods can comprise using the patterned optothermal system for chemical or biological sensing. In some examples, the patterned optothermal system is used as a chiral sensor. In some examples, the patterned optothermal system is used in optical devices, electronic devices, optoelectronic devices, or combinations thereof. In some examples, the patterned optothermal system is used in surface-enhanced Raman spectroscopy (SERS), surface-enhanced infrared Raman spectroscopy (SEIRS), or a combination thereof. In some examples, the patterned optothermal system is used in an optical waveguide, an optical sensor, an optical nanocircuit, an optical metamolecule sensing, or a combination thereof.

Also disclosed herein are systems comprising any of the optothermal systems disclosed herein and a light source configured to illuminate the optothermal system. In some examples, the system further comprises an instrument configured to capture an electromagnetic signal from the optothermal system. In some examples, the system further comprises a first lens. In some examples, the system further comprises a mirror. In some examples, the system further comprises a means for translocating the mirror. In some examples, the mirror comprises a plurality of mirrors. In some examples, the system further comprises a digital micromirror device comprising a plurality of mirrors. In some examples, the system further comprises a means for translocating one or more of the plurality of mirrors. In some examples, the system further comprises a computing device comprising a processor and a memory operably coupled to the processor, the memory having further computer-executable instructions stored thereon that, when executed by the processor, cause the processor to: receive an electromagnetic signal from the instrument; process the electromagnetic signal to obtain a characteristic of the optothermal system; and output the characteristic of the optothermal system. In some examples, the instrument comprises a camera, an optical microscope, an electron microscope, a spectrometer, or combinations thereof. In some examples, the system further comprises a means for translocating the substrate or the optothermal substrate; the light source; or a combination thereof.

Additional advantages of the disclosed systems and methods will be set forth in part in the description which follows, and in part will be obvious from the description. The advantages of the disclosed systems and methods will be realized and attained by means of the elements and combinations particularly pointed out in the appended claims. It is to be understood that both the foregoing general description and the following detailed description are exemplary and explanatory only and are not restrictive of the disclosed systems and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

FIG. 1A-FIG. 1F. General concept of optothermally-gated photon nudging (OPN). FIG. 1A, Schematic illustration of optothermally-gated photon nudging on a solid substrate. FIG. 1B, A 200 nm gold nanoparticle (AuNP) placed on and bonded with the CTAC layer by van der Waals force $F_{vdW}$ without optical heating. FIG. 1C, The optical heating under laser illumination induces a localized phase transition in the surrounding CTAC layer. CTAC turns into a quasi-liquid phase and releases the bond with gold nanoparticle. FIG. 1D, The simulated temperature distribution around a 200 nm gold nanoparticle. Incident power: 1 mW; laser beam size: 0.8 µm. FIG. 1E, gold nanoparticle moves against the laser beam with an in-plane optical force $F_{opt,x}$ and a resistant force $F_{res}$. In FIG. 1A-FIG. 1E, the schematic configuration is flipped upside down for better visualization. FIG. 1F, Sequential dark-field optical images showing real-time manipulation of a 300 nm gold nanoparticle. The green crosshair indicates the position of the laser beam. The white arrow depicts the path. Scale bar: 5 µm.

FIG. 2A, Optical image and (inset) the schematic illustration showing the measurement of particle velocities. The distance between the center of the laser beam and the center of the particle was set to 200 nm for all measurements. FIG. 2B, The measured X position (left axis), Y position (left axis), and speed v (right axis) of a 300 nm gold nanoparticle under the laser irradiation of 1.40 mW as a function of time t. The solid green arrow at t=~2.7 s indicates the instant when the laser is turned on. FIG. 2C, Measured maximum speed of 200 nm and 300 nm gold nanoparticles as a function of incident power. The solid lines show the corresponding modelled data. FIG. 2D, Schematic of the comparison of the laser movement vector $E_l$ and the particle movement vector $E_p$ at two successive frames (t=$t_1$, $t_2$). θ is denoted as the angle between $E_l$ and $E_p$. FIG. 2E, Examples of the recorded trajectories of the laser beam and the particle during the manipulation (see Supplementary Movie 1 for the manipulation of the 80 nm gold nanoparticle). FIG. 2F, The calculated optical scattering forces of 200 nm (olive) and 300 nm (pink) gold nanoparticles as a function of laser-particle distance. Incident power: 1.4 mW.

FIG. 3A, Schematic illustration of the 1D assembly of seven 500 nm silicon nanoparticles (SiNPs). FIG. 3B, Dark-field image of silicon nanoparticles before patterning. The white dashed arrows indicate the target positions of each silicon nanoparticles. FIG. 3C, Optical image of silicon nanoparticles after 1D assembly. FIG. 3D, SEM image of silicon nanoparticles after 1D assembly. The inset defines the method to determine the position error S for individual silicon nanoparticles. FIG. 3E, Position errors for each silicon nanoparticles in the line. The shaded area shows the average deviation from the target line, which is ~80 nm. FIG. 3F, FIG. 3G, Schematic illustration and dark-field image of a 2D assembly of nine 500 nm silicon nanoparticles into a 3×3 array. FIG. 3H, SEM image of the 2D assembly. FIG. 3I, The position error in X ($S_X$) and Y ($S_Y$) for individual silicon nanoparticles. FIG. 3J, Position error in X and Y for each silicon nanoparticles in the 2D array. The shaded area indicates the average deviation from the target positions, which is ~200 nm. Scale bars: FIG. 3B-FIG. 3D, 10 µm; inset in FIG. 3D, 1 µm; FIG. 3G, FIG. 3H, 5 µm; FIG. 3I, 500 nm.

FIG. 4A, Reconfigurable patterning of four 300 nm gold nanoparticles. Four particles were arranged into L-shape, a square, mirrored L-shape, and a straight line, sequentially. The dashed arrows show the reconfigurable patterning sequence. FIG. 4B, FIG. 4C, Schematic illustrations and successive optical images showing the real-time (FIG. 4B) rotation and (FIG. 4C) translation of gold nanowires (AuNWs). The green crosshairs mark the positions of the laser beam. The dashed rectangular outline indicates the original positions of nanowires. FIG. 4D, Schematic illustration and optical images showing reconfigurable patterning of metal-dielectric hybrid nanostructures. Two 500 nm silicon nanoparticles and one gold nanowire were patterned into "Y" and "Z", sequentially. Scale bars: FIG. 4A, 5 µm; FIG. 4B-FIG. 4D, 3 µm.

FIG. 5A-FIG. 5J In situ optical spectroscopy. Figure SA, FIG. 5B, Optical images of a pentagon pattern composed of five 100 nm gold nanoparticles (Figure SA) before and (FIG. 5B) after the removal of CTAC. Two identical white dashed pentagons are added to help indicate the positions of gold nanoparticles. FIG. 5C, The scattering spectra of 100 nm gold nanoparticles measured before and after the removal of CTAC. The shaded area indicates the standard deviation of the peak position. The insets show the corresponding dark-field images. FIG. 5D, Schematic illustration of the assembly of Au dimer with two 100 nm gold nanoparticles. FIG. 5E, Dark-field images of the gold nanoparticle before and after the dimer assembly. FIG. 5F, SEM image of the Au dimer. FIG. 5G, Scattering spectra of the two gold nanoparticles before assembly. FIG. 5H, The simulated scattering spectra of a 100 nm gold nanoparticle. Figure SI, Scattering spectra of the Au dimer. The pink and olive dashed curves represent the longitudinal and transverse plasmon modes, respectively. FIG. 5J, The simulated scattering spectrum of the gold nanoparticle dimer. The insets in (FIG. 5H) and (FIG. 5J) show the corresponding electric field enhancement profiles. Scale bars: Figure SA, FIG. 5B, 10 µm; inset in FIG. 5C, 2 µm; FIG. 5E, 5 µm; FIG. 5F, 2 µm; inset in FIG. 5F, 200 nm.

FIG. 6A, The optical setup for optothermally-gated photon nudging and in situ spectroscopy. FIG. 6B, Detailed setup of sample configuration and dark-field scattering measurement.

FIG. 7A, the boundary between CTAC layer and the glass substrate (marked with the black dashed line); FIG. 7B, the CTAC layer. The root mean square (RMS) roughness in (FIG. 7B) is ~32 nm.

FIG. 9A, Scanning electron micrograph (SEM) of gold nanoislands (AuNIs) substrate after thermal annealing of a 4.5 nm (in thickness) Au thin film. FIG. 9B, The corresponding transmission spectra. The green dashed line indicates the wavelength of the laser (532 nm).

FIG. 10. Scattering spectra of $TiO_2$ nanoparticle (pink) and polystyrene (PS) (olive) measured at the same incident light intensity. The insets show the corresponding dark-filed images, scale bars: 2 μm. The green dashed line indicates the wavelength of the laser (532 nm). Apparently, polystyrene nanoparticles show weak scattering at the laser wavelength, while $TiO_2$ nanoparticles have a much larger scattering efficiency.

FIG. 11A, 0.27 mW; FIG. 11B, 0.58 mW; FIG. 11C, 0.96 mW; FIG. 11D, 1.40 mW. The green arrows indicate the instants when the laser was turned on. The acceleration values showed in the figure corresponded to the accelerations when the laser was on, which were directly extracted from the software. With an increasing optical power, the particle gained larger speed.

FIG. 12A, gold nanoparticles on a CTAC film; FIG. 12B, gold nanoparticles on a glass substrate. There is an obvious immersion line for the gold nanoparticles on a CTAC film (red dashed lines in FIG. 12A), while for the glass substrate, the gold nanoparticles maintains its spherical shape. These results clearly show that the particles are partially immersed into CTAC film during optothermally-gated photon nudging manipulation.

FIG. 13A, 200 nm gold nanoparticle; FIG. 13B, 80 nm gold nanoparticle, moving forth; FIG. 13C, 80 nm gold nanoparticle, moving back; FIG. 13D, 100 nm silver nanoparticle (AgNP); FIG. 13E, 500 nm silicon nanoparticle. The manipulation efficiencies of each particle are also presented in the figures.

FIG. 15A, 2 μm; FIG. 15B, 5 μm.

FIG. 16A, Schematic illustration of the gold nanoparticle manipulation process. FIG. 16B, FIG. 16C, Dark-field images and scattering spectra of the gold nanoparticle before and after optothermally-gated photon nudging manipulation. Scale bars: 5 μm. The scattering spectra showed no apparent differences after the optothermally-gated photon nudging manipulation, which indicates optothermally-gated photon nudging can manipulate nanoparticles without damaging their optical properties.

FIG. 18A, FIG. 18B, Snapshots of CTAC in MD simulations at (FIG. 18A) 300 K and (FIG. 18B) 450 K. FIG. 18C, Calculated viscosity and normalized pressure tensor autocorrection function (PACF) of CTAC at 450 K.

FIG. 20A, FIG. 20B, Dark-field images (FIG. 20A) and SEM images (FIG. 20B) of two patterned lines of 5 silicon nanoparticles. FIG. 20C, The corresponding position errors of each particles in (FIG. 20B). All Scale bars are 5 μm.

FIG. 21A, Scattering spectra of (green) 40 nm, (olive) 80 nm, and (orange) 100 nm gold nanoparticles. FIG. 21B, Scattering spectrum of (blue) 80 nm and (cyan) 110 nm silver nanoparticles. The insets show the corresponding dark-field images. All scale bars are 2 μm.

FIG. 22A-FIG. 22E. Reliable fabrication of Au dimer with a gap of ~15 nm. FIG. 22A, FIG. 22B, Optical images of the Au dimer composed of two same 100 nm gold nanoparticles with different interparticle distances. FIG. 22C, The SEM images of the Au dimer in (FIG. 22B). FIG. 22D, The scattering spectra of the two single gold nanoparticles. FIG. 22E, Scattering spectra and the fitting of the Au dimers in (FIG. 22A) and (FIG. 22B).

FIG. 23A, FIG. 23B, Simulated temperature distribution around an 80 nm gold nanoparticle. (FIG. 23A) 532 nm laser with an incident power of 1 mW; (FIG. 23B) 660 nm laser with an incident power of 2.5 mW. Scale bars: 80 nm. FIG. 23C, Simulated absorption cross-section for 80 nm gold nanoparticles. The green and red dashed lines stand for the wavelengths of two lasers used.

DETAILED DESCRIPTION

Figure 1A:
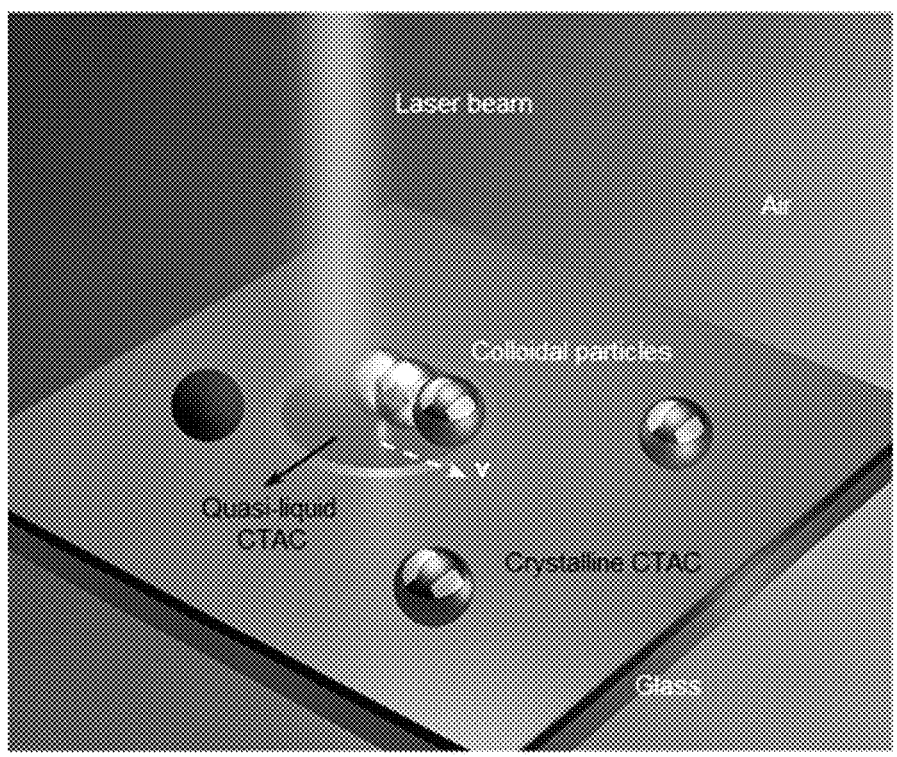

The compositions, methods, and systems described herein may be understood more readily by reference to the following detailed description of specific aspects of the disclosed subject matter and the Examples included therein.

Before the present compositions, methods, and systems are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Disclosed herein are methods of manipulating particles on solid substrates via optothermally-gated photon nudging.

In some examples, the methods comprise illuminating a first location of an optothermal system with electromagnetic radiation. As used herein, "a first location" and "the first location" are meant to include any number of locations in any arrangement on the substrate. Thus, for example "a first location" includes one or more first locations. In some embodiments, the first location can comprise a plurality of locations. In some embodiments, the first locations can comprise a plurality of locations arranged in an ordered array.

In some examples, the electromagnetic radiation has a power density of 0.1 mW/$\mu m^2$ or more (e.g., 0.2 mW/$\mu m^2$ or more, 0.3 mW/$\mu m^2$ or more, 0.4 mW/$\mu m^2$ or more, 0.5 mW/$\mu m^2$ or more, 0.6 mW/$\mu m^2$ or more, 0.7 mW/$\mu m^2$ or more, 0.8 mW/$\mu m^2$ or more, 0.9 mW/$\mu m^2$ or more, 1 mW/$\mu m^2$ or more, 1.5 mW/$\mu m^2$ or more, 2 mW/$\mu m^2$ or more, 2.5 mW/$\mu m^2$ or more, 3 mW/$\mu m^2$ or more, 3.5 mW/$\mu m^2$ or more, 4 mW/$\mu m^2$ or more, 4.5 mW/$\mu m^2$ or more, 5 mW/$\mu m^2$ or more, 6 mW/$\mu m^2$ or more, 7 mW/$\mu m^2$ or more, 8 mW/$\mu m^2$ or more, 9 mW/$\mu m^2$ or more, 10 mW/$\mu m^2$ or more, 11 mW/$\mu m^2$ or more, 12 mW/$\mu m^2$ or more, 13 mW/$\mu m^2$ or more, or 14 mW/$\mu m^2$ or more). In some examples, the electromagnetic radiation has a power density of 15 mW/$\mu m^2$ or less (e.g., 14 mW/$\mu m^2$ or less, 13 mW/$\mu m^2$ or less, 12 mW/$\mu m^2$ or less, 11 mW/$\mu m^2$ or less, 10 mW/$\mu m^2$ or less, 9 mW/$\mu m^2$ or less, 8 mW/$\mu m^2$ or less, 7 mW/$\mu m^2$ or less, 6 mW/$\mu m^2$ or less, 5 mW/$\mu m^2$ or less, 4.5 mW/$\mu m^2$ or less, 4 mW/$\mu m^2$ or less, 3.5 mW/$\mu m^2$ or less, 3 mW/$\mu m^2$ or less, 2.5 mW/$\mu m^2$ or less, 2 mW/$\mu m^2$ or less, 1.5 mW/$\mu m^2$ or less, 1 mW/$\mu m^2$ or less, 0.9 mW/$\mu m^2$ or less, 0.8 mW/$\mu m^2$ or less, 0.7 mW/$\mu m^2$ or less, 0.6 mW/$\mu m^2$ or less, 0.5 mW/$\mu m^2$ or less, 0.4 mW/$\mu m^2$ or less, 0.3 mW/$\mu m^2$ or less, or 0.2 mW/$\mu m^2$ or less). The power density of the electromagnetic radiation can range from any of the minimum values described above to any of the maximum values described above. For example, the electromagnetic radiation can have a power density of from 0.1 mW/$\mu m^2$ to 15 mW/$\mu m^2$ (e.g., from 0.1 mW/$\mu m^2$ to 7.5 mW/$\mu m^2$, from 7.5 mW/$\mu m^2$ to 15 mW/$\mu m^2$, from 0.1 mW/$\mu m^2$ to 5 mW/$\mu m^2$, from 5 mW/$\mu m^2$ to 10 mW/$\mu m^2$, from 10 mW/$\mu m^2$ to 15 mW/$\mu m^2$, from 0.5 mW/$\mu m^2$ to 15 mW/$\mu m^2$, from 0.1 mW/$\mu m^2$ to 12 mW/$\mu m^2$, from 0.5 mW/$\mu m^2$ to 12 mW/$\mu m^2$, or from 0.2 to 2 mW/$\mu m^2$).

In some examples, the electromagnetic radiation has a power of 0.1 mW or more (e.g., 0.2 mW or more, 0.3 mW or more, 0.4 mW or more, 0.5 mW or more, 0.6 mW or more, 0.7 mW or more, 0.8 mW or more, 0.9 mW or more, 1 mW or more, 1.5 mW or more, 2 mW or more, 2.5 mW or more, 3 mW or more, 3.5 mW or more, or 4 mW or more). In some examples, the electromagnetic radiation has a power of 5 mW or less (e.g., 4.5 mW or less, 4 mW or less, 3.5 mW or less, 3 mW or less, 2.5 mW or less, 2 mW or less, 1.5 mW or less, 1 mW or less, 0.9 mW or less, 0.8 mW or less, 0.7 mW or less, 0.6 mW or less, 0.5 mW or less, 0.4 mW or less, 0.3 mW or less, or 0.2 mW or less). The power of the electromagnetic radiation can range from any of the minimum values described above to any of the maximum values described above. For example, the electromagnetic radiation can have a power of from 0.1 mW to 5 mW (e.g., from 0.1 mW to 2.5 mW, from 2.5 mW to 5 mW, from 0.1 mw to 1, from 1 mW to 2 mW, from 2 mW to 3 mW, from 3 mW to 4 mW, from 4 mW to 5 mW, from 0.5 mW to 5 mW, from 0.1 mW to 4 mW, or from 0.3 mW to 1.5 mW).

The electromagnetic radiation can, for example, be provided by a light source. The light source can be any type of light source. Examples of suitable light sources include natural light sources (e.g., sunlight) and artificial light sources (e.g., incandescent light bulbs, light emitting diodes, gas discharge lamps, arc lamps, lasers, etc.). In some examples, the electromagnetic radiation is provided by a light source and the light source is an artificial light source. In some examples, the light source is a laser.

In some examples, the light source is configured to illuminate a mirror and the mirror is configured to reflect the electromagnetic radiation from the light source to illuminate the first location of the optothermal system. In some examples, the mirror comprises a plurality of mirrors. In some examples, the light source is configured to illuminate a digital micromirror device comprising a plurality of mirrors, the digital micromirror device is configured to reflect the electromagnetic radiation from the light source to illuminate the first location of the optothermal system.

In some examples, the optothermal system comprises a substrate having a first surface. The substrate can be any material consistent with the compositions, methods, and systems disclosed herein. In some examples, the substrate can be transparent. As used herein, a "transparent substrate" is meant to include any substrate that is transparent at the wavelength or wavelength region of interest. Examples of substrates include, but are not limited to, glass, quartz, parylene, silicon dioxide, mica, poly(methyl methacrylate), polyamide, polycarbonate, polyester, polypropylene, polytetrafluoroethylene, hafnium oxide, hafnium silicate, tantalum pentoxide, zirconium dioxide, zirconium silicate, and combinations thereof. In some examples, the substrate comprises glass, quartz, silicon dioxide, silicon nitride, a polymer, or a combination thereof.

In some examples, the optothermal system further comprises a surfactant layer disposed on the first surface of the substrate, wherein the surfactant layer is a solid thin film. The surfactant layer can be any material consistent with the compositions, methods, and systems disclosed herein. In some examples, the surfactant layer comprises cetrimonium bromide (CTAB), cetrimonium chloride (CTAC), sodium dodecyl sulfate (SDS), poly(methyl methacrylate) (PMMA), or a combination thereof.

In some examples, the surfactant layer has an average thickness of 10 nm or more (e.g., 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 275 nm or more, 300 nm or more, 325 nm or more, 350 nm or more, 375 nm or more, 400 nm or more, 425 nm or more, or 450 nm or more). In some examples, the surfactant layer can have an average thickness of 500 nm or less (e.g., 475 nm or less, 450 nm or less, 425 nm or less, 400 nm or less, 375 nm or less, 350 nm or less, 325 nm or less, 300 nm or less, 275 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, or 20 nm or less). The average thickness of the surfactant layer can range from any of the minimum values described above to any of the maximum values described above. For example, the surfactant layer can have an average thickness of from 10 nm to 500 nm (e.g., from 10 nm to 250 nm, from 250 nm to 500 nm, from 10 nm to 100 nm, from 100 nm to 200 nm, from 200 nm to 300 nm, from 300 nm to 400 nm, from 400 nm to 500 nm, from 10 nm to 400 nm, from 20 nm to 500 nm, from 20 nm to 400 nm, or from 100 nm to 300 nm).

In some examples, the optothermal system further comprises: an optothermal particle disposed on the surfactant layer, such that the surfactant layer is between the optothermal particle and the first surface of the substrate; wherein the optothermal particle is in thermal contact with the surfactant layer; and wherein the first location of the optothermal system includes at least a portion of the optothermal particle such that: the optothermal particle converts at least a portion of the electromagnetic radiation into thermal energy, wherein the thermal energy converted by the optothermal particle is sufficient to generate a manipulation region at a location of the surfactant layer proximate to the first location of the optothermal system; and the optothermal particle scatters at least a portion of the electromagnetic radiation, thereby producing a radiation-pressure force on the optothermal particle.

As used herein, "an optothermal particle" and "the optothermal particle" are meant to include any number of optothermal particles. Thus, for example, "an optothermal particle" includes one or more optothermal particles. In some examples, the optothermal particle includes a plurality of optothermal particles.

As used herein, an optothermal particle is any particle that can convert at least a portion of the electromagnetic radiation into thermal energy. For example, the optothermal particle can comprise a material with a high absorption efficiency at one or more wavelengths that overlaps with at least a portion of the electromagnetic radiation. In some examples, the optothermal particle can comprise a plasmonic particle and the electromagnetic radiation comprises a wavelength that overlaps with at least a portion of the plasmon resonance energy of the plasmonic particle such that the manipulation region is generated by plasmon-enhanced photothermal effects. In some examples, the optothermal particle can comprise a plasmonic particle, wherein the plasmonic particle can comprise a plasmonic material. Examples of plasmonic materials include, but are not limited to, plasmonic metals (e.g., Au, Ag, Pt, Pd, Cu, Cr, Al, or a combination thereof), plasmonic semiconductors (e.g., silicon carbide), doped semiconductors (e.g., aluminum-doped zinc oxide), transparent conducting oxides, perovskites, metal nitrides, silicides, germanides, and two-dimensional plasmonic materials (e.g., graphene), and combinations thereof. In some examples, the plasmonic particle comprises a metal selected from the group consisting of Au, Ag, Pd, Pt, Cu, Cr, Al, Mg, Ni, and combinations thereof.

The optothermal particle can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. For an anisotropic particle, the average particle size can refer to, for example, the average maximum dimension of the particle (e.g., the length of a rod shaped particle, the diagonal of a cube shape particle, the bisector of a triangular shaped particle, etc.) For an anisotropic particle, the average particle size can refer to, for example, the hydrodynamic size of the particle. Mean particle size can be measured using methods known in the art, such as evaluation by scanning electron microscopy, transmission electron microscopy, and/or dynamic light scattering.

In some examples, the optothermal particle can have an average particle size of 10 nm or more (e.g., 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 micrometers (μm) or more, 1.5 μm or more, 2 μm or more, 2.5 μm or more, 3 μm or more, 3.5 μm or more, 4 μm or more, 4.5 μm or more, 5 μm or more, 6 μm or more, 7 μm or more, 8 μm or more, 9 μm or more, 10 μm or more, 11 μm or more, 12 μm or more, 13 μm or more, 14 μm or more, or 15 μm or more). In some examples, the optothermal particle can have an average particle size of 20 μm or less (e.g., 19 μm or less, 18 μm or less, 17 μm or less, 16 μm or less, 15 μm or less, 14 μm or less, 13 μm or less, 12 μm or less, 11 μm or less, 10 μm or less, 9 μm or less, 8 μm or less, 7 μm or less, 6 μm or less, 5 μm or less, 4.5 μm or less, 4 μm or less, 3.5 μm or less, 3 μm or less, 2.5 μm or less, 2 μm or less, 1.5 μm or less, 1 μm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, or 20 nm or less). The average particle size of the optothermal particle can range from any of the minimum values described above to any of the maximum values described above. For example, the optothermal particle can have an average particle size of from 10 nanometers (nm) to 20 micrometers (μm) (e.g., from 10 nm to 100 nm, from 100 nm to 1 μm, from 1 μm to 20 μm, from 10 nm to 1 μm, from 1 μm to 20 μm, from 40 nm to 20 μm, from 10 nm to 15 μm, from 40 nm to 15 μm, or 40 nm to 3 μm).

In some examples, the optothermal particle can comprise a plurality of optothermal particles which can be substantially monodisperse. "Monodisperse" and "homogeneous size distribution," as used herein, and generally describe a population of particles where all of the particles have the same or nearly the average particle size. As used herein, a monodisperse distribution refers to particle distributions in which 80% of the distribution (e.g., 85% of the distribution, 90% of the distribution, or 95% of the distribution) lies within 25% of the average particle size (e.g., within 20% of the average particle size, within 15% of the average particle size, within 10% of the average particle size, or within 5% of the average particle size). The optothermal particle can comprise a particle of any shape (e.g., a sphere, a rod, a quadrilateral, an ellipse, a triangle, a polygon, etc.). In some examples, the optothermal particle can have an isotropic shape. In some examples, the optothermal particle can have an anisotropic shape. In some examples, the optothermal particle has a shape that is substantially spherical, rod-like, or triangular.

The size, shape, and/or composition of the optothermal particle can be selected in view of a variety of factors. In some examples, the size, shape, and/or composition of the optothermal particle can be selected such that the optical properties of the optothermal particle overlap with at least a portion of the electromagnetic radiation used to illuminate the optothermal system, such that the optothermal particle converts at least a portion of the electromagnetic radiation into thermal energy, wherein the thermal energy converted by the optothermal particle is sufficient to generate a manipulation region at a location of the surfactant layer proximate to the first location of the optothermal system; and the optothermal particle scatters at least a portion of the electromagnetic radiation, thereby producing a radiation-pressure force on the optothermal particle.

The methods can further comprise, for example, generating the manipulation region at the location of the surfactant layer proximate to the first location of the optothermal system, wherein the manipulation region has a temperature sufficient to induce a first-order phase transition from a solid phase to a liquid or quasi-liquid phase in the portion of the surfactant layer within the manipulation region; inducing the first-order phase transition in the portion of the surfactant layer within the manipulation region; producing the radiation-pressure force on the optothermal particle, wherein the radiation-pressure force is sufficient to translate the optothermal particle from a first location within the manipulation region to a second location within the manipulation region; and translating the optothermal particle from the first location within the manipulation region to the second location within the manipulation region. As used herein, "a second location" and "the second location" are meant to include any number of locations in any arrangement on the substrate. Thus, for example "a second location" includes one or more second locations. In some embodiments, the second location can comprise a plurality of locations. In some embodiments, the second location can comprise a plurality of locations arranged in an ordered array. As used herein translocating refers to any type of movement about any axis (e.g., rotation, translation, etc.) In other words, as used herein, translocation refers to a change in position and/or orientation.

For example, the manipulation region can be defined by a temperature gradient within which the temperature sufficient to induce a first-order phase transition from a solid phase to a liquid or quasi-liquid phase in the portion of the surfactant layer within the manipulation region.

The manipulation region can, for example, have an average diameter of 100 nm or more (e.g., 125 nm or more, 150 nm or more, 175 nm or more, 200 nm or more, 225 nm or more, 250 nm or more, 275 nm or more, 300 nm or more, 325 nm or more, 350 nm or more, 375 nm or more, 400 nm or more, 425 nm or more, 450 nm or more, 475 nm or more, 500 nm or more, 550 nm or more, 600 nm or more, 650 nm or more, 700 nm or more, 750 nm or more, 800 nm or more, 850 nm or more, 900 nm or more, 950 nm or more, 1 μm or more, 1.5 μm or more, 2 μm or more, 2.5 μm or more, 3 μm or more, 3.5 μm or more, 4 μm or more, 4.5 μm or more, 5 μm or more, 6 μm or more, 7 μm or more, 8 μm or more). In some examples, the manipulation region can have an average diameter or 10 μm or less (e.g., 9 μm or less, 8 μm or less, 7 μm or less, 6 μm or less, 5 μm or less, 4.5 μm or less, 4 μm or less, 3.5 μm or less, 3 μm or less, 2.5 μm or less, 2 μm or less, 1.5 μm or less, 1 μm or less, 950 nm or less, 900 nm or less, 850 nm or less, 800 nm or less, 750 nm or less, 700 nm or less, 650 nm or less, 600 nm or less, 550 nm or less, 500 nm or less, 475 nm or less, 450 nm or less, 425 nm or less, 400 nm or less, 375 nm or less, 350 nm or less, 325 nm or less, 300 nm or less, 275 nm or less, 250 nm or less, 225 nm or less, 200 nm or less, 175 nm or less, 150 nm or less, or 125 nm or less). The average diameter of the manipulation region can range from any of the minimum values described above to any of the maximum values described above. For example, the manipulation region can have an average diameter of from 100 nm to 10 μm (e.g., from 100 nm to 1 μm, from 1 μm to 10 μm from 100 nm to 500 nm, from 500 nm to 1 μm, from 1 μm to 5 μm, from 5 μm to 10 μm, from 100 nm to 5 μm, from 250 nm to 10 μm, or from 250 nm to 5 μm).

In some examples, the temperature sufficient to induce a first-order phase transition from a solid phase to a liquid or quasi-liquid phase is 350 K or more (e.g., 375 K or less, 400 K or less, 425 K or less, 450 K or less, 475 K or less, 500

K or less, 525 K or less, 550 K or less, 575 K or less, 600 K or less, 625 K or less, or 650 K or less). In some examples, the temperature sufficient to induce a first-order phase transition from a solid phase to a liquid or quasi-liquid phase is 700 K or less (e.g., 675 K or less, 650 K or less, 625 K or less, 600 K or less, 575 K or less, 550 K or less, 525 K or less, 500 K or less, 475 K or less, 450 K or less, 425 K or less, or 400 K or less). The temperature sufficient to induce a first-order phase transition from a solid phase to a liquid or quasi-liquid phase can range from any of the minimum values described above to any of the maximum values described above. For example, the temperature sufficient to induce a first-order phase transition from a solid phase to a liquid or quasi-liquid phase from 350 K to 700 K (e.g., from 350 K to 525 K, from 525 K to 700 K, from 350 K to 450 K, from 450 K to 550 K, from 550 K to 700 K, from 400 K to 700 K, from 350 K to 650 K, from 400 K to 650 K, from 400 K to 600 K, or from 350 K to 400 K).

In some examples, the optothermal particle is translated at an average speed of 0.01 µm/s or more (e.g., 0.05 µm/s or more, 0.1 µm/s or more, 0.15 µm/s or more, 0.2 µm/s or more, 0.25 µm/s or more, 0.3 µm/s or more, 0.35 µm/s or more, 0.4 µm/s or more, 0.45 µm/s or more, 0.5 µm/s or more, 0.6 µm/s or more, 0.7 µm/s or more, 0.8 µm/s or more, 0.9 µm/s or more, 1 µm/s or more, 1.5 µm/s or more, 2 µm/s or more, 2.5 µm/s or more, 3 µm/s or more, 3.5 µm/s or more, 4 µm/s or more, 4.5 µm/s or more, 5 µm/s or more, 6 µm/s or more, 7 µm/s or more, or 8 µm/s or more). In some examples, the optothermal particle is translated at an average speed of 10 µm/s or less (e.g., 9 µm/s or less, 8 µm/s or less, 7 µm/s or less, 6 µm/s or less, 5 µm/s or less, 4.5 µm/s or less, 4 µm/s or less, 3.5 µm/s or less, 3 µm/s or less, 2.5 µm/s or less, 2 µm/s or less, 1.5 µm/s or less, 1 µm/s or less, 0.9 µm/s or less, 0.8 µm/s or less, 0.7 µm/s or less, 0.6 µm/s or less, 0.5 µm/s or less, 0.45 µm/s or less, 0.4 µm/s or less, 0.35 µm/s or less, 0.3 µm/s or less, 0.25 µm/s or less, 0.2 µm/s or less, 0.15 µm/s or less, or 0.1 µm/s or less). The average speed at which the optothermal particle is translated can range from any of the minimum values described above to any of the maximum values described above. For example, the optothermal particle can be translated at an average speed of from 0.01 µm/s to 10 µm/s (e.g., from 0.01 µm/s to 5 µm/s, from 5 µm/s to 10 µm/s, from 0.01 µm/s to 0.1 µm/s, from 0.1 µm/s to 1 µm/s, from 1 µm/s to 10 µm/s, from 0.2 µm/s to 10 µm/s, from 0.01 µm/s to 8 µm/s, or from 0.2 µm/s to 8 µm/s).

In some examples, the optothermal particle is translated in an amount of time of 0.1 second or more (e.g., 0.5 seconds or more, 1 seconds or more, 1.5 seconds or more, 2 seconds or more, 2.5 seconds or more, 3 seconds or more, 3.5 seconds or more, 4 seconds or more, 4.5 seconds or more, 5 seconds or more, 6 seconds or more, 7 seconds or more, 8 seconds or more, 9 seconds or more, 10 seconds or more, 15 seconds or more, 20 seconds or more, 25 seconds or more, 30 seconds or more, 40 seconds or more, 50 seconds or more, 1 minute or more, 1.5 minutes or more, 2 minutes or more, 2.5 minutes or more, 3 minutes or more, 3.5 minutes or more, 4 minutes or more, 4.5 minutes or more, 5 minutes or more, 6 minutes or more, 7 minutes or more, or 8 minutes or more). In some examples, the optothermal particle is translated in an amount of time of 10 minutes or less (e.g., 9 minutes or less, 8 minutes or less, 7 minutes or less, 6 minutes or less, 5 minutes or less, 4.5 minutes or less, 4 minutes or less, 3.5 minutes or less, 3 minutes or less, 2.5 minutes or less, 2 minutes or less, 1.5 minutes or less, 1 minute or less, 50 seconds or less, 40 seconds or less, 30 seconds or less, 25 seconds or less, 20 seconds or less, 15 seconds or less, 10 seconds or less, 9 seconds or less, 8 seconds or less, 7 seconds or less, 6 seconds or less, 5 seconds or less, 4.5 seconds or less, 4 seconds or less, 3.5 seconds or less, 3 seconds or less, 2.5 seconds or less, 2 seconds or less, 1.5 seconds or less, or 1 second or less). The amount of time in which the optothermal particle is translated can range from any of the minimum values described above to any of the maximum values described above. For example, the optothermal particle can be translated in an amount of time from 0.1 seconds to 10 minutes (e.g., from 0.1 seconds to 1 second, from 1 second to 10 seconds, from 10 seconds to 1 minute, from 1 minute to 10 minutes, from 0.5 seconds to 10 minutes, from 0.1 seconds to 9 minutes, or from 0.5 seconds to 9 minutes).

In some examples, the optothermal particle is translated over an average distance of 10 nm or more (e.g., 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 µm or more, 1.5 µm or more, 2 µm or more, 2.5 µm or more, 3 µm or more, 3.5 µm or more, 4 µm or more, 4.5 µm or more, 5 µm or more, 6 µm or more, 7 µm or more, 8 µm or more, 9 µm or more, 10 µm or more, 15 µm or more, 20 µm or more, 25 µm or more, 30 µm or more, 35 µm or more, 40 µm or more, 45 µm or more, 50 µm or more, 60 µm or more, 70 µm or more, or 80 µm or more). In some examples, the optothermal particle is translated over an average distance of 100 µm or less (e.g., 90 µm or less, 80 µm or less, 70 µm or less, 60 µm or less, 50 µm or less, 45 µm or less, 40 µm or less, 35 µm or less, 30 µm or less, 25 µm or less, 20 µm or less, 15 µm or less, 10 µm or less, 9 µm or less, 8 µm or less, 7 µm or less, 6 µm or less, 5 µm or less, 4.5 µm or less, 4 µm or less, 3.5 µm or less, 3 µm or less, 2.5 µm or less, 2 µm or less, 1.5 µm or less, 1 µm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, or 20 nm or less). The average distance over which the optothermal particle is translated can range from any of the minimum values described above to any of the maximum values described above. For example, the optothermal particle can be translated over an average distance of from 10 nm to 100 µm (e.g., from 10 nm to 100 nm, from 100 nm to 1 µm, from 1 µm to 10 µm, from 10 µm to 100 µm, from 10 nm to 10 µm, from 50 nm to 100 µm, from 10 nm to 50 µm, or from 50 nm to 50 µm).

In some examples, the optothermal particle is not damaged during the method.

In some examples, the methods can further comprise illuminating a second location of the optothermal system with electromagnetic radiation, wherein the optothermal system further comprises: a second optothermal particle disposed on the surfactant layer, such that the surfactant layer is between the second optothermal particle and the first surface of the substrate; wherein the second optothermal particle is in thermal contact with the surfactant layer; and wherein the second location of the optothermal system includes at least a portion of the second optothermal particle such that: the second optothermal particle converts at least a portion of the electromagnetic radiation into thermal energy, wherein the thermal energy converted by the second optothermal particle is sufficient to generate a second manipulation region at a location of the surfactant layer proximate to the second location of the optothermal system; and the second optothermal particle scatters at least a portion of the electromagnetic radiation, thereby producing a radiation-pressure force on the second optothermal particle; thereby: generating the second manipulation region at the location of the surfactant layer proximate to the second location of the optothermal system, wherein the manipulation region has a temperature sufficient to induce a first-order phase transition from a solid phase to a liquid or quasi-liquid phase in the portion of the surfactant layer within the second manipulation region; inducing the first-order phase transition in the portion of the surfactant layer within the second manipulation region; producing the radiation-pressure force on the second optothermal particle, wherein the radiation-pressure force is sufficient to translate the second optothermal particle from a first location within the second manipulation region to a second location within the second manipulation region; and translating the second optothermal particle from the first location within the second manipulation region to the second location within the second manipulation region.

As used herein, "a second location" and "the second location" are meant to include any number of locations in any arrangement on the substrate. Thus, for example "a second location" includes one or more second locations. In some embodiments, the second location can comprise a plurality of locations. In some embodiments, the second location can comprise a plurality of locations arranged in an ordered array. In some examples, the substrate, the light source, the mirror, one or more of the plurality of mirrors, or a combination thereof can be translocated to illuminate the second location.

In some examples, the substrate is translocated to illuminate the second location. In some examples, the electromagnetic radiation is provided by a light source, and the light source is translocated to illuminate the second location. In some examples, the electromagnetic radiation is provided by a light source, the light source being configured to illuminate a mirror and the mirror is configured to reflect the electromagnetic radiation from the light source to illuminate the optothermal system, and the mirror is translocated to illuminate the second location. In some examples, the electromagnetic radiation is provided by a light source, the light source being configured to illuminate a plurality of mirrors and the plurality of mirrors are configured to reflect the electromagnetic radiation from the light source to illuminate the optothermal system, and one or more of the plurality of mirrors is translocated to illuminate the second location. In some examples, the electromagnetic radiation is provided by a light source, the light source being configured to illuminate a digital micromirror device comprising a plurality of mirrors and the digital micromirror device is configured to reflect the electromagnetic radiation from the light source to illuminate the optothermal system, and one or more of the plurality of mirrors is translocated to illuminate the second location.

In some examples, the methods can further comprise illuminating a third location of the optothermal system with electromagnetic radiation, wherein the third location of the optothermal system includes at least a portion of the optothermal particle, such that: the optothermal particle converts at least a portion of the electromagnetic radiation into thermal energy, wherein the thermal energy converted by the optothermal particle is sufficient to generate a third manipulation region at a location of the surfactant layer proximate to the third location of the optothermal system; and the optothermal particle scatters at least a portion of the electromagnetic radiation, thereby producing a radiation-pressure force on the optothermal particle; thereby: generating the third manipulation region at the location of the surfactant layer proximate to the third location of the optothermal system, wherein the third manipulation region has a temperature sufficient to induce a first-order phase transition from a solid phase to a liquid or quasi-liquid phase in the portion of the surfactant layer within the third manipulation region; inducing the first-order phase transition in the portion of the surfactant layer within the third manipulation region; producing the radiation-pressure force on the optothermal particle, wherein the radiation-pressure force is sufficient to translate the optothermal particle from a first location within the third manipulation region to a second location within the third manipulation region; and translating the optothermal particle from the first location within the third manipulation region to the second location within the third manipulation region.

As used herein, "a third location" and "the third location" are meant to include any number of locations in any arrangement on the substrate. Thus, for example "a third location" includes one or more third locations. In some embodiments, the third location can comprise a plurality of locations. In some embodiments, the third location can comprise a plurality of locations arranged in an ordered array. In some examples, the substrate, the light source, the mirror, one or more of the plurality of mirrors, or a combination thereof can be translocated to illuminate the third location.

In some examples, the substrate is translocated to illuminate the third location. In some examples, the electromagnetic radiation is provided by a light source, and the light source is translocated to illuminate the third location. In some examples, the electromagnetic radiation is provided by a light source, the light source being configured to illuminate a mirror and the mirror is configured to reflect the electromagnetic radiation from the light source to illuminate the optothermal system, and the mirror is translocated to illuminate the third location. In some examples, the electromagnetic radiation is provided by a light source, the light source being configured to illuminate a plurality of mirrors and the plurality of mirrors are configured to reflect the electromagnetic radiation from the light source to illuminate the optothermal system, and one or more of the plurality of mirrors is translocated to illuminate the third location. In some examples, the electromagnetic radiation is provided by a light source, the light source being configured to illuminate a digital micromirror device comprising a plurality of mirrors and the digital micromirror device is configured to reflect the electromagnetic radiation from the light source to illuminate the optothermal system, and one or more of the plurality of mirrors is translocated to illuminate the third location.

Also disclosed herein are methods comprising: illuminating a first location of an optothermal system with electromagnetic radiation; wherein the optothermal system comprises: an optothermal substrate having a first surface; a surfactant layer disposed on the first surface of the substrate, wherein the surfactant layer is a solid thin film; and a particle disposed on the surfactant layer, such that the surfactant layer is between the particle and the first surface of the substrate; wherein the first location includes at least a portion of the particle such that the particle scatters at least a portion of the electromagnetic radiation, thereby producing a radiation-pressure force on the particle; wherein the optothermal substrate converts at least a portion of the electromagnetic radiation into thermal energy, wherein the thermal energy converted by the optothermal substrate is sufficient to generate a manipulation region at a location of the surfactant layer proximate to the first location of the optothermal system; and wherein the optothermal substrate is in thermal contact with the surfactant layer; thereby: generating the manipulation region at the location of the surfactant layer proximate to the first location of the optothermal system, wherein the manipulation region has a temperature sufficient to induce a first-order phase transition from a solid phase to a liquid or quasi-liquid phase in the portion of the surfactant layer within the manipulation region; inducing the first-order phase transition in the portion of the surfactant layer within the manipulation region; producing the radiation-pressure force on the particle, wherein the radiation-pressure force is sufficient to translate the particle from a first location within the manipulation region to a second location within the manipulation region; and translating the particle from the first location within the manipulation region to the second location within the manipulation region.

As used herein, an optothermal substrate is any substrate that can convert at least a portion of the electromagnetic radiation into thermal energy. For example, the optothermal substrate can comprise a material with a high absorption efficiency at one or more wavelengths that overlaps with at least a portion of the electromagnetic radiation. The optothermal substrate can, for example, comprise a plasmonic substrate, a metal substrate, a dielectric substrate, or a combination thereof.

In some examples, the optothermal substrate comprises a plasmonic substrate and the electromagnetic radiation comprises a wavelength that overlaps with at least a portion of the plasmon resonance energy of the plasmonic substrate such that the manipulation region is generated by plasmon-enhanced photothermal effects.

In some examples, the plasmonic substrate comprises a plurality of plasmonic particles. In some examples, the plurality of plasmonic particles can comprise a plasmonic material. Examples of plasmonic materials include, but are not limited to, plasmonic metals (e.g., Au, Ag, Pt, Pd, Cu, Cr, Al, or a combination thereof), plasmonic semiconductors (e.g., silicon carbide), doped semiconductors (e.g., aluminum-doped zinc oxide), transparent conducting oxides, perovskites, metal nitrides, silicides, germanides, and two-dimensional plasmonic materials (e.g., graphene), and combinations thereof.

In some examples, the plurality of plasmonic particles comprise a plurality of metal particles. In some examples, the plurality of metal particles comprise a metal selected from the group consisting of Au, Ag, Pd, Pt, Cu, Cr, Al, Mg, Ni, and combinations thereof.

The plurality of plasmonic particles can have an average particle size. In some examples, the plurality of plasmonic particles have an average particle size of 10 nm or more (e.g., 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, or 250 nm or more). In some examples, the plurality of plasmonic particles have an average particle size of 300 nm or less (e.g., 275 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, or 20 nm or less). The average particle size of the plurality of plasmonic particles can range from any of the minimum values described above to any of the maximum values described above. For example, the plurality of plasmonic particles can have an average particle size of from 10 nm to 300 nm (e.g., from 10 nm to 150 nm, from 10 nm to 300 nm, from 10 nm to 100 nm, from 100 nm to 200 nm, from 200 nm to 300 nm, from 10 nm to 50 nm, from 10 nm to 250 nm, from 30 nm to 300 nm, or from 30 nm to 250 nm). In some examples, the plurality of plasmonic particles can be substantially monodisperse.

The plurality of plasmonic particles can comprise particles of any shape (e.g., a sphere, a rod, a quadrilateral, an ellipse, a triangle, a polygon, etc.). In some examples, the plurality of plasmonic particles can have an isotropic shape. In some examples, the plurality of plasmonic particles can have an anisotropic shape. In some examples, the plurality of plasmonic particles are substantially spherical.

The size, shape, and/or composition of the plurality of plasmonic particles can be selected in view of a variety of factors. In some examples, the size, shape, and/or composition of the plurality of plasmonic particles can be selected to maximize the electromagnetic field enhancement. For example, the size, shape, and/or composition of the plurality of plasmonic particles can be selected such that the intensity of an incident electromagnetic field is enhanced by a factor of 5 or more by the plurality of plasmonic particles (e.g., 10 or more, 20 or more, 30 or more, 40 or more, 50 or more, 60 or more 70 or more, 80 or more, 90 or more, or 100 or more). In some examples, the size, shape, and/or composition of the plurality of plasmonic particles can be selected such that the plasmon resonance energy of the plasmonic substrate overlaps with at least a portion of the electromagnetic radiation used to illuminate the optothermal substrate.

The methods can further comprise, for example, making the plasmonic substrate by depositing the plurality of plasmonic particles on a substrate. Depositing the plurality of plasmonic particles can, for example, comprise printing, lithographic deposition, electron beam deposition, thermal deposition, spin coating, drop-casting, zone casting, dip coating, blade coating, spraying, vacuum filtration, or combinations thereof.

The methods can further comprise, for example, making the plasmonic substrate by thermally annealing a film of a plasmonic metal deposited on a substrate, thereby forming the plurality of plasmonic particles on the substrate. In some examples, the methods can further comprise depositing the film of the plasmonic metal on the substrate. The film of plasmonic metal can be deposited on the substrate, for example, by thin film processing techniques, such as sputtering, pulsed layer deposition, molecular beam epitaxy, evaporation, atomic layer deposition, or combinations thereof.

In some examples, the film of the plasmonic metal has an average thickness of 2 nm or more (e.g., 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 110 nm or more, 120 nm or more, 130 nm or more, 140 nm or more, 150 nm or more, 160 nm or more, 170 nm or more, or 180 nm or more). In some examples, the film of the plasmonic metal can have an average thickness of 200 nm (e.g., 190 nm or less, 180 nm or less, 170 nm or less, 160 nm or less, 150 nm or less, 140 nm or less, 130 nm or less, 120 nm or less, 110 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, or 5 nm or less). The average thickness of the film of the plasmonic metal can range from any of the minimum values described above to any of the maximum values described above. For example, the film of the plasmonic metal can have an average thickness of from 2 nm to 200 nm (e.g., from 2 nm to 100 nm, from 100 nm to 200 nm, from 2 nm to 50 nm, from 50 nm to 100 nm, from 100 nm to 150 nm, from 150 nm to 200 nm, from 2 nm to 150 nm, from 5 nm to 200 nm, or from 5 nm to 150 nm).

Thermally annealing the film can, for example, comprise heating the film at a temperature of 400° C. or more (e.g., 410° C. or more, 420° C. or more, 430° C. or more, 440° C. or more, 450° C. or more, 460° C. or more, 470° C. or more, 480° C. or more, 490° C. or more, 500° C. or more, 510° C. or more, 520° C. or more, 530° C. or more, 540° C. or more, 550° C. or more, 560° C. or more, 570° C. or more, or 580° C. or more). In some examples, thermally annealing the film can comprise heating the film at a temperature of 600° C. or less (e.g., 590° C. or less, 580° C. or less, 570° C. or less, 560° C. or less, 550° C. or less, 540° C. or less, 530° C. or less, 520° C. or less, 510° C. or less, 500° C. or less, 490° C. or less, 480° C. or less, 470° C. or less, 460° C. or less, 450° C. or less, 440° C. or less, 430° C. or less, or 420° C. or less). The temperature at which the film is heated for thermal annealing can range from any of the minimum values described above to any of the maximum values described above. For example, thermally annealing the film can comprise heating the film at a temperature of from 400° C. to 600° C. (e.g., from 400° C. to 500° C., from 500° C. to 600° C., from 400° C. to 450° C., from 450° C. to 500° C., from 500° C. to 550° C., from 550° C. to 600° C., from 450° C. to 600° C., from 400° C. to 550° C., or from 520° C. to 580° C.).

In some examples, the film can be thermally annealed for 0.5 hours or more (e.g., 1 hour or more, 1.5 hours or more, 2 hours or more, 2.5 hours or more, 3 hours or more, 3.5 hours or more, 4 hours or more, 4.5 hours or more, 5 hours or more, 6 hours or more, 7 hours or more, 8 hours or more, 9 hours or more, 10 hours or more, 11 hours or more, 12 hours or more, 14 hours or more, 16 hours or more, 18 hours or more, or 20 hours or more). In some examples, the film can be thermally annealed for 24 hours or less (e.g., 22 hours or less, 20 hours or less, 18 hours or less, 16 hours or less, 14 hours or less, 12 hours or less, 11 hours or less, 10 hours or less, 9 hours or less, 8 hours or less, 7 hours or less, 6 hours or less, 5 hours or less, 4.5 hours or less, 4 hours or less, 3.5 hours or less, 3 hours or less, 2.5 hours or less, 2 hours or less, or 1.5 hours or less). The amount of time that the film is thermally annealed can range from any of the minimum values described above to any of the maximum values described above. For example, the film can be thermally annealed for from 0.5 hour to 24 hours (e.g., from 0.5 hours to 12 hours, from 12 hours to 24 hours, from 0.5 hours to 6 hours, from 6 hours to 12 hours, from 12 hours to 18 hours, from 18 hours to 24 hours, from 1 hour to 24 hours, from 0.5 hours to 20 hours, or from 1 hour to 20 hours).

In some examples, the optothermal substrate can comprise a metal film, such as a metal film deposited on a substrate. The metal film can, for example, comprise a metal selected from the group consisting of Mg, Al, Ti, Cr, Mn, Fe, Co, Ni, Cu, Mo, Rh, Pd, Ag, Cd, W, Pt, Au, Pb, and combinations thereof. In some examples, the metal film can comprise a metal selected from the group consisting of Al, Ti, Cr, Mn, Fe, Co, Ni, Cu, Mo, Pd, Ag, Cd, Pt, Au, and combinations thereof.

In some examples, the methods can further comprise making the optothermal substrate by depositing the metal film on a substrate. The metal film can be deposited on the substrate, for example, by thin film processing techniques, such as sputtering, pulsed layer deposition, molecular beam epitaxy, evaporation, atomic layer deposition, or combinations thereof. The metal film can, for example, have an average thickness of 2 nm or more (e.g., 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 110 nm or more, 120 nm or more, 130 nm or more, 140 nm or more, 150 nm or more, 160 nm or more, 170 nm or more, or 180 nm or more). In some examples, the metal film can have an average thickness of 200 nm (e.g., 190 nm or less, 180 nm or less, 170 nm or less, 160 nm or less, 150 nm or less, 140 nm or less, 130 nm or less, 120 nm or less, 110 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, or 5 nm or less). The average thickness of the metal film can range from any of the minimum values described above to any of the maximum values described above. For example, the metal film can have an average thickness of from 2 nm to 200 nm (e.g., from 2 nm to 100 nm, from 100 nm to 200 nm, from 2 nm to 50 nm, from 50 nm to 100 nm, from 100 nm to 150 nm, from 150 nm to 200 nm, from 2 nm to 150 nm, from 5 nm to 200 nm, or from 5 nm to 150 nm).

The particle disposed on the surfactant layer can comprise any material consistent with the compositions, methods, and systems disclosed herein. As used herein, "a particle" and "the particle" are meant to include any number of particles. Thus, for example, "a particle" includes one or more particles. In some examples, the particle includes a plurality of particles.

In some examples, the particle comprises a metal particle, a semiconductor particle, an inorganic particle, or a combination thereof. In some examples, the particle comprises a semiconductor particle, the semiconductor particle comprising a semiconductor selected from the group consisting of GeAs, GaAs, $TiO_2$, Si, and combinations thereof. In some examples, the particle comprises an inorganic particle comprising an inorganic perovskite. In some examples, the particle comprises an inorganic particle comprising barium titanate, titanium nitride, or a combination thereof.

The particle can have an average particle size. In some examples, the particle has an average particle size of 10 nm or more (e.g., 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 micrometers (μm) or more, 1.5 μm or more, 2 μm or more, 2.5 μm or more, 3 μm or more, 3.5 μm or more, 4 μm or more, 4.5 μm or more, 5 μm or more, 6 μm or more, 7 μm or more, 8 μm or more, 9 μm or more, 10 μm or more, 11 μm or more, 12 μm or more, 13 μm or more, 14 μm or more, or 15 μm or more). In some examples, the particle can have an average particle size of 20 μm or less (e.g., 19 μm or less, 18 μm or less, 17 μm or less, 16 μm or less, 15 μm or less, 14 μm or less, 13 μm or less, 12 μm or less, 11 μm or less, 10 μm or less, 9 μm or less, 8 μm or less, 7 μm or less, 6 μm or less, 5 μm or less, 4.5 μm or less, 4 μm or less, 3.5 μm or less, 3 μm or less, 2.5 μm or less, 2 μm or less, 1.5 μm or less, 1 μm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, or 20 nm or less). The average particle size of the particle can range from any of the minimum values described above to any of the maximum values described above. For example, the particle can have an average particle size of from 10 nanometers (nm) to 20 micrometers (μm) (e.g., from 10 nm to 100 nm, from 100 nm to 1 μm, from 1 μm to 20 μm, from 10 nm to 1 μm, from 1 μm to 20 μm, from 40 nm to 20 μm, from 10 nm to 15 μm, from 40 nm to 15 μm, or 40 nm to 3 μm). In some examples, the particle can comprise a plurality of particles, which can be substantially monodisperse.

The particle can comprise a particle of any shape (e.g., a sphere, a rod, a quadrilateral, an ellipse, a triangle, a polygon, etc.). In some examples, the particle can have an isotropic shape. In some examples, the particle can have an anisotropic shape. In some examples, the particle has a shape that is substantially spherical, rod-like, or triangular.

The size, shape, and/or composition of the particle can be selected in view of a variety of factors. In some examples, the size, shape, and/or composition of the particle can be selected such that the optical properties of the particle overlap with at least a portion of the electromagnetic radiation used to illuminate the optothermal system, such that the particle scatters at least a portion of the electromagnetic radiation, thereby producing a radiation-pressure force on the particle.

In some examples, the particle is translated at an average speed of 0.01 μm/s or more (e.g., 0.05 μm/s or more, 0.1 μm/s or more, 0.15 μm/s or more, 0.2 μm/s or more, 0.25 μm/s or more, 0.3 μm/s or more, 0.35 μm/s or more, 0.4 μm/s or more, 0.45 μm/s or more, 0.5 μm/s or more, 0.6 μm/s or more, 0.7 μm/s or more, 0.8 μm/s or more, 0.9 μm/s or more, 1 μm/s or more, 1.5 μm/s or more, 2 μm/s or more, 2.5 μm/s or more, 3 μm/s or more, 3.5 μm/s or more, 4 μm/s or more, 4.5 μm/s or more, 5 μm/s or more, 6 μm/s or more, 7 μm/s or more, or 8 μm/s or more). In some examples, the particle is translated at an average speed of 10 μm/s or less (e.g., 9 μm/s or less, 8 μm/s or less, 7 μm/s or less, 6 μm/s or less, 5 μm/s or less, 4.5 μm/s or less, 4 μm/s or less, 3.5 μm/s or less, 3 μm/s or less, 2.5 μm/s or less, 2 μm/s or less, 1.5 μm/s or less, 1 μm/s or less, 0.9 μm/s or less, 0.8 μm/s or less, 0.7 μm/s or less, 0.6 μm/s or less, 0.5 μm/s or less, 0.45 μm/s or less, 0.4 μm/s or less, 0.35 μm/s or less, 0.3 μm/s or less, 0.25 μm/s or less, 0.2 μm/s or less, 0.15 μm/s or less, or 0.1 μm/s or less). The average speed at which the particle is translated can range from any of the minimum values described above to any of the maximum values described above. For example, the particle can be translated at an average speed of from 0.01 μm/s to 10 μm/s (e.g., from 0.01 μm/s to 5 μm/s, from 5 μm/s to 10 μm/s, from 0.01 μm/s to 0.1 μm/s, from 0.1 μm/s to 1 μm/s, from 1 μm/s to 10 μm/s, from 0.2 μm/s to 10 μm/s, from 0.01 μm/s to 8 μm/s, or from 0.2 μm/s to 8 μm/s).

In some examples, the particle is translated in an amount of time of 0.1 second or more (e.g., 0.5 seconds or more, 1 seconds or more, 1.5 seconds or more, 2 seconds or more, 2.5 seconds or more, 3 seconds or more, 3.5 seconds or more, 4 seconds or more, 4.5 seconds or more, 5 seconds or more, 6 seconds or more, 7 seconds or more, 8 seconds or more, 9 seconds or more, 10 seconds or more, 15 seconds or more, 20 seconds or more, 25 seconds or more, 30 seconds or more, 40 seconds or more, 50 seconds or more, 1 minute or more, 1.5 minutes or more, 2 minutes or more, 2.5 minutes or more, 3 minutes or more, 3.5 minutes or more, 4 minutes or more, 4.5 minutes or more, 5 minutes or more, 6 minutes or more, 7 minutes or more, or 8 minutes or more). In some examples, the particle is translated in an amount of time of 10 minutes or less (e.g., 9 minutes or less, 8 minutes or less, 7 minutes or less, 6 minutes or less, 5 minutes or less, 4.5 minutes or less, 4 minutes or less, 3.5 minutes or less, 3 minutes or less, 2.5 minutes or less, 2 minutes or less, 1.5 minutes or less, 1 minute or less, 50 seconds or less, 40 seconds or less, 30 seconds or less, 25 seconds or less, 20 seconds or less, 15 seconds or less, 10 seconds or less, 9 seconds or less, 8 seconds or less, 7 seconds or less, 6 seconds or less, 5 seconds or less, 4.5 seconds or less, 4 seconds or less, 3.5 seconds or less, 3 seconds or less, 2.5 seconds or less, 2 seconds or less, 1.5 seconds or less, or 1 second or less). The amount of time in which the particle is translated can range from any of the minimum values described above to any of the maximum values described above. For example, the particle can be translated in an amount of time from 0.1 seconds to 10 minutes (e.g., from 0.1 seconds to 1 second, from 1 second to 10 seconds, from 10 seconds to 1 minute, from 1 minute to 10 minutes, from 0.5 seconds to 10 minutes, from 0.1 seconds to 9 minutes, or from 0.5 seconds to 9 minutes).

In some examples, the particle is translated over an average distance of 10 nm or more (e.g., 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 μm or more, 1.5 μm or more, 2 μm or more, 2.5 μm or more, 3 μm or more, 3.5 μm or more, 4 μm or more, 4.5 μm or more, 5 μm or more, 6 μm or more, 7 μm or more, 8 μm or more, 9 μm or more, 10 μm or more, 15 μm or more, 20 μm or more, 25 μm or more, 30 μm or more, 35 μm or more, 40 μm or more, 45 μm or more, 50 μm or more, 60 μm or more, 70 μm or more, or 80 μm or more). In some examples, the particle is translated over an average distance of 100 μm or less (e.g., 90 μm or less, 80 μm or less, 70 μm or less, 60 μm or less, 50 μm or less, 45 μm or less, 40 μm or less, 35 μm or less, 30 μm or less, 25 μm or less, 20 μm or less, 15 μm or less, 10 μm or less, 9 μm or less, 8 μm or less, 7 μm or less, 6 μm or less, 5 μm or less, 4.5 μm or less, 4 μm or less, 3.5 μm or less, 3 μm or less, 2.5 μm or less, 2 μm or less, 1.5 μm or less, 1 μm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, or 20 nm or less). The average distance over which the particle is translated can range from any of the minimum values described above to any of the maximum values described above. For example, the particle can be translated over an average distance of from 10 nm to 100 µm (e.g., from 10 nm to 100 nm, from 100 nm to 1 µm, from 1 µm to 10 µm, from 10 µm to 100 µm, from 10 nm to 10 µm, from 50 nm to 100 µm, from 10 nm to 50 µm, or from 50 nm to 50 µm).

In some examples, the particle is not damaged during the method.

In some examples, the methods further comprise illuminating a second location of the optothermal system with electromagnetic radiation, wherein the optothermal system further comprises: a second particle disposed on the surfactant layer, such that the surfactant layer is between the second particle and the first surface of the substrate; wherein the second location includes at least a portion of the second particle such that the second particle scatters at least a portion of the electromagnetic radiation, thereby producing a radiation-pressure force on the second particle; and wherein the optothermal substrate converts at least a portion of the electromagnetic radiation into thermal energy, wherein the thermal energy converted by the optothermal substrate is sufficient to generate a second manipulation region at a location of the surfactant layer proximate to the second location of the optothermal system; thereby: generating the second manipulation region at the location of the surfactant layer proximate to the second location of the optothermal system, wherein the second manipulation region has a temperature sufficient to induce a first-order phase transition from a solid phase to a liquid or quasi-liquid phase in the portion of the surfactant layer within the second manipulation region; inducing the first-order phase transition in the portion of the surfactant layer within the second manipulation region; producing the radiation-pressure force on the second particle, wherein the radiation-pressure force is sufficient to translate the second particle from a first location within the second manipulation region to a second location within the second manipulation region; and translating the second particle from the first location within the second manipulation region to the second location within the second manipulation region.

In some examples, the optothermal substrate is translocated to illuminate the second location. In some examples, the electromagnetic radiation is provided by a light source, and the light source is translocated to illuminate the second location. In some examples, the electromagnetic radiation is provided by a light source, the light source being configured to illuminate a mirror and the mirror is configured to reflect the electromagnetic radiation from the light source to illuminate the optothermal system, and the mirror is translocated to illuminate the second location. In some examples, the electromagnetic radiation is provided by a light source, the light source being configured to illuminate a plurality of mirrors and the plurality of mirrors are configured to reflect the electromagnetic radiation from the light source to illuminate the optothermal system, and one or more of the plurality of mirrors is translocated to illuminate the second location. In some examples, the electromagnetic radiation is provided by a light source, the light source being configured to illuminate a digital micromirror device comprising a plurality of mirrors and the digital micromirror device is configured to reflect the electromagnetic radiation from the light source to illuminate the optothermal system, and one or more of the plurality of mirrors is translocated to illuminate the second location.

In some examples, the methods can further comprise illuminating a third location of the optothermal system with electromagnetic radiation, wherein the third location of the optothermal system includes at least a portion of the particle, such that: wherein the particle scatters at least a portion of the electromagnetic radiation, thereby producing a radiation-pressure force on the particle; and wherein the optothermal substrate converts at least a portion of the electromagnetic radiation into thermal energy, wherein the thermal energy converted by the optothermal substrate is sufficient to generate a third manipulation region at a location of the surfactant layer proximate to the third location of the optothermal system; thereby: generating the third manipulation region at the location of the surfactant layer proximate to the third location of the optothermal system, wherein the third manipulation region has a temperature sufficient to induce a first-order phase transition from a solid phase to a liquid or quasi-liquid phase in the portion of the surfactant layer within the third manipulation region; inducing the first-order phase transition in the portion of the surfactant layer within the third manipulation region; producing the radiation-pressure force on the particle, wherein the radiation-pressure force is sufficient to translate the particle from a first location within the third manipulation region to a second location within the third manipulation region; and translating the particle from the first location within the third manipulation region to the second location within the third manipulation region.

In some examples, the optothermal substrate is translocated to illuminate the third location. In some examples, the electromagnetic radiation is provided by a light source, and the light source is translocated to illuminate the third location. In some examples, the electromagnetic radiation is provided by a light source, the light source being configured to illuminate a mirror and the mirror is configured to reflect the electromagnetic radiation from the light source to illuminate the optothermal system, and the mirror is translocated to illuminate the third location. In some examples, the electromagnetic radiation is provided by a light source, the light source being configured to illuminate a plurality of mirrors and the plurality of mirrors are configured to reflect the electromagnetic radiation from the light source to illuminate the optothermal system, and one or more of the plurality of mirrors is translocated to illuminate the third location. In some examples, the electromagnetic radiation is provided by a light source, the light source being configured to illuminate a digital micromirror device comprising a plurality of mirrors and the digital micromirror device is configured to reflect the electromagnetic radiation from the light source to illuminate the optothermal system, and one or more of the plurality of mirrors is translocated to illuminate the third location.

Also disclosed herein are methods comprising illuminating a first location of an optothermal system with electromagnetic radiation; wherein the optothermal system comprises: an optothermal substrate having a first surface; a surfactant layer disposed on the first surface of the substrate, wherein the surfactant layer is a solid thin film; and an optothermal particle disposed on the surfactant layer, such that the surfactant layer is between the optothermal particle and the first surface of the substrate; wherein the optothermal substrate and the optothermal particle are in thermal contact with the surfactant layer; wherein the first location includes at least a portion of the optothermal particle such that the optothermal particle scatters at least a portion of the electromagnetic radiation, thereby producing a radiation-pressure force on the optothermal particle; wherein the optothermal substrate and the optothermal particle each converts at least a portion of the electromagnetic radiation into thermal energy; wherein the thermal energy converted by the optothermal substrate, the optothermal particle, or a combination thereof is sufficient to generate a manipulation region at a location of the surfactant layer proximate to the first location of the optothermal system; thereby: generating the manipulation region at the location of the surfactant layer proximate to the first location of the optothermal system, wherein the manipulation region has a temperature sufficient to induce a first-order phase transition from a solid phase to a liquid or quasi-liquid phase in the portion of the surfactant layer within the manipulation region; inducing the first-order phase transition in the portion of the surfactant layer within the manipulation region; producing the radiation-pressure force on the optothermal particle, wherein the radiation-pressure force is sufficient to translate the optothermal particle from a first location within the manipulation region to a second location within the manipulation region; and translating the optothermal particle from the first location within the manipulation region to the second location within the manipulation region.

In some examples, the methods can further comprise illuminating a second location of the optothermal system with electromagnetic radiation, wherein the optothermal system further comprises: a second optothermal particle disposed on the surfactant layer, such that the surfactant layer is between the second optothermal particle and the first surface of the substrate; wherein the optothermal substrate and the second optothermal particle are in thermal contact with the surfactant layer; wherein the first location includes at least a portion of the second optothermal particle such that the second optothermal particle scatters at least a portion of the electromagnetic radiation, thereby producing a radiation-pressure force on the second optothermal particle; wherein the optothermal substrate and the second optothermal particle each converts at least a portion of the electromagnetic radiation into thermal energy; wherein the thermal energy converted by the optothermal substrate, the second optothermal particle, or a combination thereof is sufficient to generate a second manipulation region at a location of the surfactant layer proximate to the second location of the optothermal system; thereby: generating the second manipulation region at the location of the surfactant layer proximate to the second location of the optothermal system, wherein the second manipulation region has a temperature sufficient to induce a first-order phase transition from a solid phase to a liquid or quasi-liquid phase in the portion of the surfactant layer within the second manipulation region; inducing the first-order phase transition in the portion of the surfactant layer within the second manipulation region; producing the radiation-pressure force on the second optothermal particle, wherein the radiation-pressure force is sufficient to translate the second optothermal particle from a first location within the second manipulation region to a second location within the second manipulation region; and translating the second optothermal particle from the first location within the second manipulation region to the second location within the second manipulation region.

In some examples, the optothermal substrate is translocated to illuminate the second location. In some examples, the electromagnetic radiation is provided by a light source, and the light source is translocated to illuminate the second location. In some examples, the electromagnetic radiation is provided by a light source, the light source being configured to illuminate a mirror and the mirror is configured to reflect the electromagnetic radiation from the light source to illuminate the optothermal system, and the mirror is translocated to illuminate the second location. In some examples, the electromagnetic radiation is provided by a light source, the light source being configured to illuminate a plurality of mirrors and the plurality of mirrors are configured to reflect the electromagnetic radiation from the light source to illuminate the optothermal system, and one or more of the plurality of mirrors is translocated to illuminate the second location. In some examples, the electromagnetic radiation is provided by a light source, the light source being configured to illuminate a digital micromirror device comprising a plurality of mirrors and the digital micromirror device is configured to reflect the electromagnetic radiation from the light source to illuminate the optothermal system, and one or more of the plurality of mirrors is translocated to illuminate the second location.

In some examples, the methods can further comprise illuminating a third location of the optothermal system with electromagnetic radiation, wherein the third location of the optothermal system includes at least a portion of the optothermal particle, such that: the optothermal particle scatters at least a portion of the electromagnetic radiation, thereby producing a radiation-pressure force on the optothermal particle; wherein the optothermal substrate and the optothermal particle each converts at least a portion of the electromagnetic radiation into thermal energy; wherein the thermal energy converted by the optothermal substrate, the optothermal particle, or a combination thereof is sufficient to generate a third manipulation region at a location of the surfactant layer proximate to the third location of the optothermal system; thereby: generating the third manipulation region at the location of the surfactant layer proximate to the third location of the optothermal system, wherein the third manipulation region has a temperature sufficient to induce a first-order phase transition from a solid phase to a liquid or quasi-liquid phase in the portion of the surfactant layer within the third manipulation region; inducing the first-order phase transition in the portion of the surfactant layer within the third manipulation region; producing the radiation-pressure force on the optothermal particle, wherein the radiation-pressure force is sufficient to translate the optothermal particle from a first location within the third manipulation region to a second location within the third manipulation region; and translating the optothermal particle from the first location within the third manipulation region to the second location within the third manipulation region.

In some examples, the optothermal substrate is translocated to illuminate the third location. In some examples, the electromagnetic radiation is provided by a light source, and the light source is translocated to illuminate the third location. In some examples, the electromagnetic radiation is provided by a light source, the light source being configured to illuminate a mirror and the mirror is configured to reflect the electromagnetic radiation from the light source to illuminate the optothermal system, and the mirror is translocated to illuminate the third location. In some examples, the electromagnetic radiation is provided by a light source, the light source being configured to illuminate a plurality of mirrors and the plurality of mirrors are configured to reflect the electromagnetic radiation from the light source to illuminate the optothermal system, and one or more of the plurality of mirrors is translocated to illuminate the third location. In some examples, the electromagnetic radiation is provided by a light source, the light source being configured to illuminate a digital micromirror device comprising a plurality of mirrors and the digital micromirror device is configured to reflect the electromagnetic radiation from the light source to illuminate the optothermal system, and one or more of the plurality of mirrors is translocated to illuminate the third location.

In some examples, any of the methods described herein can further comprise removing the illumination such that the portion of the surfactant layer within the first manipulation region, the second manipulation region, the third manipulation region, or a combination thereof re-solidifies, thereby forming a patterned optothermal system. In some examples, the methods can further comprise removing the surfactant layer from the patterned optothermal system. For example, removing the surfactant layer can comprise dissolving the surfactant layer in a solvent.

Also disclosed herein are patterned optothermal systems made by any of the methods described herein.

Also disclosed herein are methods of use of any of the patterned optothermal systems described herein. For example, the patterned optothermal systems can used for chemical or biological sensing. In some examples, the patterned optothermal system is used as a chiral sensor. In some examples, the patterned optothermal system is used in optical devices, electronic devices, optoelectronic devices, or combinations thereof. In some examples, the patterned optothermal system is used in surface-enhanced Raman spectroscopy (SERS), surface-enhanced infrared Raman spectroscopy (SEIRS), or a combination thereof. In some examples, the patterned optothermal system can be used in an optical waveguide, an optical sensor, an optical nanocircuit, an optical metamolecule sensing, or a combination thereof.

Also disclosed herein are methods of making any of the optothermal systems described herein. For example, the methods can comprise depositing the surfactant layer on the substrate or optothermal substrate. Depositing the surfactant layer can comprise, in some examples, printing, spin coating, drop-casting, zone casting, dip coating, blade coating, spraying, vacuum filtration, slot die coating, curtain coating, or combinations thereof. In some examples, the methods can further comprise depositing the particle or optothermal particle on the substrate or optothermal substrate. Depositing the particle or optothermal particle can, for example, comprise lithographic deposition, such as electron beam lithography, nanoimprinting, focused ion beam lithography, printing, spin coating, drop-casting, zone casting, dip coating, blade coating, spraying, vacuum filtration, slot die coating, curtain coating, or combinations thereof.

Also disclosed herein are systems comprising any of the optothermal systems described herein and a light source configured to illuminate the optothermal system. In some examples, the systems can further comprise a means for translocating the substrate or the optothermal substrate; the light source; or a combination thereof.

In some examples, the systems can further comprise an instrument configured to capture an electromagnetic signal from the optothermal system. The instrument can, for example, comprise a camera, an optical microscope, an electron microscope, a spectrometer, or combinations thereof. Examples of spectrometers include, but are not limited to, Raman spectrometers, UV-vis absorption spectrometers, IR absorption spectrometers, fluorescence spectrometers, and combinations thereof.

In some examples, the systems can further comprise a first lens. The first lens can be any type of lens, such as a simple lens, a compound lens, a spherical lens, a toric lens, a biconvex lens, a plano-convex lens, a plano-concave lens, a negative meniscus lens, a positive meniscus lens, a biconcave lens, a converging lens, a diverging lens, a cylindrical lens, a Fresnel lens, a lenticular lens, or a gradient index lens.

In some examples, the systems can further comprise a mirror. In some examples, the system can further comprise a means for translocating the mirror.

In some examples, the mirror can comprise a plurality of mirrors. In some examples, the system can comprise a digital micromirror device comprising a plurality of mirrors. In some examples, the system can further comprise a means for translocating one or more of the plurality of mirrors.

Figure 24:
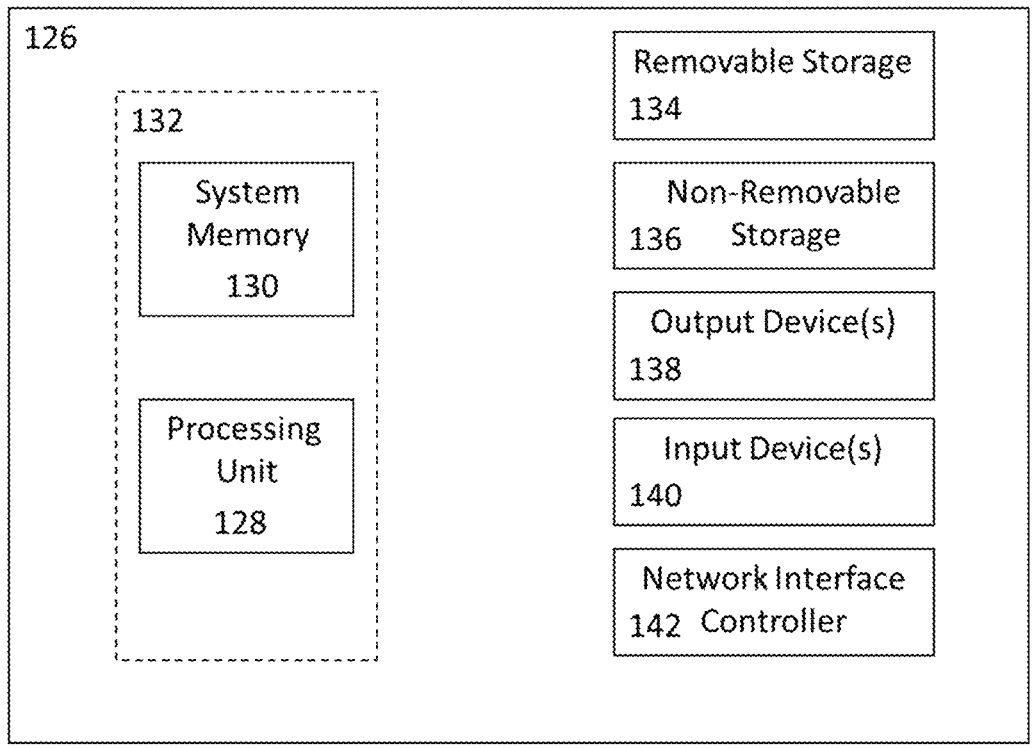
FIG. 24 is a schematic of an exemplary computing device.

In some examples, the systems can further comprise a computing device 126 configured to receive and process electromagnetic signals from the instrument. FIG. 24 illustrates an example computing device 126 upon which examples disclosed herein may be implemented. The computing device 126 can include a bus or other communication mechanism for communicating information among various components of the computing device 126. In its most basic configuration, computing device 126 typically includes at least one processing unit 128 (a processor) and system memory 130. Depending on the exact configuration and type of computing device, system memory 130 may be volatile (such as random access memory (RAM)), non-volatile (such as read-only memory (ROM), flash memory, etc.), or some combination of the two. This most basic configuration is illustrated in FIG. 24 by a dashed line 132. The processing unit 128 may be a standard programmable processor that performs arithmetic and logic operations necessary for operation of the computing device 126.

The computing device 126 can have additional features/functionality. For example, computing device 126 may include additional storage such as removable storage 134 and non-removable storage 136 including, but not limited to, magnetic or optical disks or tapes. The computing device 126 can also contain network connection(s) 142 that allow the device to communicate with other devices. The computing device 126 can also have input device(s) 140 such as a keyboard, mouse, touch screen, antenna or other systems configured to communicate with the camera in the system described above, etc. Output device(s) 138 such as a display, speakers, printer, etc. may also be included. The additional devices can be connected to the bus in order to facilitate communication of data among the components of the computing device 126.

The processing unit 128 can be configured to execute program code encoded in tangible, computer-readable media. Computer-readable media refers to any media that is capable of providing data that causes the computing device 126 (i.e., a machine) to operate in a particular fashion. Various computer-readable media can be utilized to provide instructions to the processing unit 128 for execution. Common forms of computer-readable media include, for example, magnetic media, optical media, physical media, memory chips or cartridges, a carrier wave, or any other medium from which a computer can read. Example computer-readable media can include, but is not limited to, volatile media, non-volatile media and transmission media. Volatile and non-volatile media can be implemented in any method or technology for storage of information such as computer readable instructions, data structures, program modules or other data and common forms are discussed in detail below. Transmission media can include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EE-PROM), flash memory or other memory technology, CD-ROM, digital versatile disks (DVD) or other optical storage, magnetic cassettes, magnetic tape, magnetic disk storage or other magnetic storage devices.

In an example implementation, the processing unit 128 can execute program code stored in the system memory 130. For example, the bus can carry data to the system memory 130, from which the processing unit 128 receives and executes instructions. The data received by the system memory 130 can optionally be stored on the removable storage 134 or the non-removable storage 136 before or after execution by the processing unit 128.

The computing device 126 typically includes a variety of computer-readable media. Computer-readable media can be any available media that can be accessed by device 118 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 130, removable storage 134, and non-removable storage 136 are all examples of computer storage media. Computer storage media include, but are not limited to, RAM, ROM, electrically erasable program read-only memory (EE-PROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 126. Any such computer storage media can be part of computing device 126.

It should be understood that the various techniques described herein can be implemented in connection with hardware or software or, where appropriate, with a combination thereof. Thus, the methods, systems, and associated signal processing of the presently disclosed subject matter, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs can implement or utilize the processes described in connection with the presently disclosed subject matter, e.g., through the use of an application programming interface (API), reusable controls, or the like. Such programs can be implemented in a high level procedural or object-oriented programming language to communicate with a computer system. However, the program(s) can be implemented in assembly or machine language, if desired. In any case, the language can be a compiled or interpreted language and it may be combined with hardware implementations.

In certain examples, the system memory 130 comprises computer-executable instructions stored thereon that, when executed by the processor 128, cause the processor 128 to receive an electromagnetic signal from the instrument; process the electromagnetic signal to obtain a characteristic of the optothermal system; and output the characteristic of the optothermal system.

The analysis of signals captured by the instrument can be carried out in whole or in part on one or more computing device. For example, the system may comprise one or more additional computing device.

In some examples, the electromagnetic signal received by the processor from the instrument can comprise an image, a spectrum (e.g., Raman, UV-vis, IR, fluorescence), a micrograph, or combinations thereof. The characteristic of the optothermal system can comprise, for example, the presence, location, composition, size, shape, and/or quantity of particle or optothermal particle on the substrate of optothermal substrate; the presence, location, and/or composition of the substrate or optothermal substrate; or combinations thereof. In some examples, the characteristic of the optothermal system can be monitored over time, for example, to identify that the particle or optothermal particle has been translocated, and/or the effect of said translocation.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Abstract. Constructing colloidal particles into functional nanostructures, materials, and devices is a promising yet challenging direction. Many optical techniques have been developed to trap, manipulate, assemble, and print colloidal particles from aqueous solution into desired configurations on solid substrates. However, these techniques operating in liquid environments generally suffer from pattern collapses, Brownian motion, and challenges that come with reconfigurable assembly. Herein, an all-optical technique, termed optothermally-gated photon nudging (OPN), is developed for the versatile manipulation and dynamic patterning of a variety of colloidal particles on a solid substrate at nanoscale accuracy. Optothermally-gated photon nudging takes advantage of a thin surfactant layer to optothermally modulate the particle-substrate interaction, which enables the manipulation of colloidal particles on solid substrates with optical scattering force. Along with in situ optical spectroscopy, this non-invasive and contactless nanomanipulation technique can find various applications in nanofabrication, nanophotonics, nanoelectronics, and colloidal sciences.

Introduction. State-of-the-art chemical synthesis techniques permit the production of colloidal particles with precisely tunable sizes and shapes, tailorable compositions, and unique properties. To build these colloidal particles into functional devices, the particles need to be assembled into the desired nanostructures and transported from an aqueous solution onto a solid substrate. A number of optical techniques, including optical tweezers, have been invented to trap, manipulate, and assemble colloidal particles in fluid environments at single-particle resolution (Grier. *Nature* 2003, 424, 810-816; Wu. *Nat. Photonics* 2011, 5, 322-324; Juan et al. *Nat. Photonics* 2011, 5, 349-356; Lin et al. *Acc. Chem. Res.* 2018, 51, 1465-1474; Wilson et al. *Opt. Express* 2010, 18, 16005-16013). However, the desired immobilization of the optically assembled colloidal structures onto solid substrates is not trivial. Along this line, various optical printing methods have been developed to pattern colloidal particles onto substrates (Li et al. *ACS Nano* 2019, 13, 3783-3795), such as optoelectric printing (Jamshidi et al. *Nano Lett.* 2009, 9, 2921-2925), plasmon-enhanced laser printing (Urban et al. Nano Lett. 2010, 10, 4794-4798), photochemical printing (Walker et al. *Adv. Mater.* 2016, 28, 9846-9850), optothermal printing (Li et al. *J. Micro Nano-Manuf* 2018, 6, 040801), and bubble printing (Lin et al. *Nano Lett.* 2016, 16, 701-708). Despite their ability to pattern colloidal particles into various configurations, one major drawback for printing particles in liquid environments is that the strong capillary force can change the positions of particles and cause the pattern collapse (Ni et al. *Sci. Adv.* 2016, 2, e1501779; Chini et al. *Langmuir* 2010, 26, 13707-13714). Additionally, Brownian motion of nanoparticles in the colloidal suspension can interrupt the manipulation process and limit the printing precision (Jones et al. *ACS Photonics* 2018, 5, 2878-2887; Do et al. *Nano Lett.* 2013, 13, 4164-4168). van der Waals interactions are strong enough to be exploited to firmly bond particles on the substrate (Urban et al. *Nano Lett.* 2010, 10, 4794-4798); however, reconfigurable patterning becomes impossible, which prevents the on-demand construction of active nanoarchitectures.

An alternative strategy to overcome these limitations is to dynamically manipulate nanoparticles on a solid substrate. An atomic force microscope (AFM) can manipulate nano-sized particles on a flat substrate with nanometer accuracy (Requicha et al. *Proc. IEEE* 2003, 91, 1922-1933; Schaefer et al. *Appl. Phys. Lett.* 1995, 66, 1012-1014; Junno et al. *Appl. Phys. Lett.* 1995, 66, 3627-3629; Wang et al. *Optica* 2017, 4, 1092-1097). Unfortunately, AFM manipulation relies on physically pushing the particle with a sharp AFM tip, which often causes undesired tip and particle deformation as well as particle adhesion to the tip. In comparison to the solid-liquid interfaces, the van der Waals friction at the solid-solid interfaces is much stronger, which makes the manipulation of particles on solid substrates a considerable challenge (Nosonovsky. *J. Chem. Phys.* 2007, 126, 224701; Sitti. *IEEE/ASME Trans. Mechatronics* 2004, 9, 343-349). Thus, a key to the effective manipulation of particles on a solid substrate lies in the modulation of interfacial interactions to reduce the friction forces.

Herein, an all-optical technique, termed optothermally-gated photon nudging (OPN), is developed. Optothermally-gated photon nudging provides a non-invasive and contactless strategy to achieve versatile manipulation and dynamic patterning of a variety of colloidal particles and nanowires on a solid substrate at nanoscale accuracy through interfacial engineering. In short, a thin surfactant layer is introduced between the particles and the glass substrate, acting as an optothermal gate to modify particle-substrate interfacial interactions. With the optical heating of the particles, the friction of the particle and surfactant is dramatically reduced due to the phase transition of the surfactant layer, allowing the manipulation of particles with optical scattering forces (Selmke et al. *Phys. Chem. Chem. Phys.* 2018, 20, 10502-10520; Qian et al. *Chem. Sci.* 2013, 4, 1420-1429). Optothermally-gated photon nudging is capable of dynamic manipulation and reconfigurable patterning of colloidal particles with a wide range of materials, sizes, and shapes on solid substrates. In combination with in situ dark-field optical imaging and spectroscopy, the manipulation process can be visualized with real-time feedback and the properties of the particles and their interactions in assemblies can be measured. Along with in situ optical spectroscopy, this non-invasive and contactless nanomanipulation technique can find various applications in nanofabrication, nanophotonics, nanoelectronics, and colloidal sciences.

Methods

Materials preparation. Cetyltrimethylammonium chloride (CTAC) was purchased from Chem-Impex. Sodium dodecyl sulfate (SDS) (20%) solution was purchased from Fisher Bioreagents. 40 nm, 80 nm, 200 nm, 300 nm, 400 nm gold nanoparticles (AuNPs), and $TiO_2$ nanoparticles (anatase phase) were purchased from Sigma-Aldrich. 80 nm gold nanoparticles and 110 nm silver nanoparticles (AgNPs) were purchased from nanoComposix. 1 μm and 1.5 μm gold nanoparticles were purchased from Nanopartz. 500 nm polystyrene (PS) colloids were bought from Bangs Laboratories. Silicon nanoparticles (SiNPs) were prepared using previously reported synthesis protocols (Lepeshov et al. *ACS Appl. Mater. Interfaces* 2018, 10, 16690-16697). Gold nanowires (AuNWs) were synthesized using a reported method (Liu et al. *Chem. Mater.* 2018, 30, 5256-5263). 0.5 M CTAC solution in isopropyl alcohol (IPA) was spin coated on to a glass substrate to form a thin layer of CTAC solid film after IPA evaporation. Nanoparticles and nanowires diluted in ethanol were spin coated on CTAC film for manipulation experiments. The SDS layer was obtained by directly spin coating the purchased SDS solution onto the glass and let it dry at room temperature. The thermoplasmonic substrate was fabricated by a two-step process. First, a 4.5 nm Au film was deposited on a glass substrate with thermal deposition (Denton thermal evaporator) at a base pressure below $1 \times 10^{-5}$ Torr. Then, the Au film was thermally annealed at 550° C. for 2 h.

Optical setup and in situ spectroscopy. A Nikon inverted microscope (Nikon Ti-E) with a 100× oil objective (Nikon, NA 0.5-1.3) and a motorized stage was used for the manipulation experiments. A 532 nm laser (Coherent, Genesis MX STM-1 W) was expanded with a 5× beam expander (Thorlabs, GBE05-A) and directed to the microscope. An oil condenser (NA 1.20-1.43) was used to focus the white incident light onto the sample from the top. A color charge-coupled device (CCD) camera (Nikon) and a fast monochromic CCD camera (Andor) were used to record optical images and track particles, respectively. The scattering signal from the nanoparticles was directed to a two-dimensional detector in a spectrometer (Andor) with a 500 nm grating. Background spectra were recorded and subtracted to obtain the scattering signal of the particles. The spectra were finally normalized with the light source spectra.

Measurement of velocity. The laser beam axis was first set at 200 nm offset from the particle center in X-direction for both sizes of gold nanoparticles and all incident powers. Then, the laser was turned on and the target gold nanoparticles were tracked by the fast CCD with the minimum timestep of 4 ms. The recorded position, speed, and acceleration were analyzed in software (Nikon) and directly exported. The velocity in each measurement was defined as the maximum velocity value at the instant when the laser was turned on.

Characterizations. Scanning electron microscopy (SEM) images were taken with a FEI Quanta 650 SEM; AFM images were measured with a Park Scientific atomic force microscope. The positions of laser beam and the particle in the videos were analyzed using MATLAB.

Numerical Simulations. The electromagnetic field distribution and the absorption cross-section of nanoparticles were simulated using finite-difference time-domain method (Lumerical FDTD). The mesh size was defined as 2 nm for nanoparticles. A refractive index of 1 was used for the surrounding medium. The heat density was calculated by $P_{abs}=I\sigma_{abs}/V$, where $\sigma_{abs}$ was the absorption cross-section obtained using FDTD simulations, I was the illumination intensity, and V was the volume of the nanoparticle. By assuming the high thermal conductivity of the gold, the temperature field profile was simulated using 3D finite element method. The outer boundaries were set at room temperature.

Results

Figure 1B:
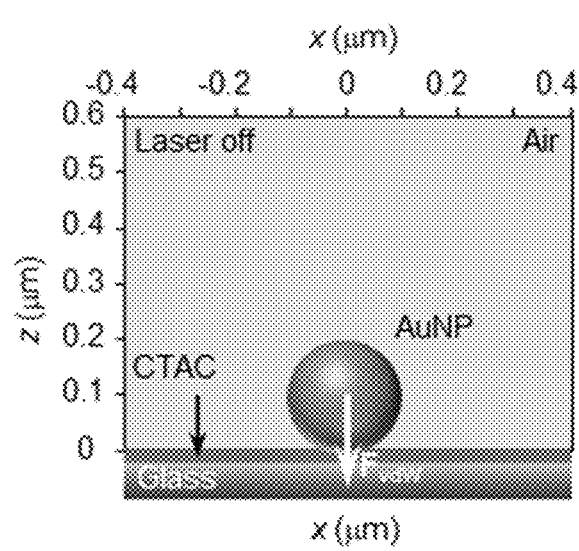
Figure 1C:
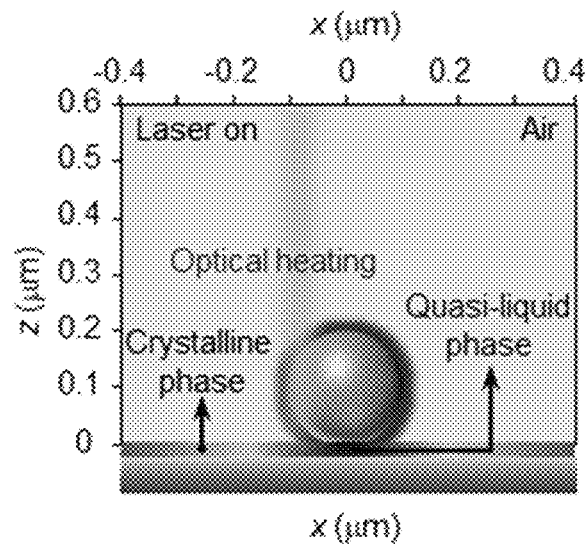
Figure 6B:
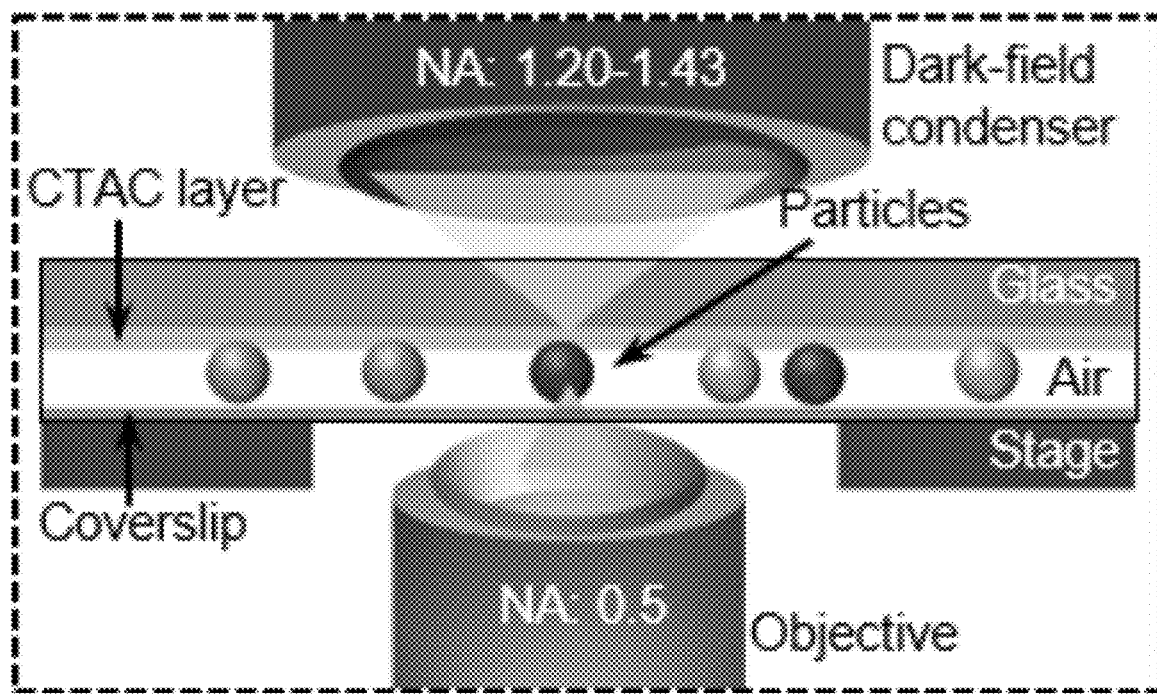
FIG. 6A-FIG. 6B. Experimental setup for optothermally-gated photon nudging.
Figure 6A:
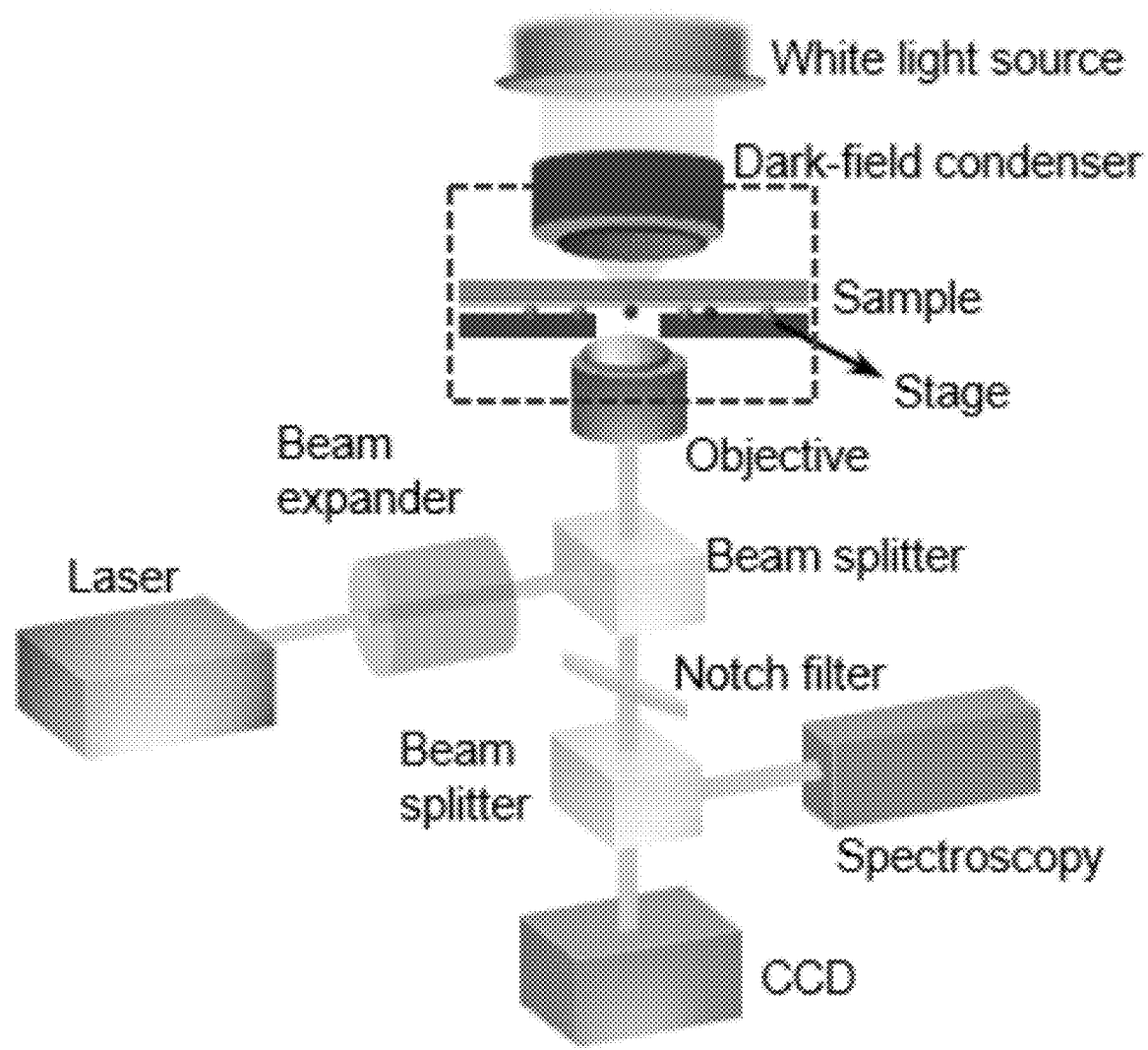
Figure 7A:
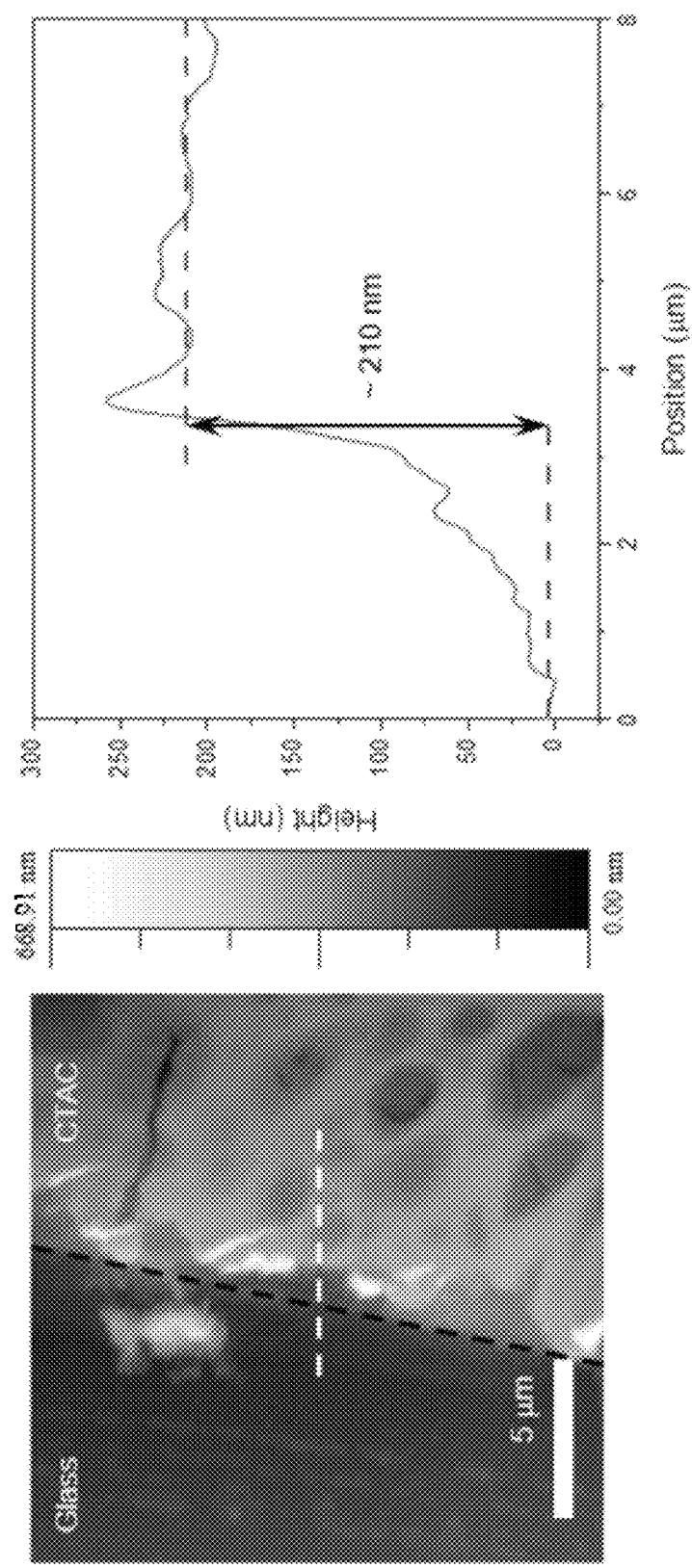
FIG. 7A-FIG. 7B. Surface topography characterization of CTAC layer. AFM images and the corresponding height profiles of the white dashed lines.
Figure 7B:
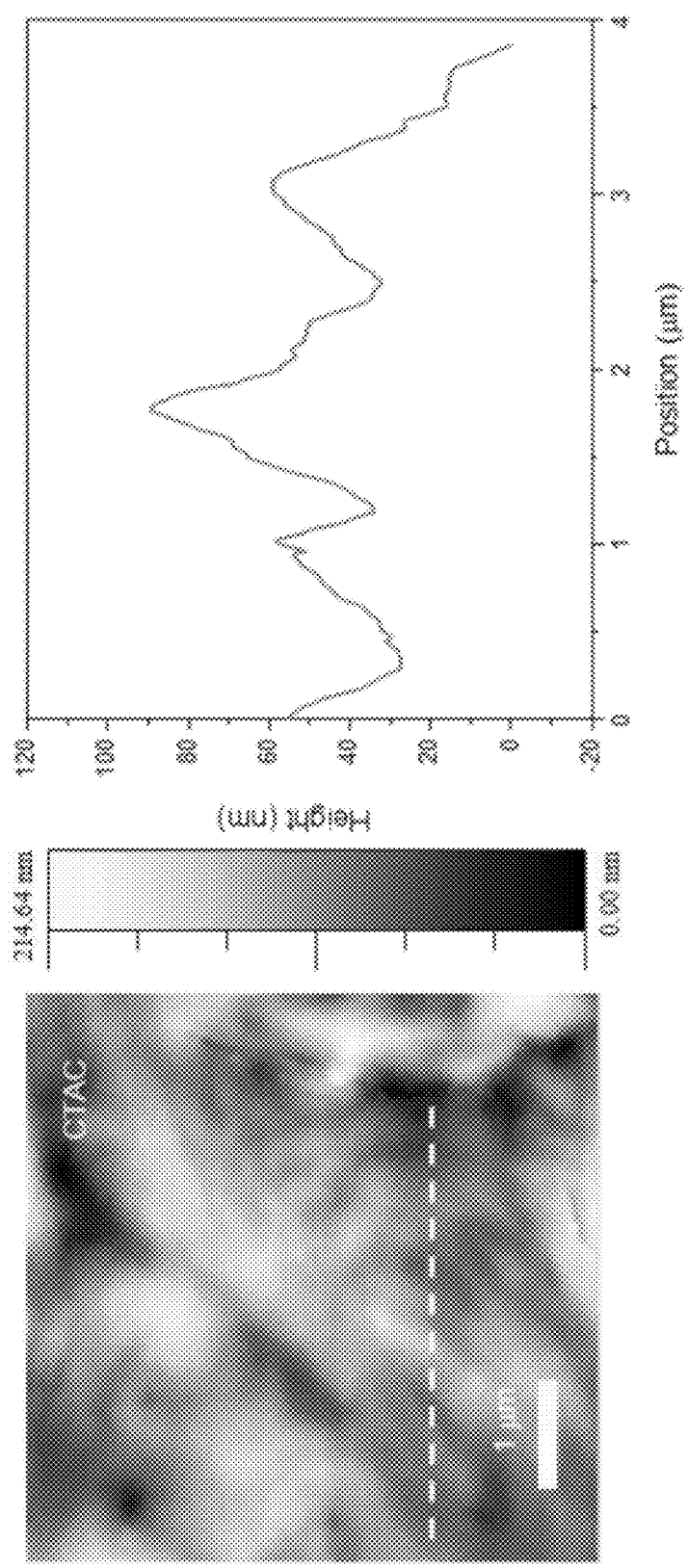

General concept. The general concept of optothermally-gated photon nudging is illustrated in FIG. 1A. A thin layer of surfactant is deposited between the glass substrate and the randomly-dispersed colloidal particles (see FIG. 6 for experimental setup and the detailed configuration of the sample). For demonstration, cetyltrimethylammonium chloride (CTAC) was used as the thin layer; however, it can be substituted with any other surfactant or polymer with similar photothermal responses, such as poly(methyl methacrylate). The deposited CTAC acts as an optothermal gate to modulate the particle-substrate interface and allows for the manipulation of particles, which is pivotal for optothermally-gated photon nudging. Without optical heating, CTAC forms a thin solid film (FIG. 7) (Tian et al. *J. Phys. Chem. C* 2016, 120, 23905-23909) and particles adhere to the film with van der Waals forces (FIG. 1B). To release the bond between the film and the particle, a laser beam was directed onto the particle, whose optothermal effects generate an abundance of heat. The maximum temperature reached over 600 K when a 200 nm gold nanoparticle (AuNP) was irradiated by a 532 nm laser beam at an optical power of 1 mW (FIG. 1D). In addition, the temperature of the CTAC layer under the gold nanoparticle exceeded ~450 K, which is larger than the first-order phase transition temperature of CTAC at 350-370 K (Tian et al. *J. Phys. Chem. C* 2016, 120, 23905-23909). Under such high temperatures, CTAC surrounding the particle undergoes a localized order-disorder transition and turns into a quasi-liquid phase (FIG. 1C), where the nonpolar layers are melted while the ionic layers remain practically intact (Tian et al. *J. Phys. Chem. C* 2016, 120, 23905-23909; Bezrodna et al. *J. Mol. Struct.* 2010, 973, 47-55). This disordered structure significantly eliminates the van der Waals friction between the particle and CTAC layer, opening the optothermal gate for free particle motion. With the optothermal gate open, particles can be nudged and guided smoothly by the laser beam with optical scattering forces (FIG. 1E). Through steering the laser beam or translating the substrate with a motorized stage, particles can be manipulated to any target position. This work is different from opto-thermoelectric nanotweezers published in a recent paper (Lin et al. *Nat. Photonics* 2018, 12, 195-201). In optothermally-gated photon nudging, particles are manipulated on solid substrates by optical scattering forces. In contrast, opto-thermoelectric nanotweezers exploit CTAC that is dissolved into a colloidal solution to generate an opto-thermoelectric field to trap charged nanoparticles.

Figure 1F:
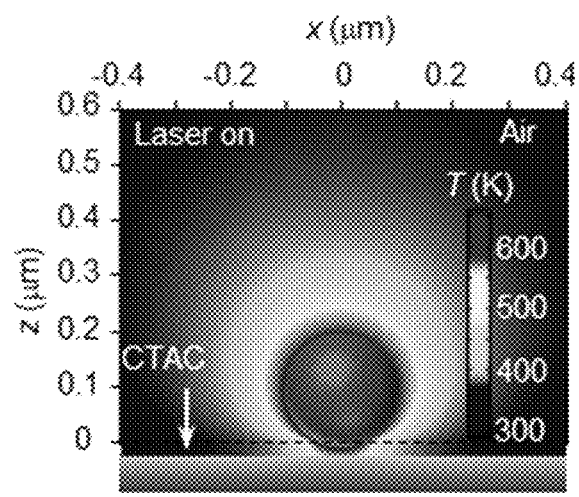
Figure 1F:
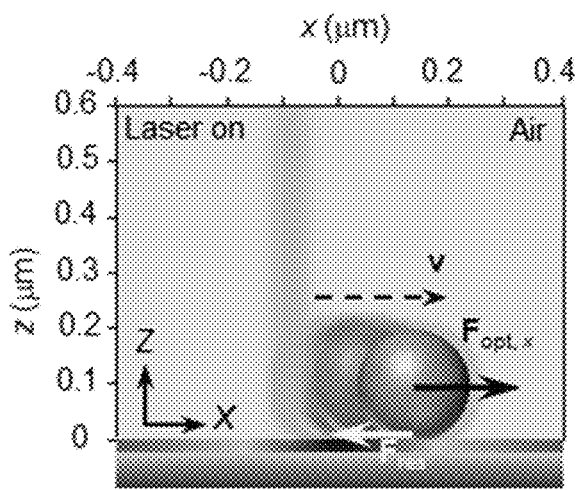
Figure 1F:
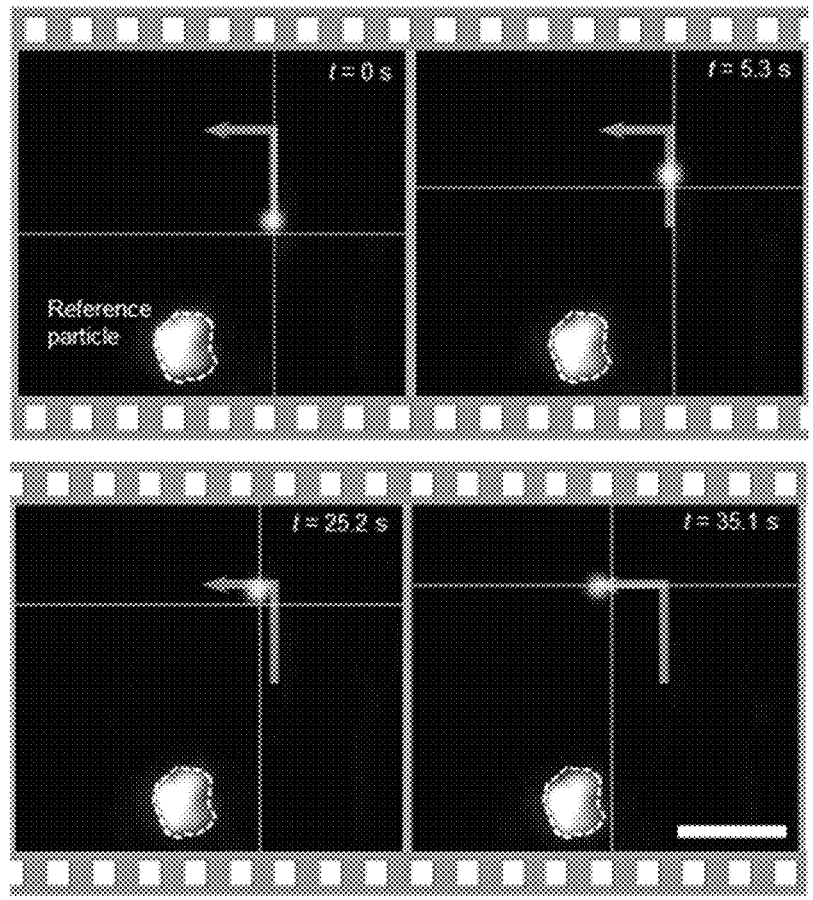
Figure 8:
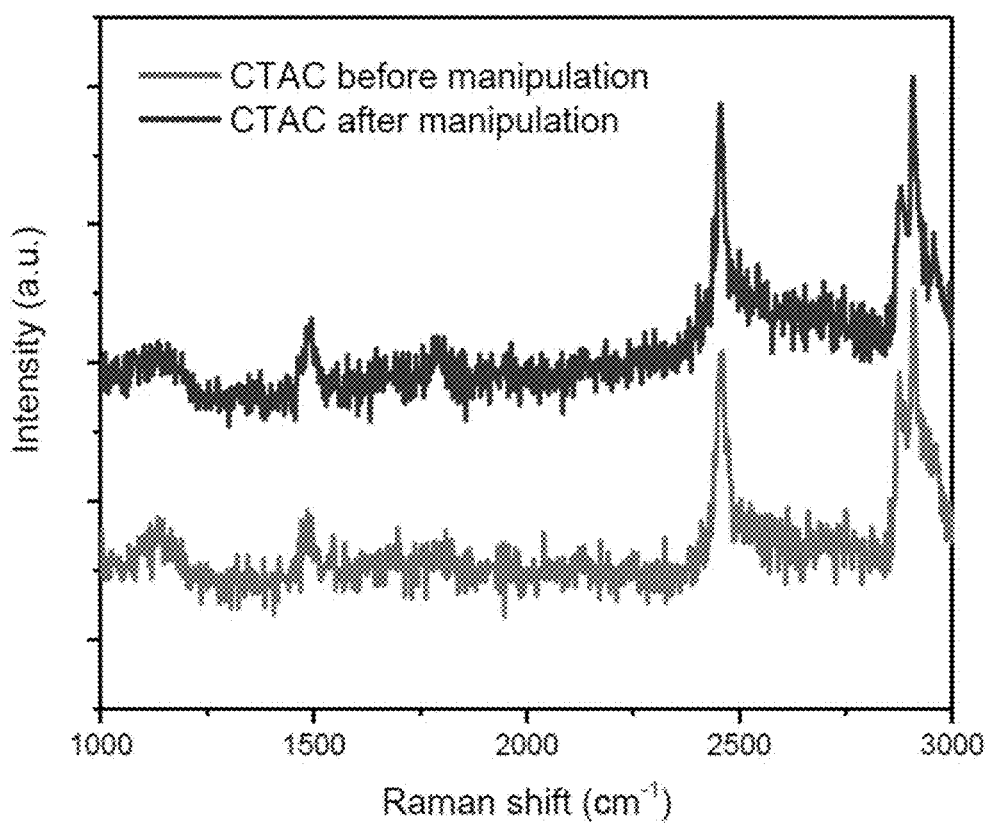
FIG. 8. Raman Spectra of CTAC before and after optothermally-gated photon nudging manipulation. The Raman spectra were measured using the in situ spectroscopy in optothermally-gated photon nudging. Before manipulation, the Raman spectrum is consistent with the reported Raman spectrum of CTAC powders (Li et al. *J. Alloys Compd.* 2016, 685, 42-49). This result further confirmed that CTAC forms a thin solid layer at room temperature before optical heating. After the colloidal particles were manipulated, the signal was measured again at the area where the particle passed through. No obvious changes were observed in the Raman spectra. These results suggest that CTAC can recover to its solid phase after the particle manipulation, which can continuously serve as the optothermal gate for optothermally-gated photon nudging.

The use of optothermally-gated photon nudging for manipulating gold nanoparticles (AuNPs) is presented as a proof-of-concept demonstration. Gold nanoparticles were tracked with in situ dark-field optical imaging due to their strong light scattering properties. FIG. 1F demonstrates the real-time manipulation process of a 300 nm gold nanoparticle using a 532 nm laser. The power intensity used was 0.2-2 mW/$\mu$m$^2$, which is ~2 orders of magnitude lower than the typical power intensity in optical tweezers (10-100 mW/$\mu$m$^2$). The gold nanoparticle was delivered in-plane over a distance of ~8 $\mu$m in 35 s. Apart from gold nanoparticles, the nanomanipulation of other materials was also demonstrated using optothermally-gated photon nudging, such as silver nanoparticles (AgNPs) and silicon nanoparticles (SiNPs). Particles with a wide range of diameters from 40 nm to several micrometers can be manipulated with an average speed of 0.2-2 $\mu$m/s. The speed of the optothermally-gated photon nudging manipulation was limited by the manual operation in this scenario. With automatic digital operation and feedback controls, the manipulation speed could be further improved. Interestingly, the CTAC layer remains functional as a component of optothermally-gated photon nudging after the particle translation (FIG. 8), which allows the particle to be steered back to its original position along the same path.

Characterizations of optothermally-gated photon nudging manipulation. In the following section, the underlying physical mechanisms are discussed and the forces involved in the optothermally-gated photon nudging platform are analyzed in detail. First, a series of control experiments were designed and conducted to understand the role of optical heating and scattering force, as summarized in Table 1. To decouple the optical heating and scattering, a thermoplasmonic substrate was applied as the heat source (FIG. 9) (Lin et al. *Adv. Funct. Mater.* 2018, 28, 1803990). In addition, polystyrene (PS) and titanium dioxide (TiO$_2$) nanoparticles were selected for the control experiments because of their negligible optical absorption and distinct scattering properties (FIG. 10) (Zhao et al. *Mater. Lett.* 2007, 61, 79-83; Li et al. *Polym. Bull.* 1991, 25, 211-216). The results revealed that optothermally-gated photon nudging simultaneously exploits optical heating to open the optothermal gate and radiation-pressure forces to drive the particles (Supplementary Note 1). Moreover, the option to introduce an external heat source to trigger the manipulation of particles makes optothermally-gated photon nudging a generalized platform for a wide range of materials that interact strongly with light, such as metal (e.g., aluminum) (Knight et al. *ACS Nano* 2014, 8, 834-840), semiconductor (e.g., germanium and gallium arsenide) (Zhigunov et al. *ACS Photonics* 2018, 5, 977-983; Person et al. *Nano Lett.* 2013, 13, 1806-1809), and inorganic perovskite (e.g., barium titanate) (Renaut et al. *Nano Lett.* 2019, 19, 877-884). Experiments to exclude the thermal expansion force and electrostatic force as the primary driving forces in optothermally-gated photon nudging further conducted (Supplementary Note 2, FIG. 17).

TABLE 1

Summary of the control experiments to investigate the role of optical heating and scattering forces in optothermally-gated photon nudging (OPN).

| No. | Particle | Substrate | CTAC? | Optical Heating | Optical Scattering | OPN works or no? |
|-----|----------|-----------|-------|-----------------|--------------------|------------------|
| 1 | Au/Ag/Si | Glass | No | Strong | Strong | No |
| 2 | Au/Ag/Si | Glass | Yes | Strong | Strong | Yes |
| 3 | PS | Glass | Yes | Weak | Weak | No |
| 4 | PS | AuNIs | Yes | Strong | Weak | No |
| 5 | $TiO_2$ | Glass | Yes | Weak | Strong | No |
| 6 | $TiO_2$ | AuNIs | Yes | Strong | Strong | Yes |

AuNIs = gold nanoislands;
PS = polystyrene

Figure 2A:
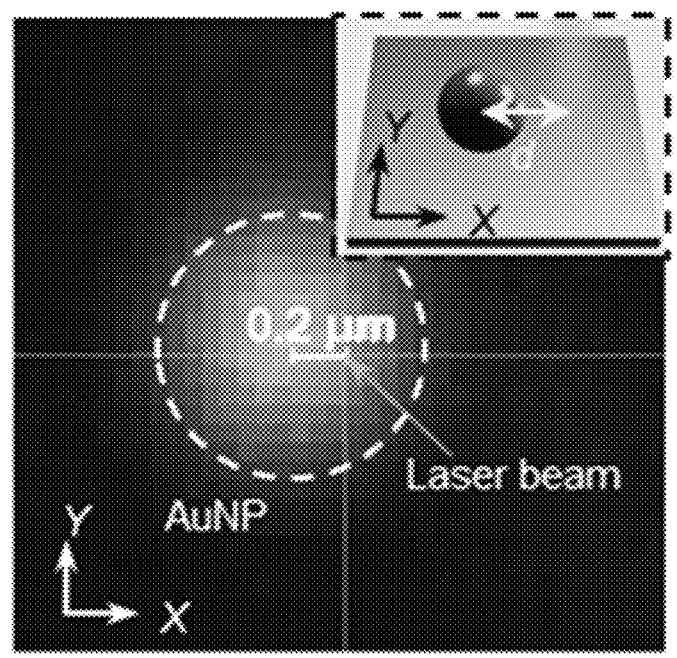
FIG. 2A-FIG. 2F. Characterization and modelling of the optothermally-gated photon nudging manipulation process.
Figure 2B:
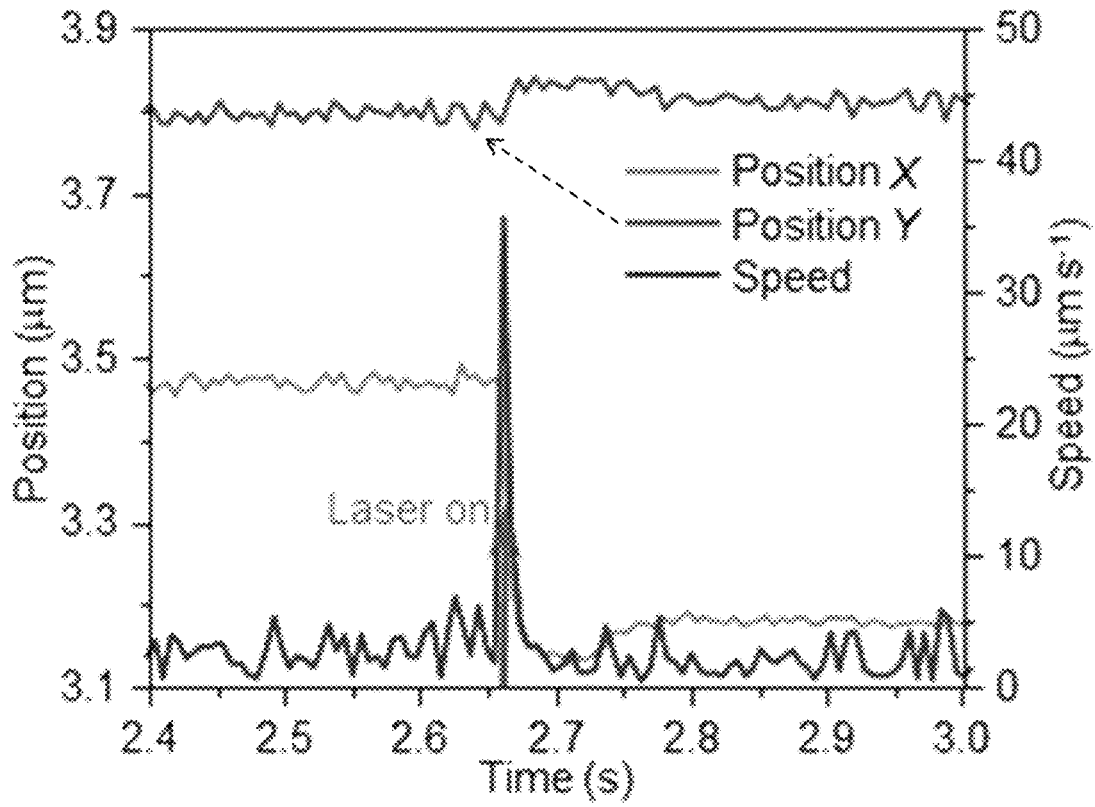
Figure 2C:
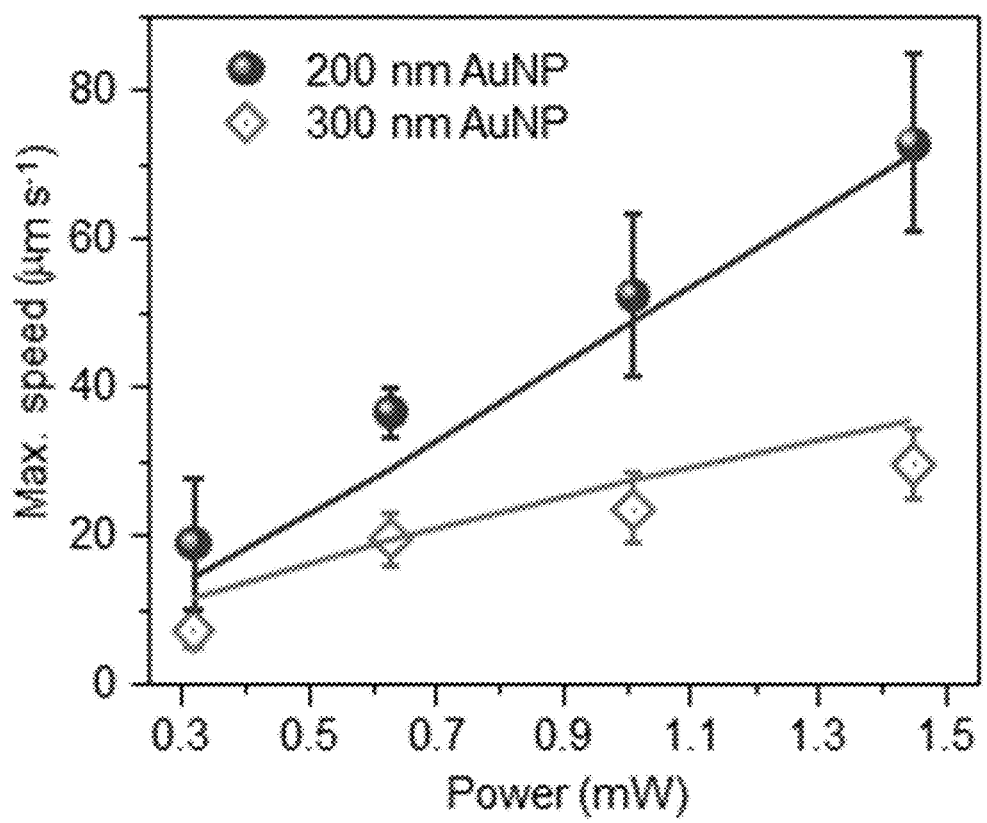

Next, the optothermally-gated photon nudging manipulation was quantitatively analyzed by measuring the velocities of 200 nm and 300 nm gold nanoparticles under a directed laser with a fast CCD (FIG. 2A). The measured particle velocity is the result of the balance between the optical driving force and the resistant force by surfactant. As an example, the measured data for a 300 nm gold nanoparticle at an optical power of 1.40 mW is shown in FIG. 2B. When the laser was on, the gold nanoparticle immediately gained speed and moved in a direction against the laser beam. Since the laser beam was focused slightly offset from the particle center along the X-axis, the gold nanoparticle had a much larger shift in the X-direction than that in the Y-direction, which is consistent with the photon nudging hypothesis. As the laser power was raised, the gold nanoparticles increased their speeds and shifted farther from their original positions (FIG. 11). For both 200 nm and 300 nm gold nanoparticles, the measured maximum velocities increased when the optical power was raised from 0.27 to 1.40 mW (FIG. 2C). This relationship is reasonable, considering that the optical force scales linearly with the laser power, which further confirms the optical force is the primary driving force in optothermally-gated photon nudging.

Figure 2D:
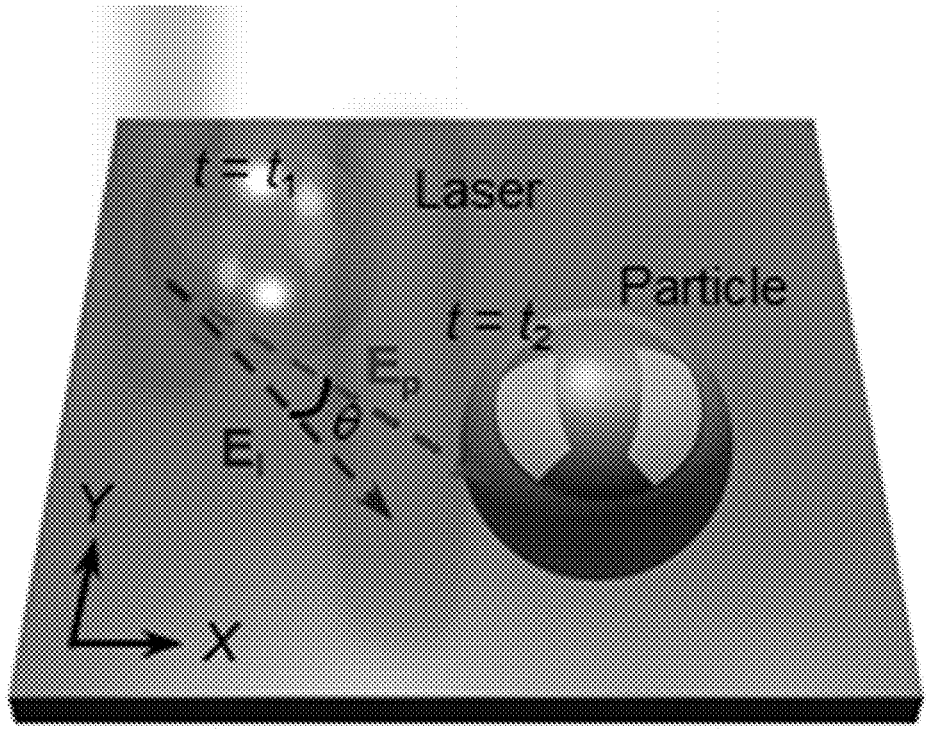
Figure 2E:
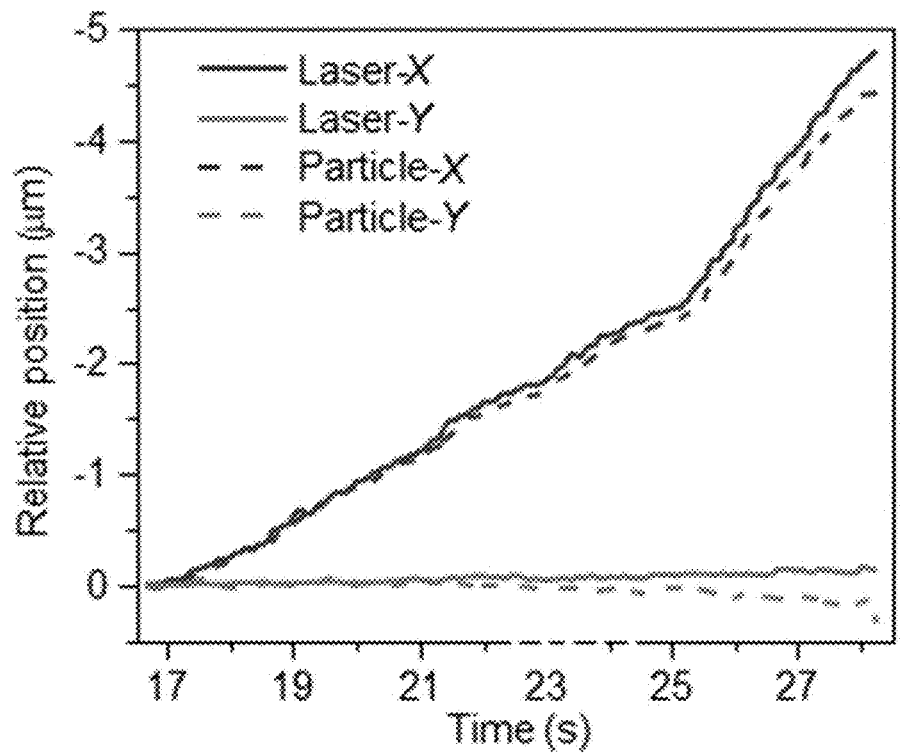
Figure 2F:
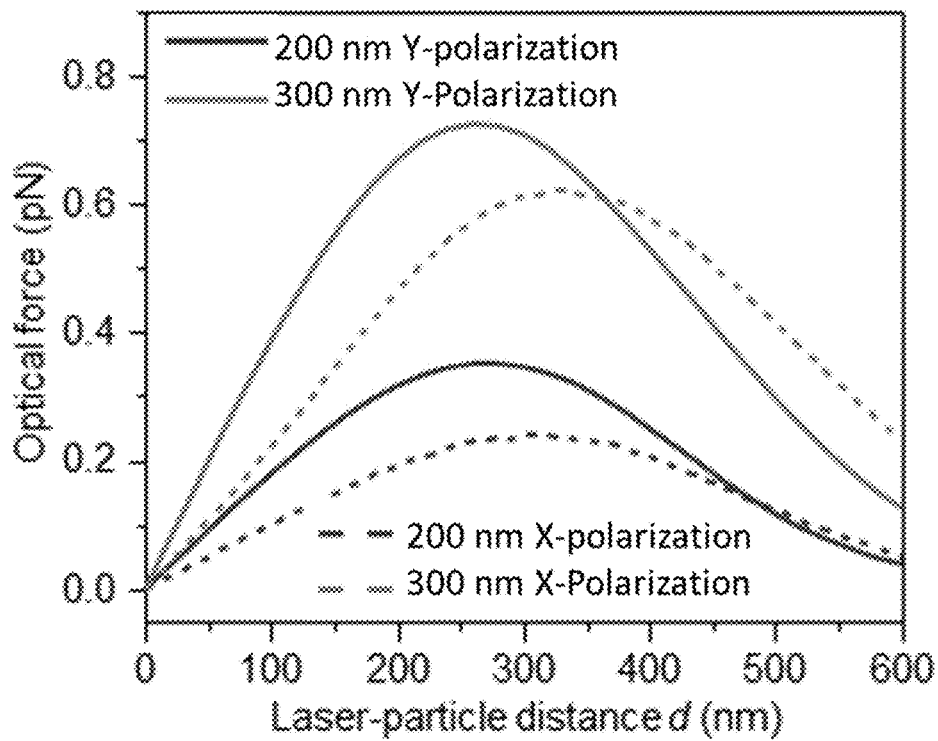
Figure 18A:
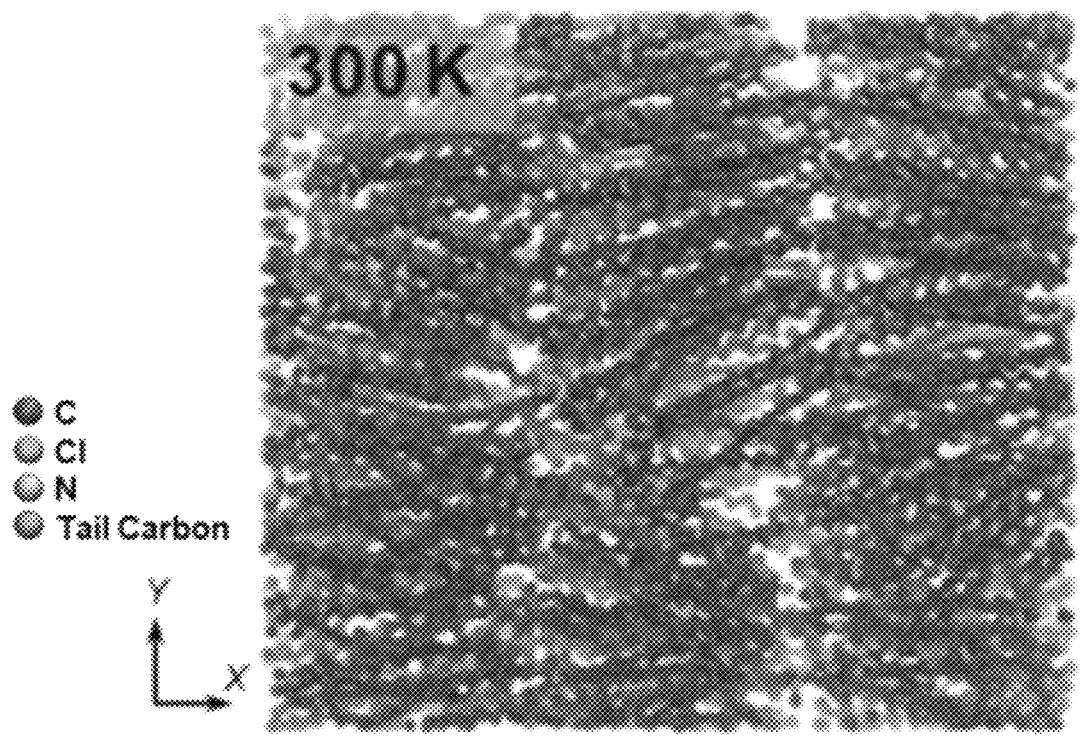
FIG. 18A-FIG. 18C. Molecular Dynamics (MD) simulation of CTAC.
Figure 18B:
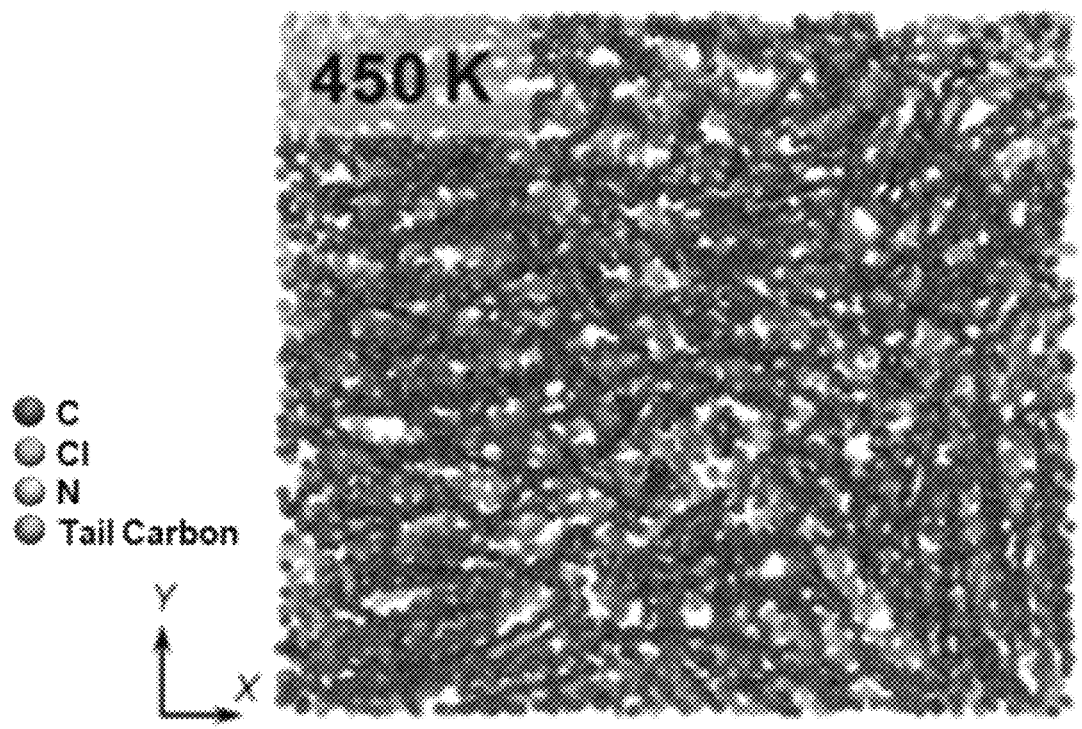

Furthermore, a simplified physical model was adopted to understand the nanomanipulation process. Since the particles were manipulated in the X-Y plane, only the in-plane optical and resistant forces were considered. The finite-difference time-domain (1-DTD) method was applied to calculate the optical scattering forces in the X-direction with varying distances between gold nanoparticles and the laser beam (FIG. 2F). For both X- and Y-polarizations, the laser beam will always repel the gold nanoparticle, which allows optothermally-gated photon nudging to maneuver particles in all directions without the need to control the laser polarization. In this case, the particles are partially immersed into the CTAC film (FIG. 12), for which the resistant force can be evaluated according to (Kralchevsky et al. *Adv. Colloid. Interfaces* 2000, 85, 145-192):

$$F_{res} = 6\pi \eta R f_d v \quad (1)$$

where η is the viscosity of CTAC in its "quasi-liquid" phase, R is the particle radius, v is the velocity of the particle, and $f_d$ is a dimensionless drag coefficient which is dependent on the viscosity of the fluids (Petkov et al. *Langmuir* 1996, 12, 2650-2653). The detailed calculation of the resistant force can be found in Supplementary Note 3 (also see FIG. 18 and FIG. 19). The trajectory of the gold nanoparticle can be modelled with:

$$m\ddot{x} = F_{res}(v) + F_{opt}(x) \quad (2)$$

where m is the mass of the particle, x is the position of the particle, and $F_{opt}(x)$ is the total optical forces calculated by the FDTD. MATLAB was applied to numerically solve the motion of particles in optothermally-gated photon nudging with the same time step as the fast CCD. The calculated maximum velocity values for 200 nm and 300 nm gold nanoparticles under different laser powers are shown in FIG. 2C. The results match well with the measurements, which further confirms the proposed mechanisms.

The manipulation efficiency was further characterized by analyzing the video recordings of the particle movement. During the manipulation process, the trajectories of the particles and the laser beam almost overlap (FIG. 2E and FIG. 13), which shows that the particles can be efficiently manipulated along the laser direction. To quantify the manipulation efficiency, the difference between the laser movement vector $E_l$ and the particle movement vector $E_p$ was examined, as sketched in FIG. 2D. The accuracy of the particle movement can be characterized by the dot product of unit vectors along $E_l$ and $E_p$. A manipulation efficiency Q was defined as the average cos θ over a full manipulation trajectory:

$$Q = \langle \cos\theta \rangle = \left\langle \frac{E_l \cdot E_p}{|E_l||E_p|} \right\rangle \quad (3)$$

where θ is the angle between $E_l$ and $E_p$. The calculated Q ranges from ~0.6-0.8 for the recorded videos (FIG. 13), indicating highly-efficient manipulation of all kinds of colloidal particles.

Figure 3A:
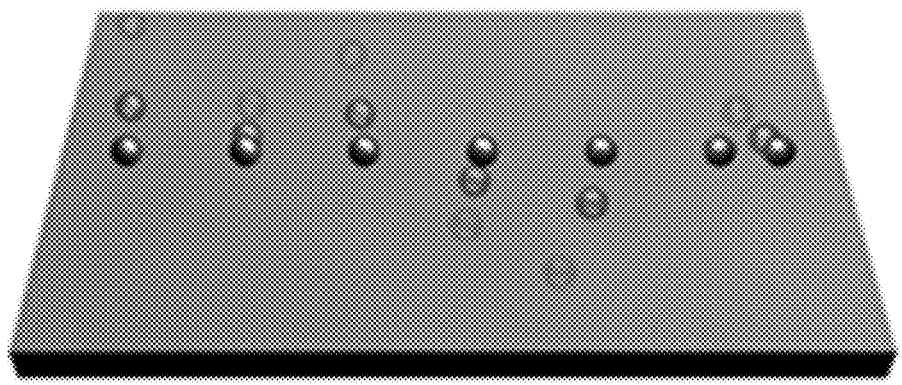
FIG. 3A-FIG. 3J. Patterning accuracy of optothermally-gated photon nudging.
Figure 3B:
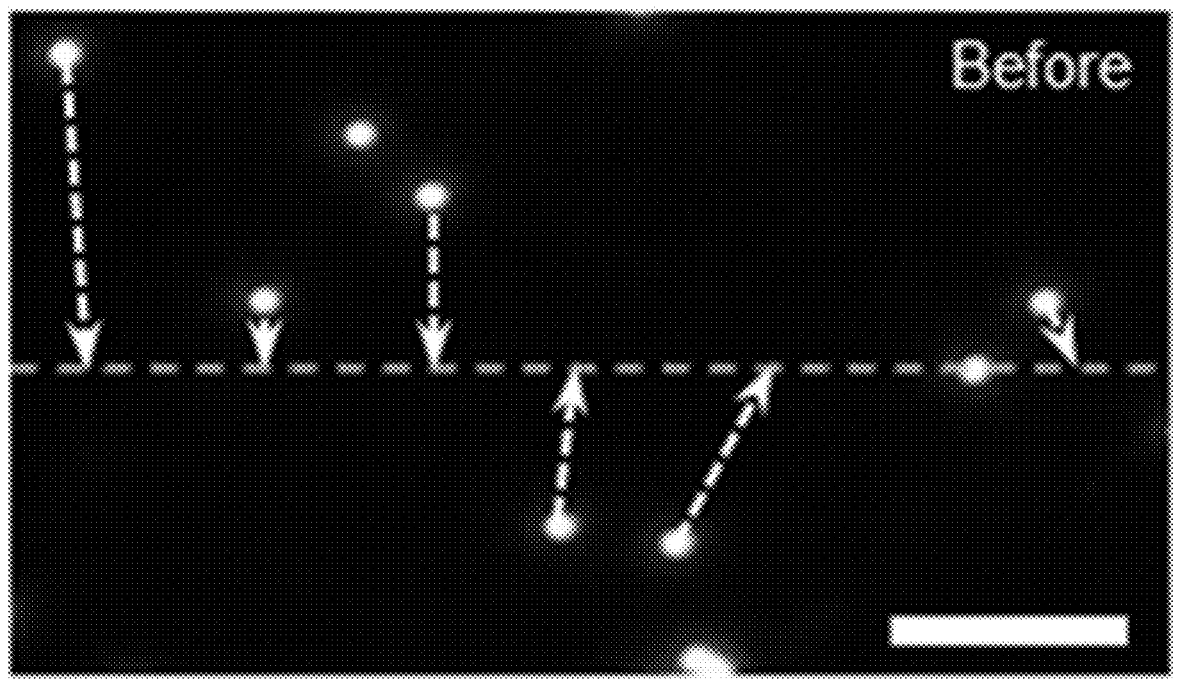
Figure 3C:
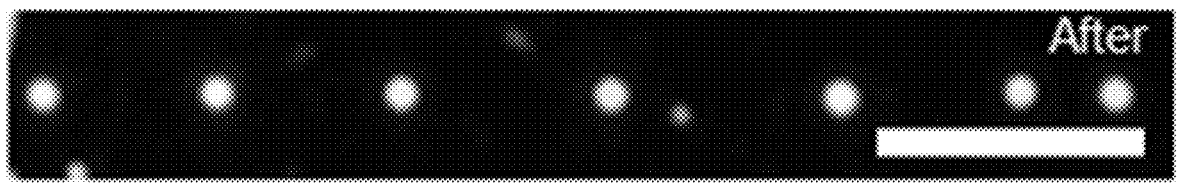
Figure 3D:
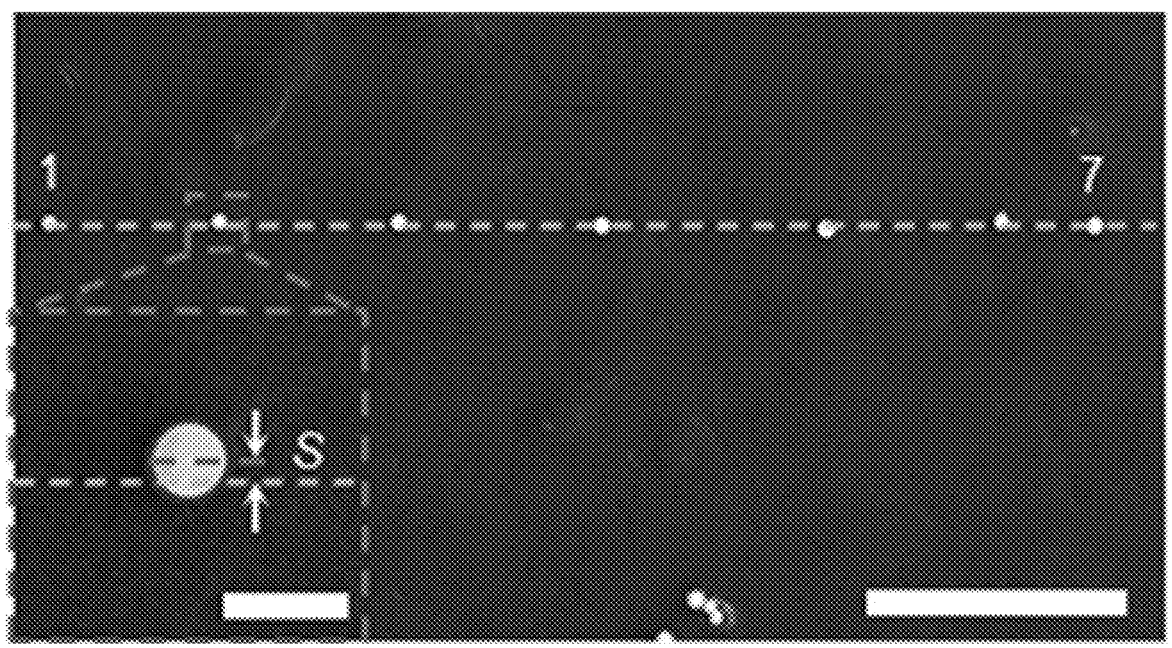
Figure 3E:
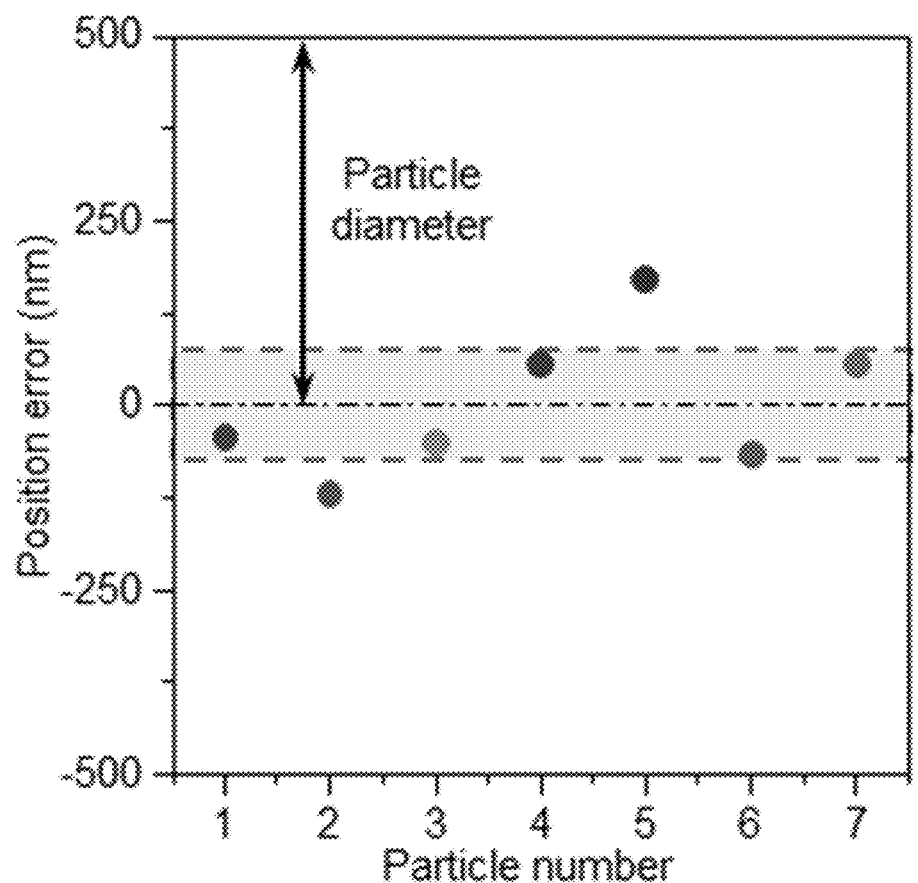

Patterning accuracy. To assess optothermally-gated photon nudging as a nanomanufacturing tool for arbitrary and precise construction of colloidal structures, the patterning accuracy of optothermally-gated photon nudging in both 1D and 2D cases was explored. As a preliminary demonstration, optothermally-gated photon nudging was used to assemble seven randomly dispersed silicon nanoparticles with a diameter of 500 nm into a straight line (FIG. 3A and FIG. 3B). The dark-field image shows a well-arranged particle chain after the patterning procedure (FIG. 3C). Furthermore, the SEM image of the particle assembly was collected to precisely determine their positions and their deviations from the target line (FIG. 3D). The position error, the distance between the particle center and the line (inset in FIG. 3D), was analyzed for individual silicon nanoparticles and plotted in FIG. 3E. A position accuracy of ~80 nm was achieved, as indicated by the shaded area.

Figure 3F:
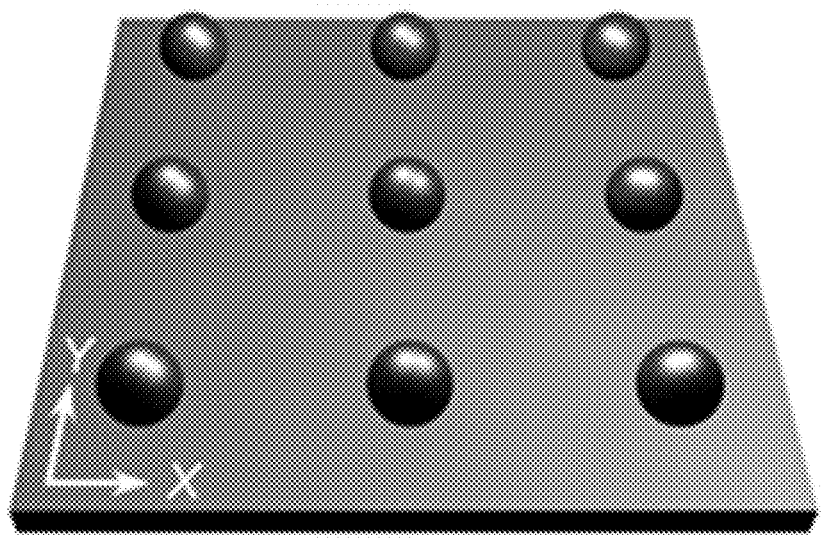
Figure 3G:
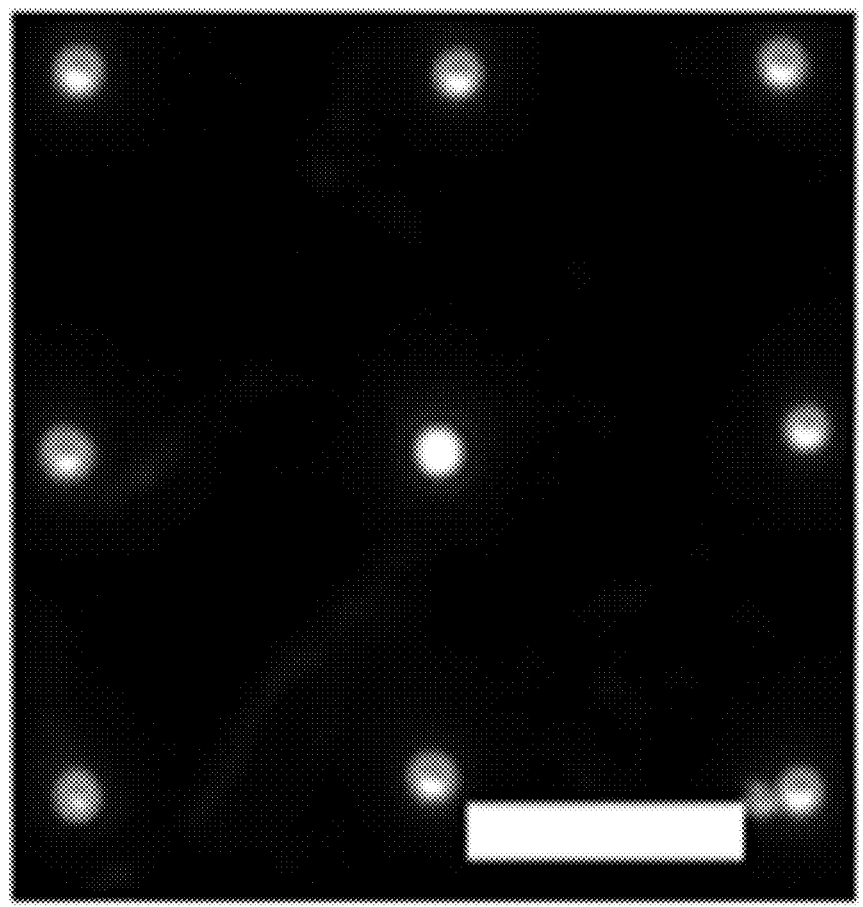
Figure 3H:
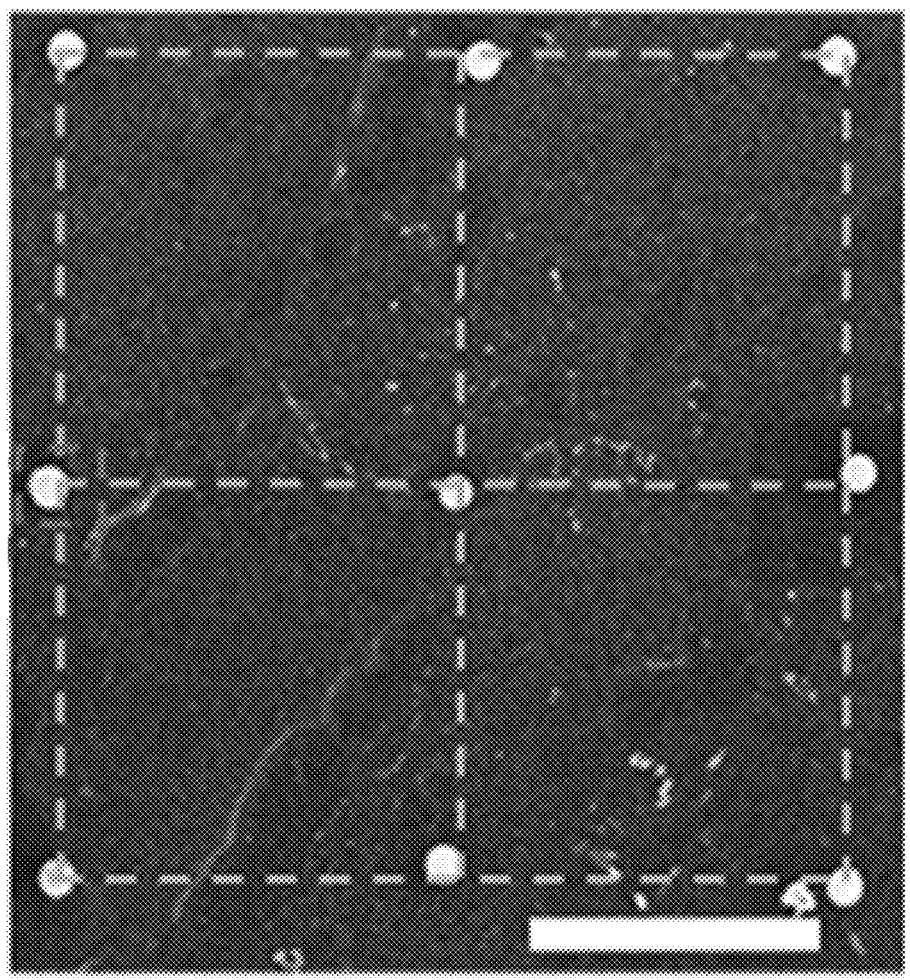
Figure 3I:
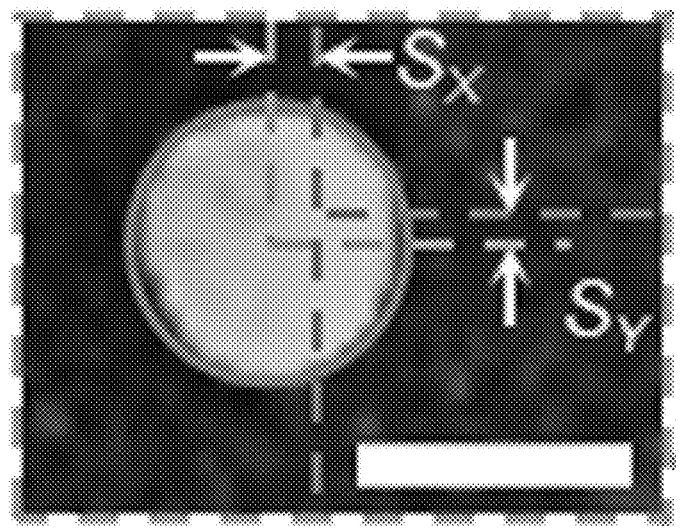
Figure 3J:
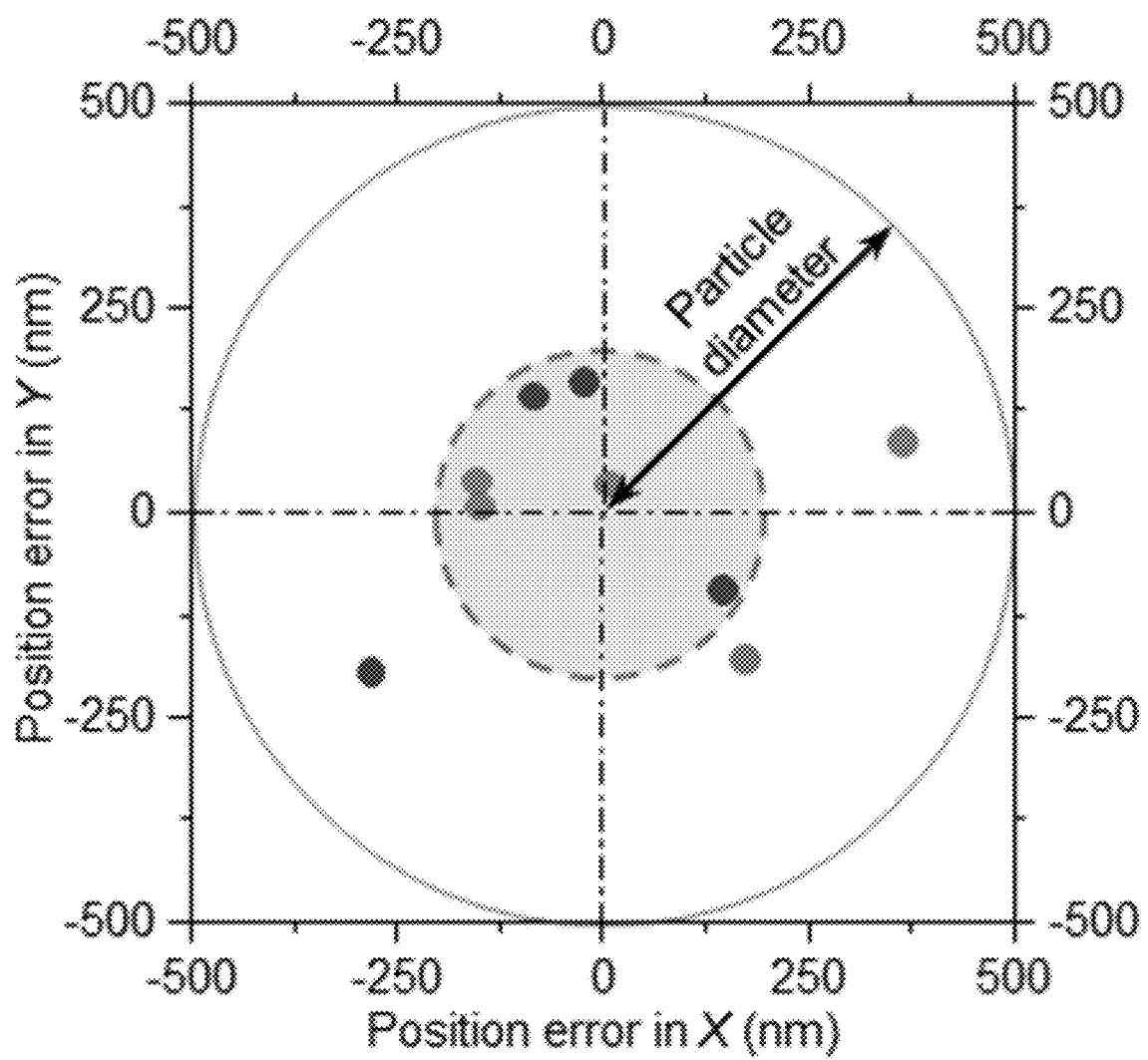
Figure 14:
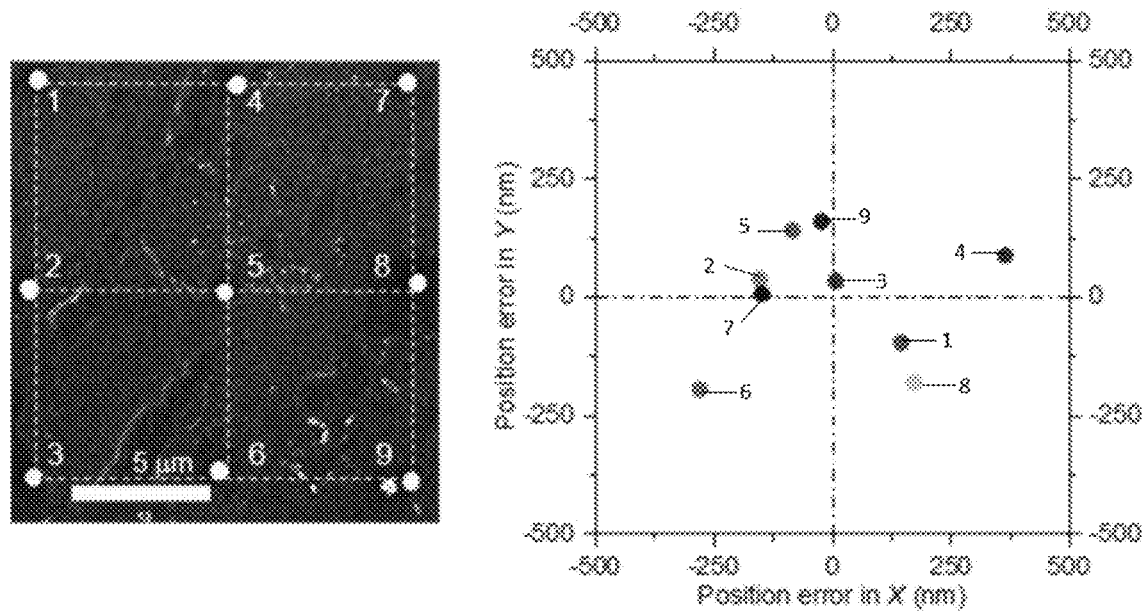
FIG. 14. Detailed information for the position errors of silicon nanoparticles in the 2D 3×3 array. All particles are numbered as indicated in the SEM image. The determination of position errors in X and Y directions can be found in FIG. 3I.

In the second example, nine silicon nanoparticles were manipulated using optothermally-gated photon nudging to assemble a 3×3 2D array (FIG. 3F). The optical image and corresponding SEM image of the silicon nanoparticle array are shown in FIG. 3G and FIG. 3H. Similar to the 1D case, the position error in both the X and Y directions was evaluated from the SEM image (FIG. 3I). As depicted in FIG. 3J, all manipulated particles are located close to their target positions with an average deviation of ~200 nm, which is less than half the diameter of the silicon nanoparticles (FIG. 14 and Table 2).

TABLE 2

Detailed information for the position errors of each silicon nanoparticle (SiNP) in the 2D 3 × 3 array. The particle numbers are consistent with those in FIG. 14.

| Particle No. | Symbol | Position error in X (nm) | Position error in Y (nm) | Absolute position error (nm) |
| --- | --- | --- | --- | --- |
| 1 | ● | 145.6 | −95.8 | 174.3 |
| 2 | ● | −153.2 | 38.3 | 158.0 |
| 3 | ● | 7.7 | 34.5 | 35.3 |
| 4 | ● | 364.0 | 88.1 | 374.5 |
| 5 | ● | −84.3 | 141.8 | 164.9 |
| 6 | ● | −279.7 | −195.4 | 341.2 |
| 7 | ● | −149.4 | 7.7 | 149.6 |
| 8 | ● | 172.4 | −180.1 | 249.3 |
| 9 | ● | −23.0 | 160.9 | 162.5 |

Figure 15A:
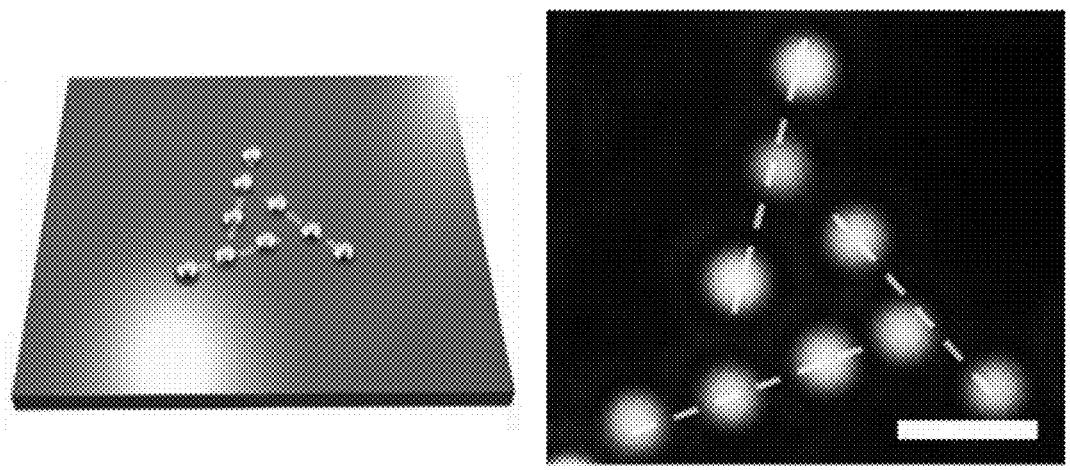
FIG. 15A-FIG. 15B. Patterning of 80 nm gold nanoparticles into (FIG. 15A) a triangular spiral composed of 9 particles and (FIG. 15B) a "Au" pattern composed of 22 particles. Scale bars.
Figure 15B:
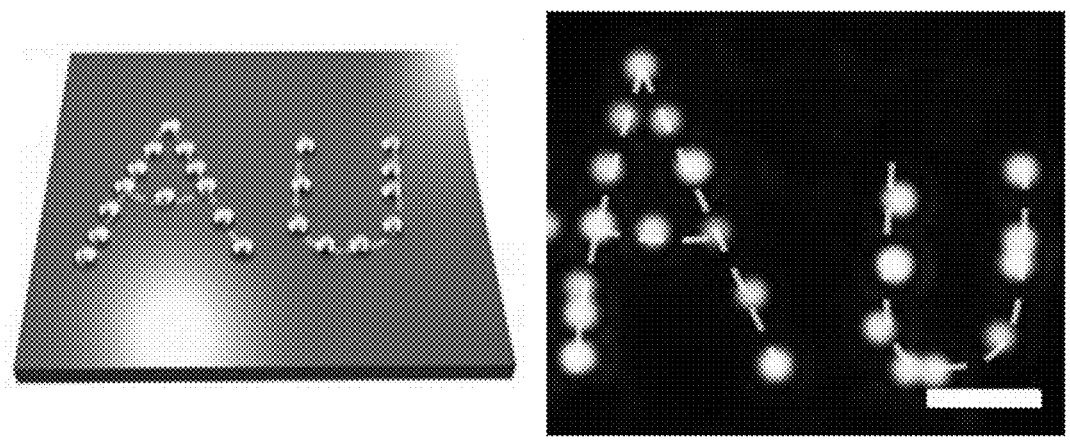

The ability to achieve colloidal patterning at nanoscale accuracy enables optothermally-gated photon nudging to be used for the precise fabrication of nanostructures with colloidal particles. The current position accuracy is primarily limited by the diffraction barrier in optical microscopy. Additionally, during the manipulation experiments, visual estimation was relied on to determine the positions of the nanoparticles in the optical images. Thus, the particle-patterning accuracy can be further improved with advanced imaging, analysis, and tracking of particles with higher precision. For instance, an improved position accuracy of ~20 nm was achieved by using the imaging software to define a target line along which the particles will be aligned (Supplementary Note 4 and FIG. 20). Moreover, optothermally-gated photon nudging is capable of on-demand patterning of colloidal particles into more complex configurations (FIG. 15). The CTAC layer is removable without altering the particle positions after optothermally-gated photon nudging patterning, which will be discussed in detail later.

Figure 4A:
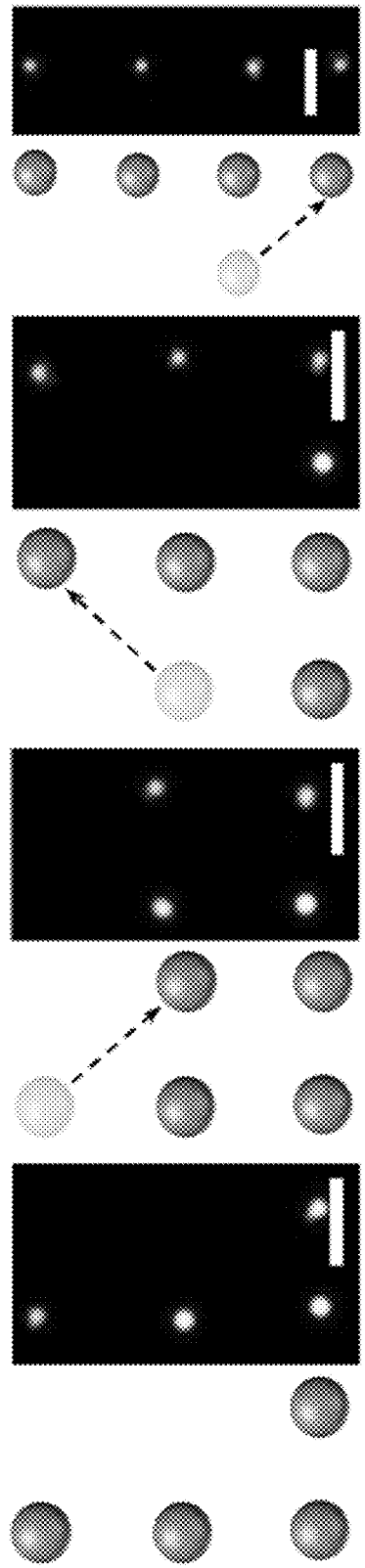
FIG. 4A-FIG. 4D Reconfigurable patterning of colloidal nanostructures.

Reconfigurable patterning. Since the nanomanipulation is performed on a solid substrate, optothermally-gated photon nudging allows for the dynamic transportation of particles to new sites, enabling active assembly of colloidal structures. Reconfigurable patterning of four 300 nm gold nanoparticles is shown in FIG. 4A. The randomly dispersed gold nanoparticles were first assembled into an L-shaped structure. By moving the particle on the top down to the right side, the L-shaped pattern was transformed into a square. Then, the particle at the upper left corner of the square was translated to the top right, forming a mirrored L-shaped pattern. Finally, four gold nanoparticles were assembled into a straight line by delivering the particle on the left to the bottom.

Figure 4B:
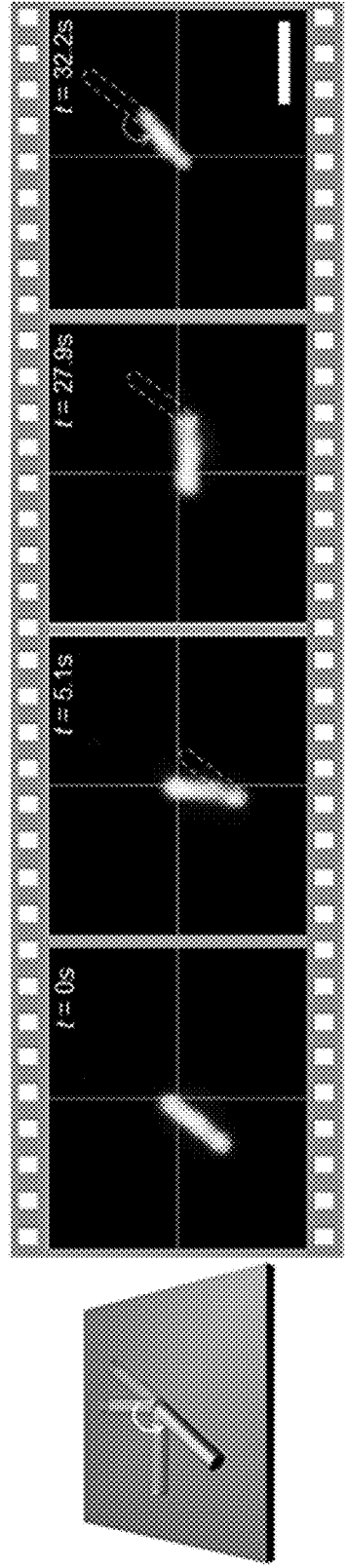
Figure 4C:
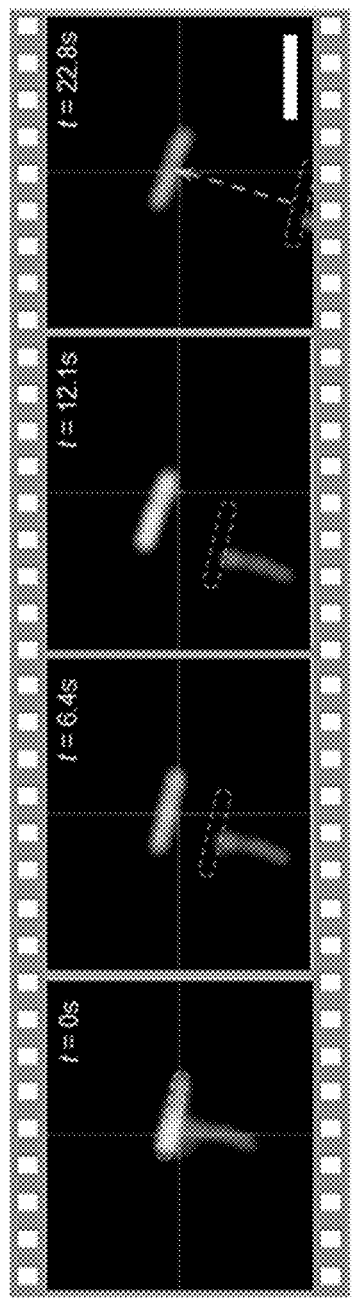
Figure 4C:
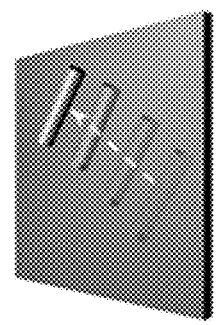

Apart from maneuvering spherical colloidal particles, dynamic manipulation of metallic nanowires was also achieved through optothermally-gated photon nudging. Gold nanowires (AuNWs) with a diameter of 160 nm and a length of 3 µm were used in this experiment. Since gold has high thermal conductivity, the CTAC optothermal gate can be triggered with the laser beam directed at any location along the gold nanowires. By focusing the laser at one end of the nanowire while steadily moving the laser tangentially, the nanowire can be rotated about the opposite end, which remains fixed. A single gold nanowire can be rotated over ~180 degrees in a counter-clockwise direction within 32 s (FIG. 4B). Gold nanowire translation is also possible by directing the laser at the center of the nanowire, which allows a gold nanowire to be transported with a fixed orientation. Naturally, due to the inability to place the laser beam strictly at the nanowire center, the gold nanowire will rotate slightly during this translation process. This phenomenon can be easily avoided by implementing a feedback loop to rotate the gold nanowire in the opposite direction to its original orientation. As a demonstration, a gold nanowire was transported translationally over a distance of ~5 µm within 23 s (FIG. 4C).

Figure 4D:
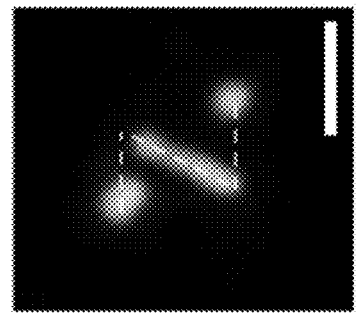
Figure 4D:
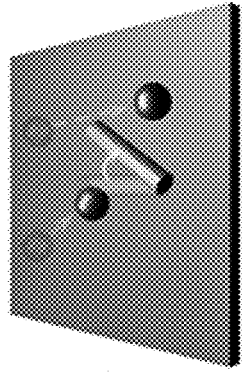
Figure 4D:
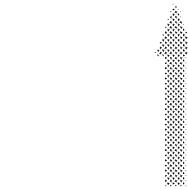
Figure 4D:
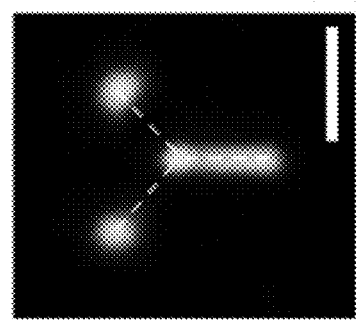
Figure 4D:
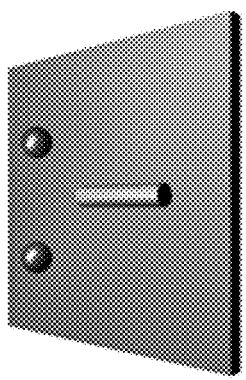

Furthermore, the reconfigurable patterning of hybrid nanostructures comprised of a metallic nanowire and dielectric nanoparticles was achieved. Two silicon nanoparticles and one gold nanowire were first patterned into a Y-shaped structure. By rotating the gold nanowire and by moving silicon nanoparticles to new sites, the structure was deliberately transformed into a Z-shaped pattern (FIG. 4D). The ability to dynamically manipulate nanowires and metal-dielectric nanostructures shows the potential of optothermally-gated photon nudging for the assembly of functional components and devices. Optothermally-gated photon nudging can also be applied to manipulate other anisotropic nanoobjects, such as gold nanorods and gold nanotriangles (Scarabelli et al. *ACS Nano* 2014, 8, 5833-5842).

Figure 5C:
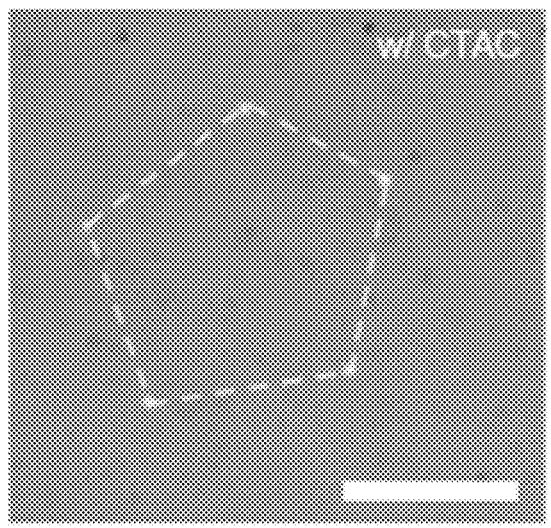
Figure 5C:
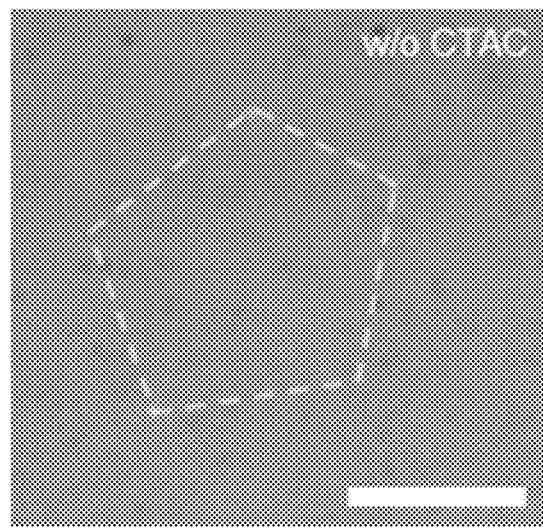
Figure 5C:
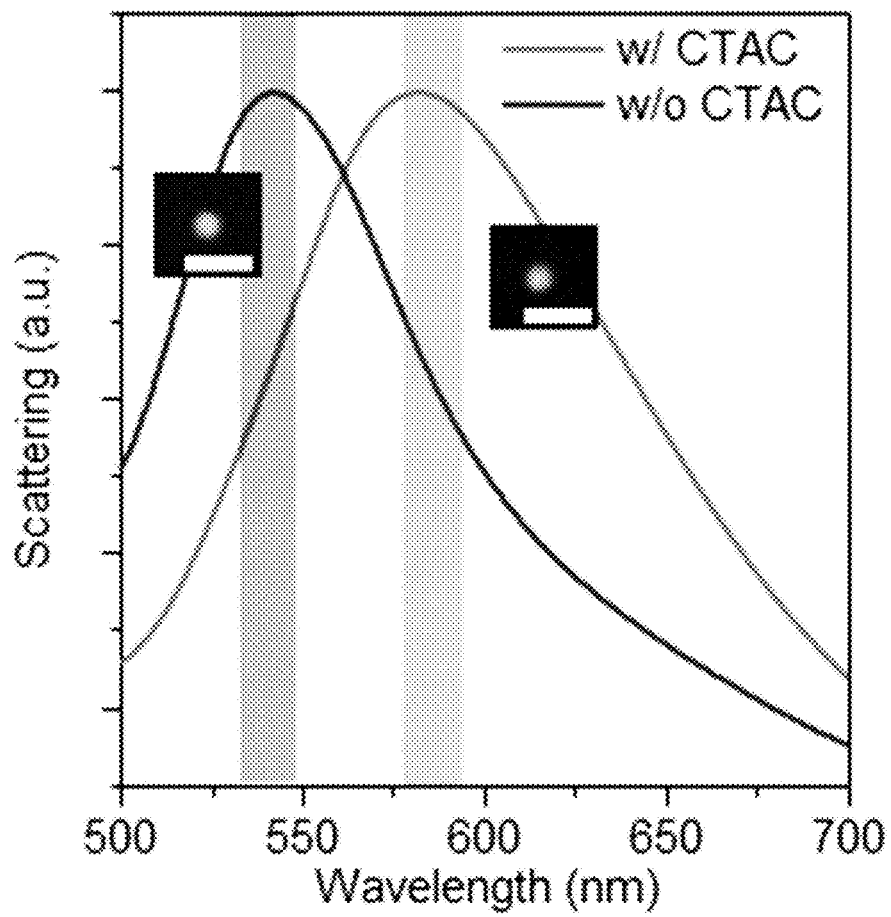
Figure 16A:
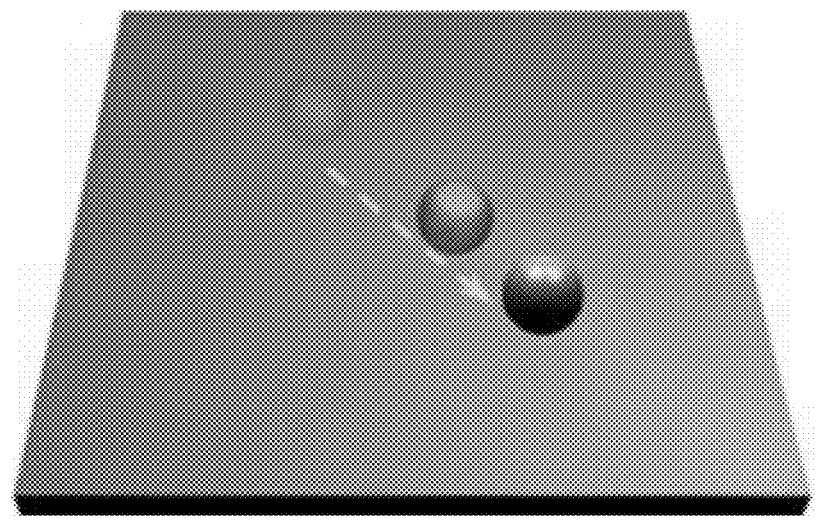
FIG. 16A-FIG. 16C.
Figure 16B:
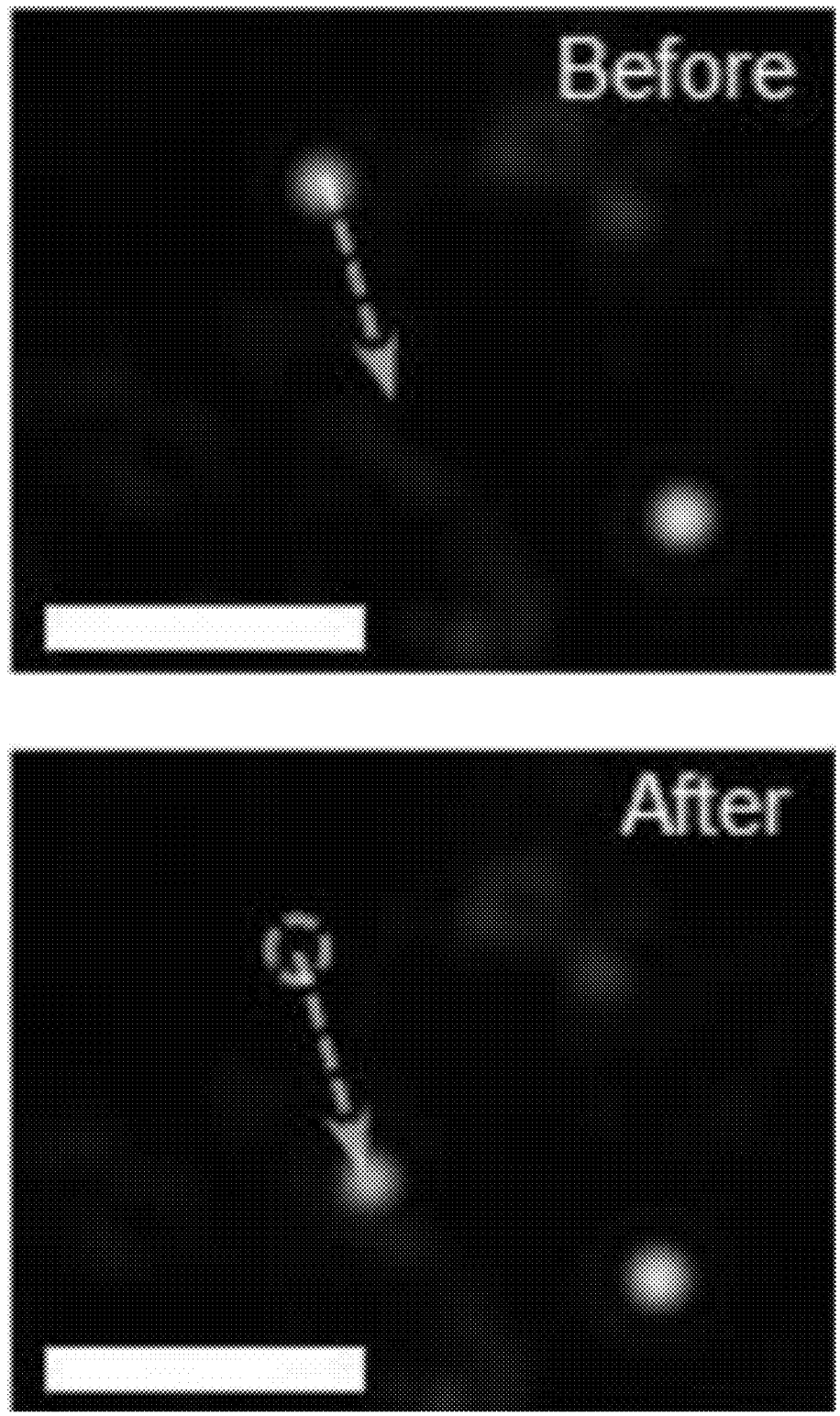
Figure 16C:
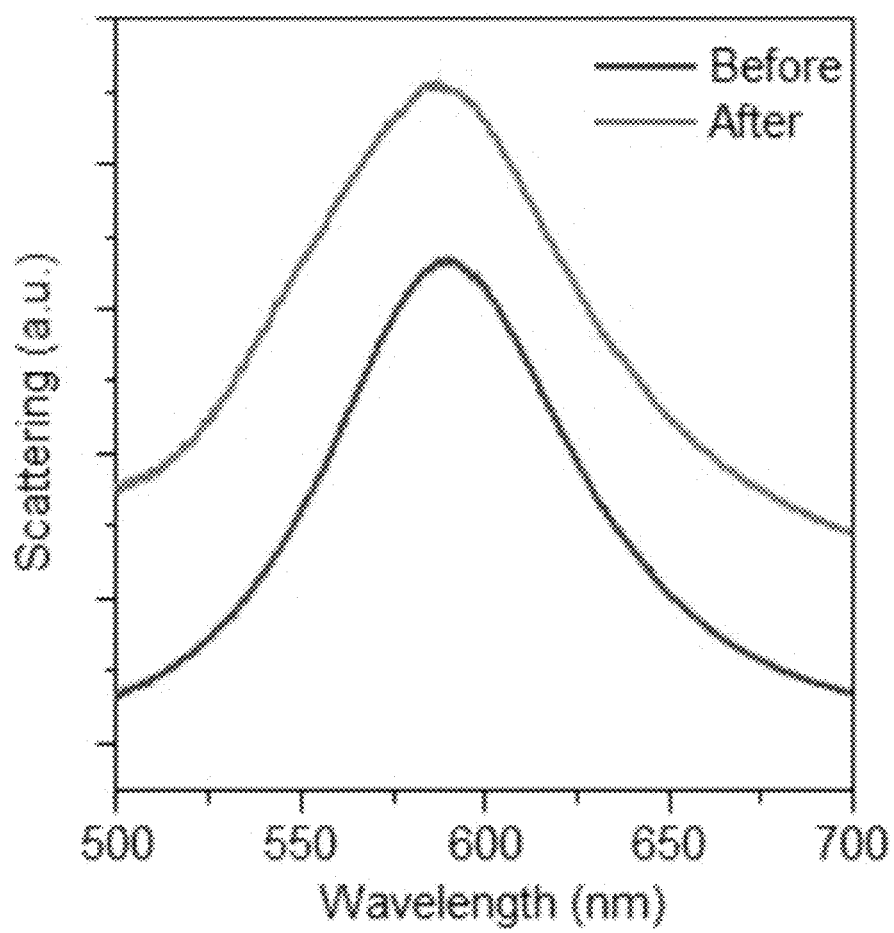

In situ optical spectroscopy. In situ spectroscopy was further applies to study the spectral response of colloidal nanostructures. The minimal backward scattering from the CTAC layer permits the detection of the intrinsic scattering spectra from the particles. The in situ optical spectroscopy is capable of distinguishing colloidal particles with different sizes by comparing their scattering peak positions during the manipulation process (Supplementary Note 5 and FIG. 21). The scattering spectra of a 100 nm gold nanoparticle was measured before and after the manipulation to show that optothermally-gated photon nudging can manipulate nanoparticles without damaging their optical properties (FIG. 16). This non-invasive operation is highly desired and advantageous in the fabrication of functional components and devices such as reconfigurable optical nanocircuits and active plasmonic waveguides. The CTAC layer can be readily removed without destroying the existing particle patterns by simply soaking the sample in water or isopropyl alcohol (IPA) for ~2 minutes. As shown in FIG. 5A and FIG. 5B, the positions of the colloidal particles remained the same after the removal of CTAC. Meanwhile, the measured scattering peak of 100 nm gold nanoparticles showed an obvious blueshift from ~580 nm to ~545 nm (FIG. 5C). This blueshift revealed a refractive-index change in the particle surrounding, which confirmed the successful removal of CTAC (the refractive index of CTAC is 1.38). The ability to remove CTAC after optothermally-gated photon nudging manipulation can avoid any undesirable effects of CTAC in some of applications of the patterned particles, including chemical and biological sensing.

Figure 5D:
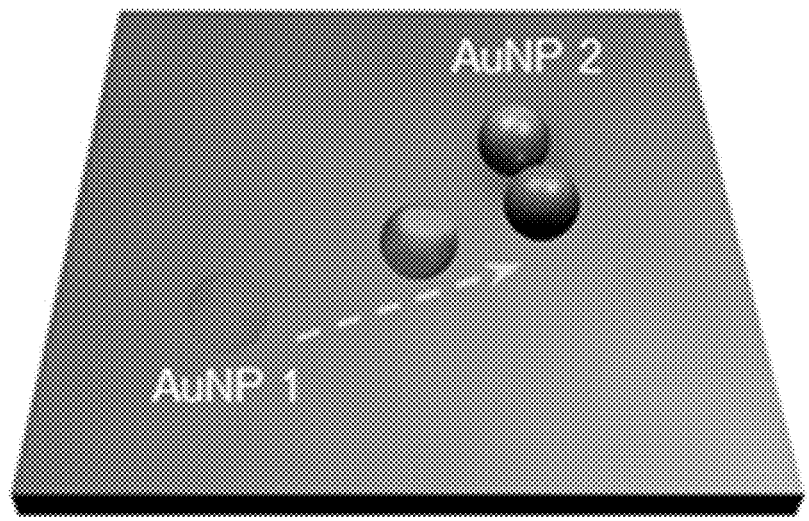
Figure 5E:
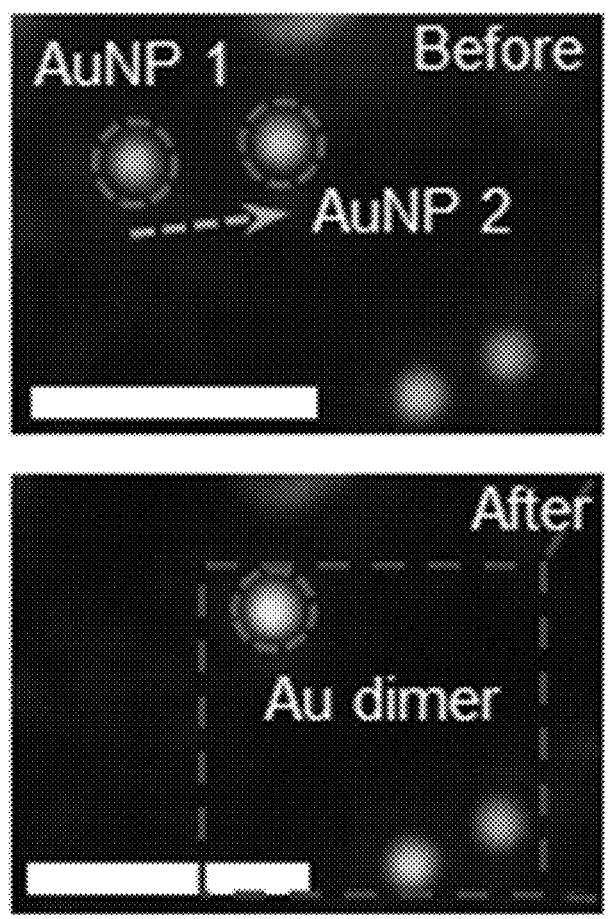
Figure 5F:
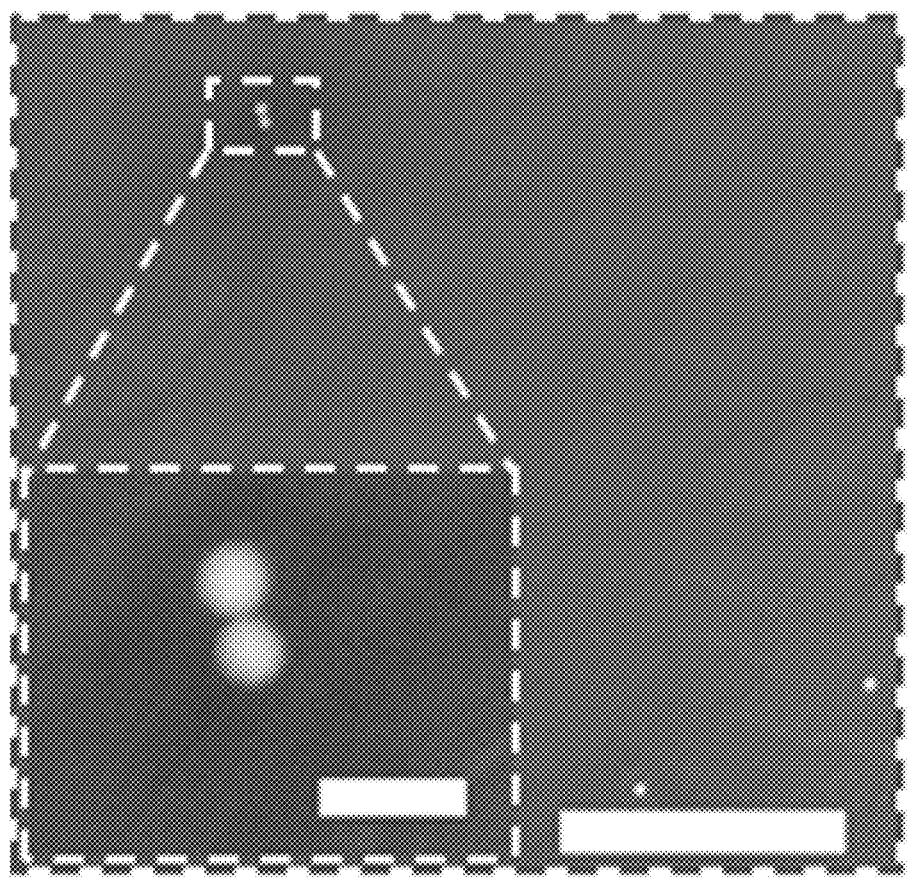
Figure 5G:
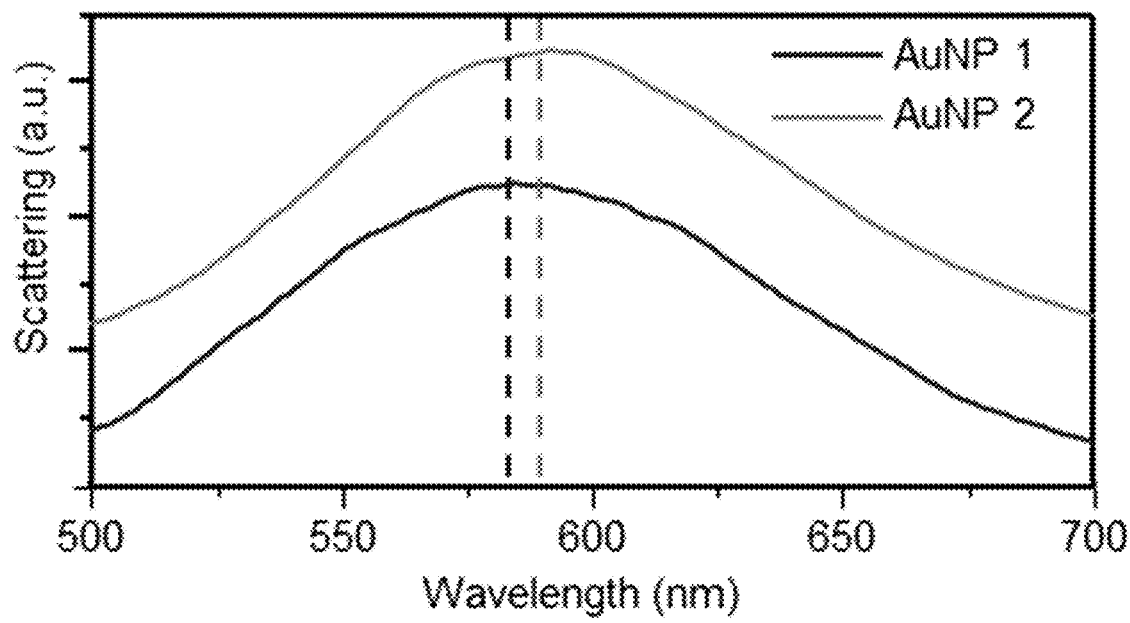
Figure 5H:
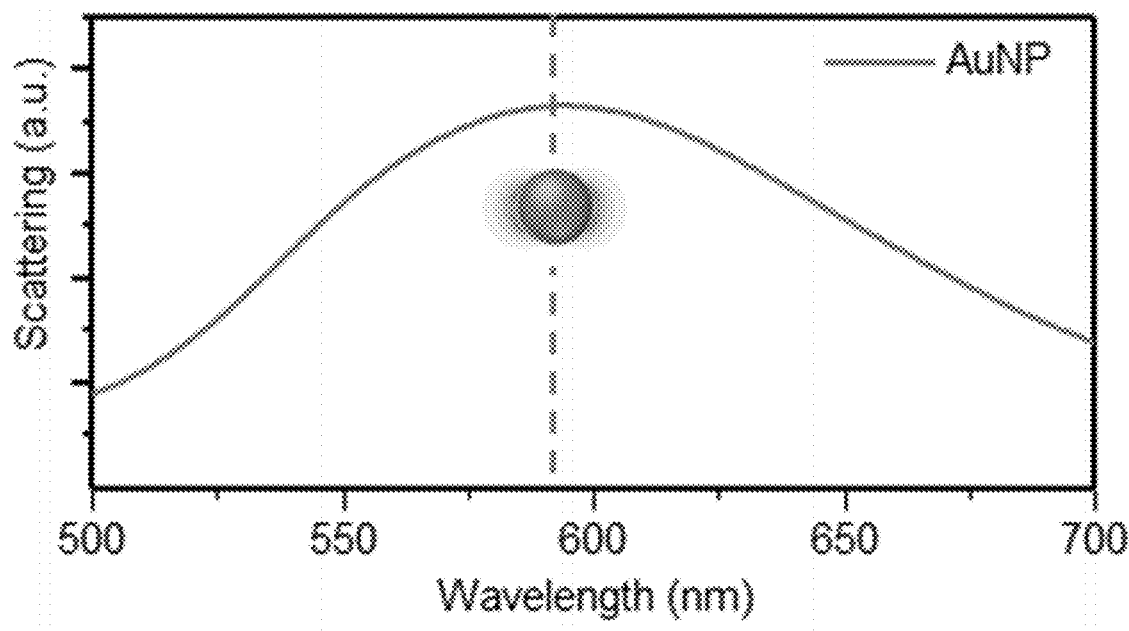
Figure 5I:
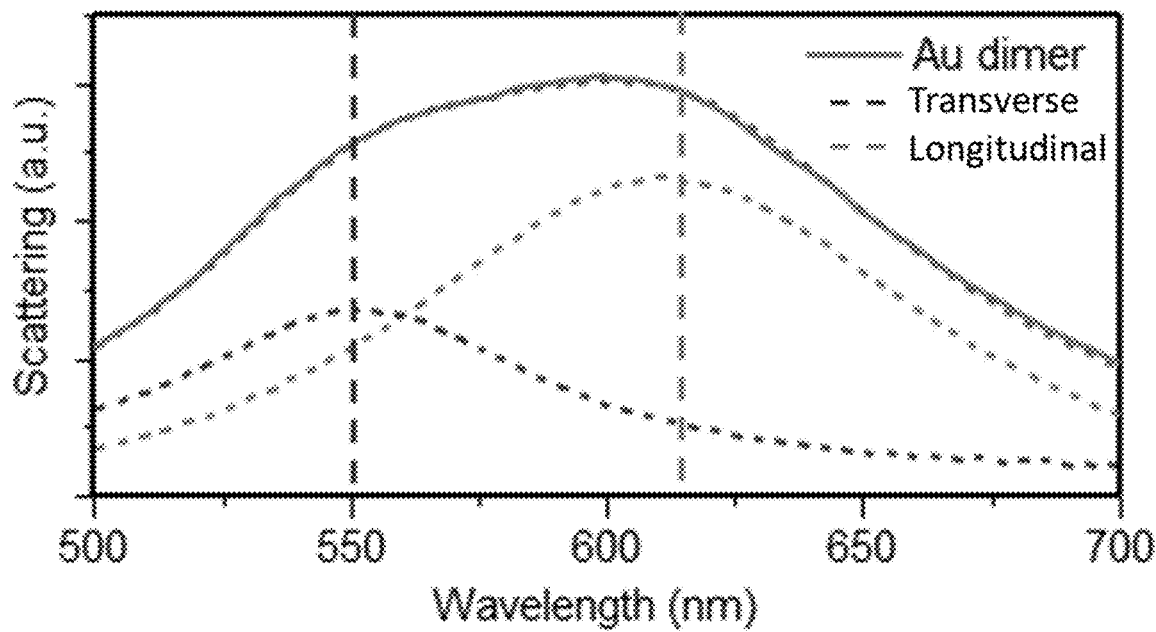
Figure 5J:
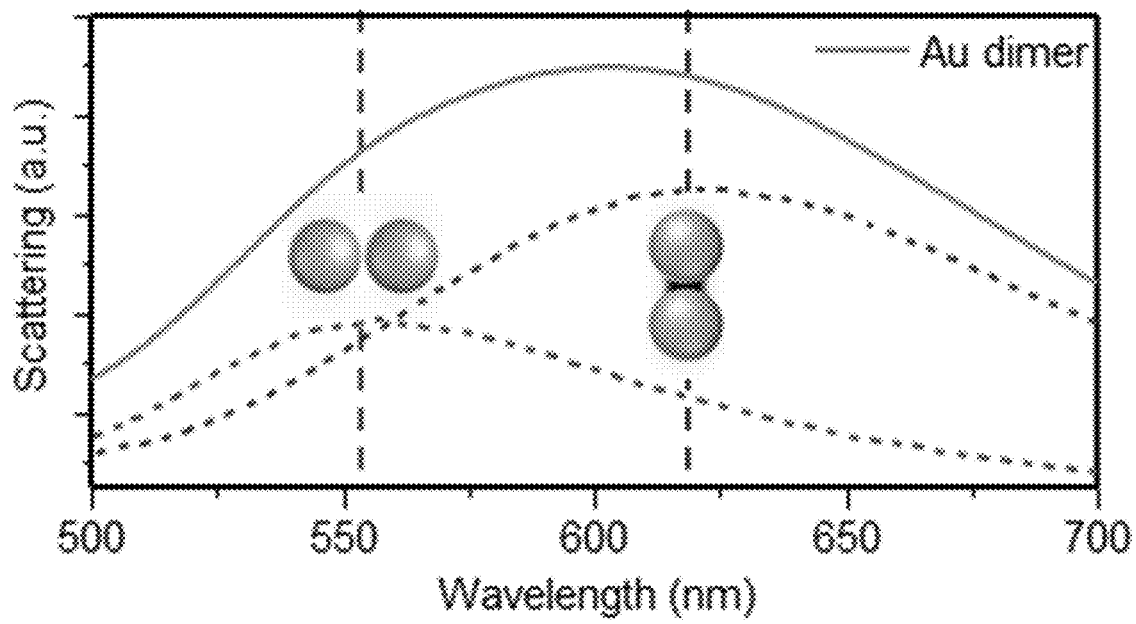

Furthermore, optothermally-gated photon nudging's potential to assemble and characterize colloidal structures with near-field coupling was explored. One 100 nm gold nanoparticle was delivered to the vicinity of another 100 nm gold nanoparticle by optothermally-gated photon nudging, as depicted in FIG. 5D and FIG. 5E. The assembled structure was confirmed by the SEM image, from which a clear dimer with a gap of ~15 nm can be observed (FIG. 5F). Before assembly, the single gold nanoparticles showed a localized surface plasmon (LSP) peak at ~588 nm (FIG. 5G). The small difference in the LSP peaks of these two gold nanoparticles resulted from the slight variations in the particle sizes, as shown in FIG. 5F. The single scattering peak split into two peaks at ~550 nm and ~614 nm (FIG. 5I), which unequivocally revealed the near-field coupling between two gold nanoparticles. The scattering spectra and electric field enhancement profiles of a single 100 nm gold nanoparticle and a 100 nm gold nanoparticle dimer with a gap of 15 nm were simulated (FIG. 5 h and FIG. 5J). The gold nanoparticle dimer exhibited a longitudinal mode at ~618 nm and a transverse mode at ~553 nm, which signify a redshift and a blueshift, respectively, contrasting from the original dipole mode at ~590 nm for the single 100 nm gold nanoparticle (Huang et al. *Nano Lett.* 2010, 10, 1787-1792). The simulation results matched very well with the experimental spectra shown in FIG. 5G and Figure SI. Although the sub-wavelength interparticle gap cannot be distinguished in optical images due to the diffraction limit, optothermally-gated photon nudging can reliably fabricate Au dimers with any desired gap by taking advantage of the in situ optical spectroscopy (Supplementary Note 6 and FIG. 22). The ability to control the near-field coupling of nanoparticles allows functional colloidal devices to be fabricated for a variety of nanophotonic applications, such as chiral metamolecules (Lin et al. *Mater. Today* 2019, 25, 10-20). With simultaneous reconfigurable nanofabrication on a solid substrate and in situ optical characterizations, optothermally-gated photon nudging can provide a powerful platform to design active optical devices and study the coupling between colloidal structures. Furthermore, optothermally-gated photon nudging can be applied in a vacuum or an inert gas environment to assemble water-soluble and air-unstable nanoparticles (e.g., halide perovskite nanoparticles (Tiguntseva et al. *Nano Lett.* 2018, 18, 5522-5529; Tiguntseva et al. *Nano Lett.* 2018, 18, 1185-1190)) and explore the light-matter interactions in combination with other vacuum-based analytical tools, such as scanning transmission electron microscopy and cathodoluminescence spectroscopy.

Discussion Through coordinating optical heating and radiation-pressure forces, an optothermally-gated photon nudging (OPN) technique was developed for nanomanipulation and patterning of colloidal particles and nanowires on a solid substrate. Optothermally-gated photon nudging represents a milestone in pushing the working conditions of optical tweezers from fluidic to solid phases. As a general solid-phase optical technique, optothermally-gated photon nudging is applicable to a wide range of metal, semiconductor, metal oxide and dielectric nanoparticles with varying sizes and shapes. By improved heat management and proper choice of working wavelengths (Supplementary Note 7 and FIG. 23), optothermally-gated photon nudging is readily extended to manipulate many other particles that exhibit strong ultraviolet or near-infrared responses such as aluminum nanoparticles (Knight et al. *ACS Nano* 2014, 8, 834-840) and titanium nitride nanoparticles (Guler et al. *Nanophotonics* 2015, 4, 269-276). Optothermally-gated photon nudging can dynamically pattern colloidal particles into any desired configurations. However, it remains challenging to achieve sub-20 nm position accuracy and orientational control of anisotropic nanoparticles due to the optical diffraction limit.

Future efforts can be made to further enhance the strengths of optothermally-gated photon nudging. One can optimize the optics to achieve a more efficient operation. For instance, oblique incidence of the laser can take advantage of photon momentum along the direction of beam propagation, which could enhance both amplitude and directional control of the driving forces. While optothermally-gated photon nudging offers the opportunity to manipulate colloids at single-particle resolution, it suffers from relatively low patterning throughput, which is primarily limited by its serial and manual control. The implementation of a light spatial modulator with a digital feedback control will open up the possibilities for automatic and parallel manipulation to significantly boost the production output.

Along with the development of optothermally-gated photon nudging, the fundamental understanding and dynamic control of particle-substrate and light-particle interactions was advanced. With the in situ optical spectroscopy, optothermally-gated photon nudging holds the potential to dynamically assemble colloidal matters and to explore the mechanical, electronic, and optical couplings between colloidal particles at the nanoscale. With its simple optics, non-invasive operation and versatile capabilities of colloidal assembly, optothermally-gated photon nudging can find a wide range of applications in nanophotonics, nanoelectronics, materials science, and colloidal sciences.

Supplementary Note 1. Understanding the Role of Optical Heating and Scattering Forces.

Figure 9A:
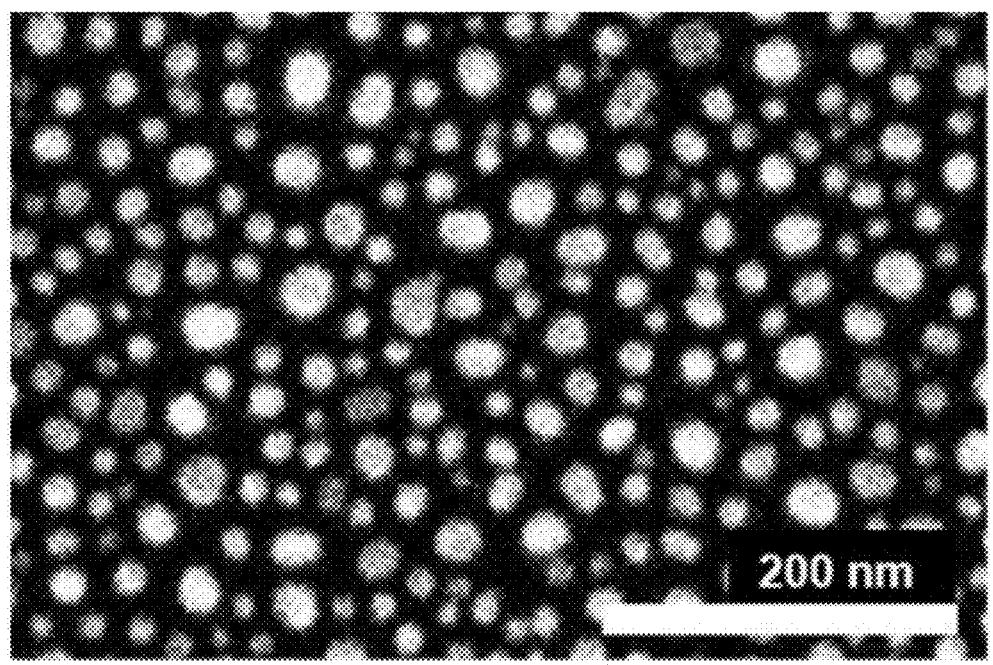
FIG. 9A-FIG. 9B. Characterization of the thermoplasmonic substrate.
Figure 9B:
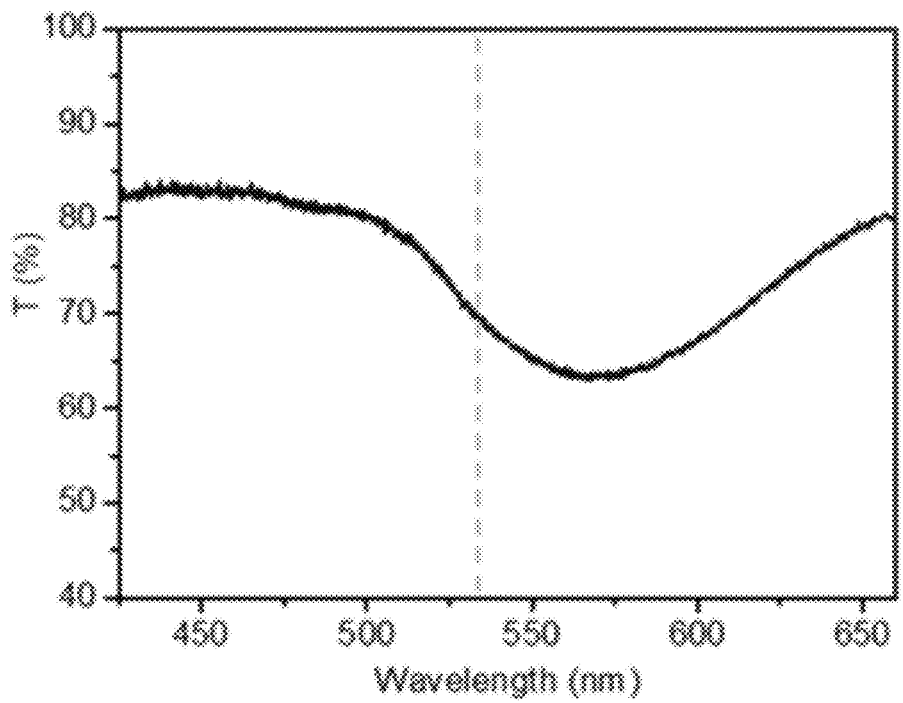
Figure 10:
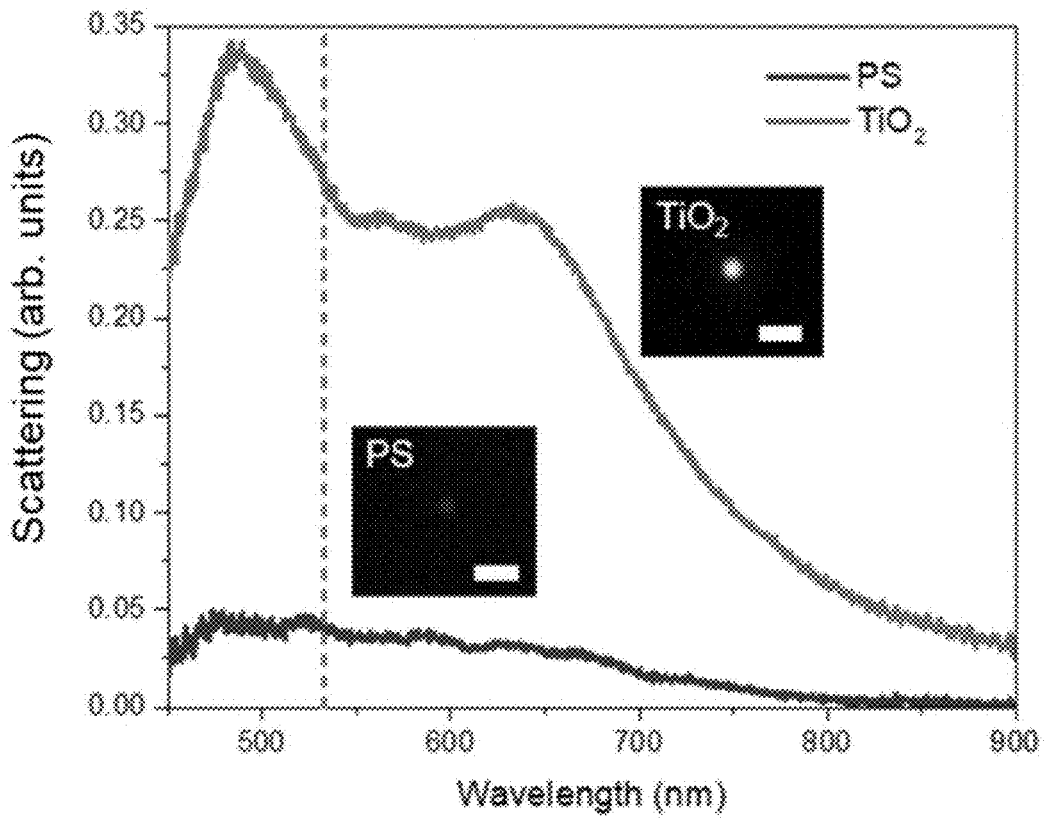
Figure 11A:
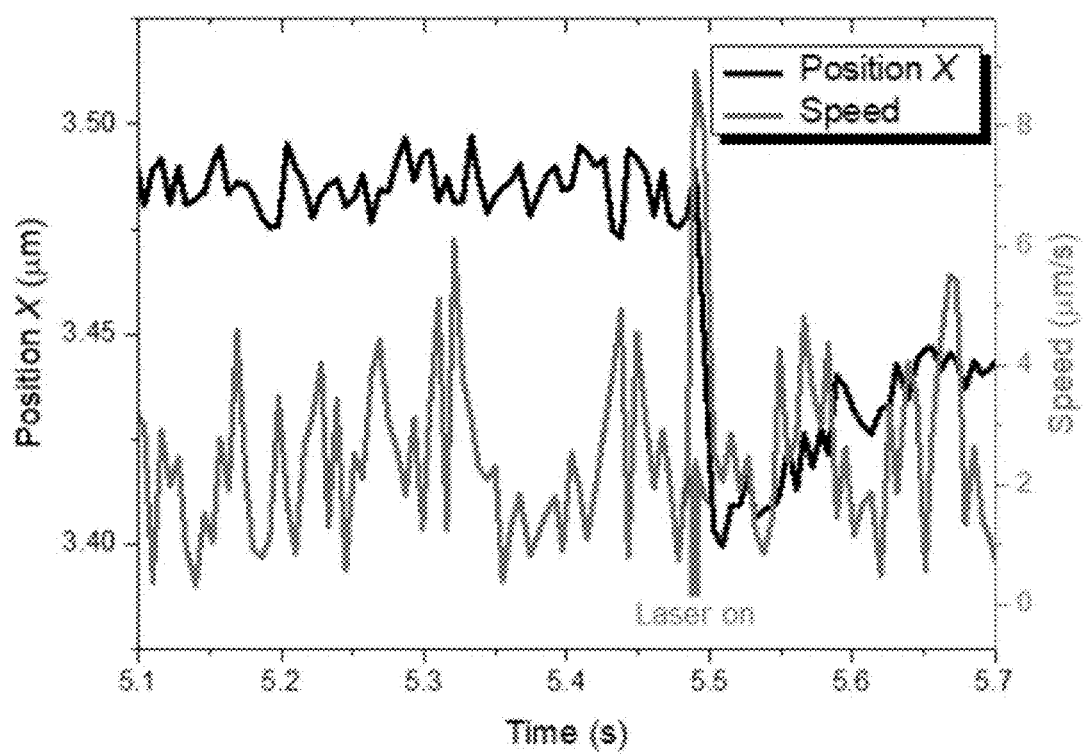
FIG. 11A-FIG. 11D. Measured position and speed of a 300 nm gold nanoparticle. Incident power.
Figure 11B:
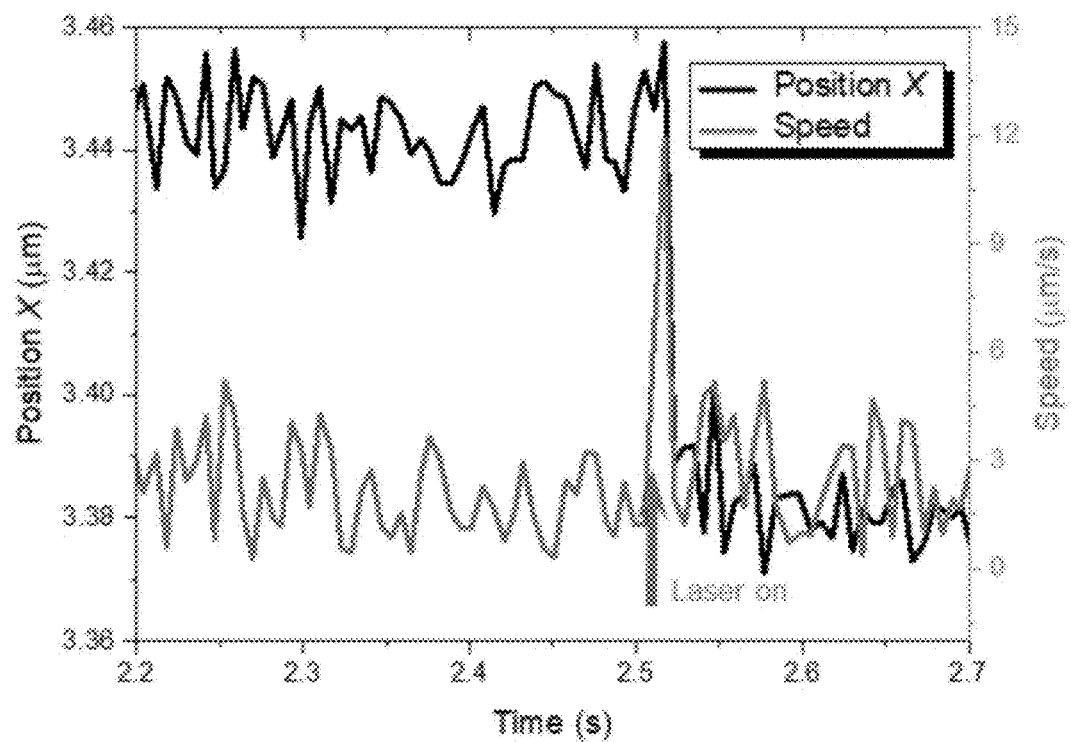
Figure 11C:
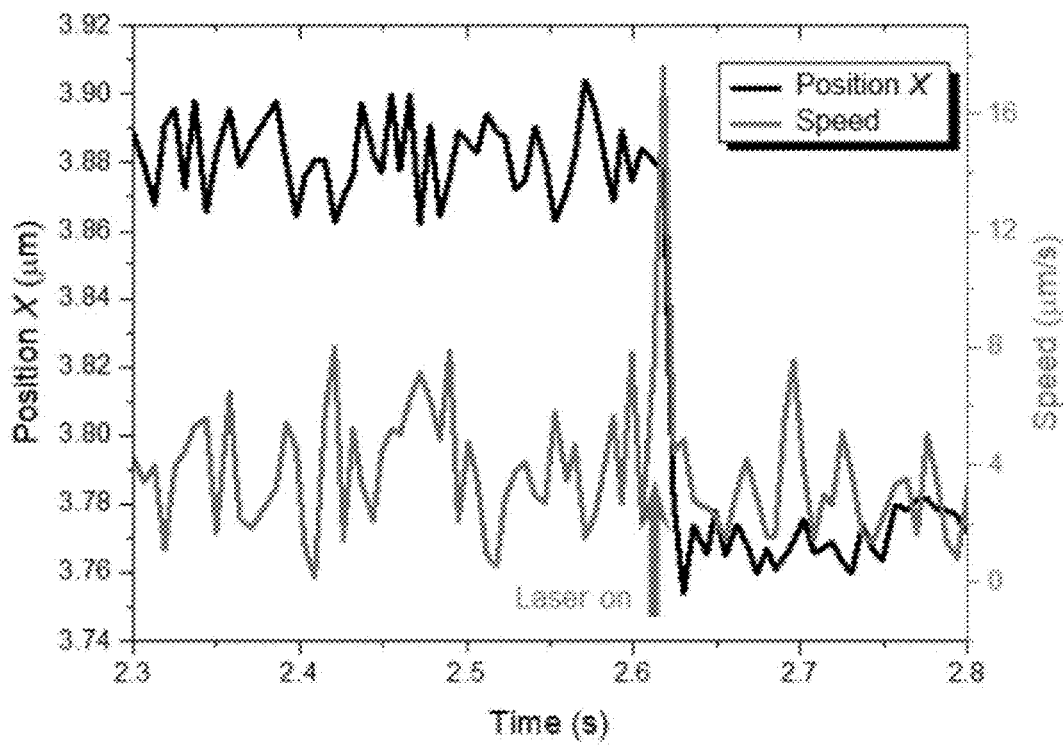
Figure 11D:
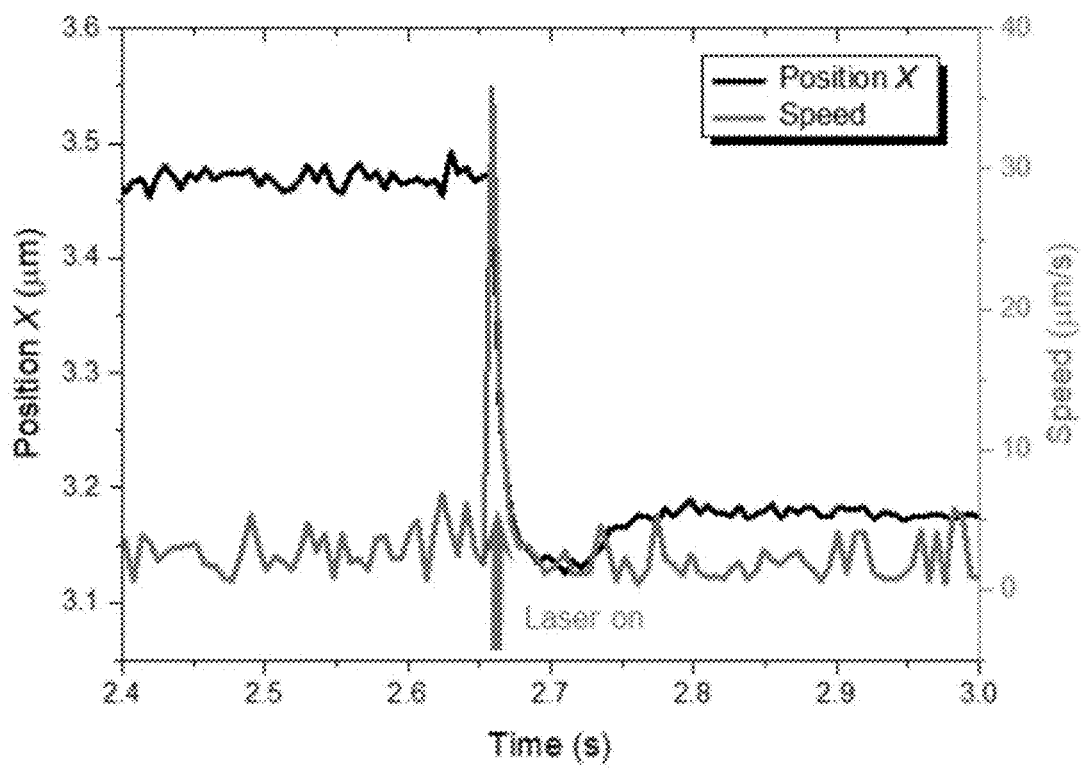

In order to understand the role of optical heating and scattering, a series of control experiments were designed and conducted. Gold nanoparticles (or silver nanoparticles, silicon nanoparticles) are known to exhibit strong light absorption and light scattering (Baffou et al. *Laser Photonics Rev.* 2013, 7, 171-187; Fu et al. *Nat. Commun.* 2013, 4, 1527). To decouple the optical heating and scattering forces and explore the effects of each factor, two strategies were applied. First, a thermoplasmonic substrate composed of quasicontinous gold nanoislands (AuNIs) was used as the heat source (FIG. 9). Localized surface plasmon resonances were excited on the gold nanoisland substrate under the radiation of a 532 nm laser beam with both high-efficiency light absorption and photon-phonon conversion to generate well-confined and localized thermal hotspots (Lin et al. *Adv. Funct. Mater.* 2018, 28, 1803990). With this setup, gold nanoislands can effectively serve as external heating sources, which allows the manipulation of particles with weak photothermal responses to be explored. Second, polystyrene (PS) and titanium dioxide ($TiO_2$) nanoparticles were used for the control experiments. Both polystyrene and $TiO_2$ nanoparticles had negligible optical absorption at 532 nm (Zhao et al. *Mater. Lett.* 2007, 61, 79-83; Li et al. *Polym. Bull.* 1991, 25, 211-216). While $TiO_2$ nanoparticles showed strong light scattering at this wavelength and polystyrene nanoparticles showed much weaker scattering (FIG. 10).

The parameters and results of the control experiments are summarized in Table 1. In the absence of the CTAC layer, all particles were firmly bonded onto the glass substrate through strong van der Waals interaction (Urban et al. *Nano Lett.* 2010, 10, 4794-4798) and could not be moved by the laser beam. By adding the CTAC layer, Au (or Ag and Si) nanoparticles were able to be manipulated with both optical heating and scattering forces using optothermally-gated photon nudging. Since polystyrene and $TiO_2$ nanoparticles have weak optical absorption, they could not be manipulated without gold nanoislands, which highlights the importance of optical heating. This crucial optical heating caused by the gold nanoislands opened the CTAC optothermal gate, allowing the $TiO_2$ nanoparticles to be manipulated by optical scattering forces. Contrastingly, polystyrene nanoparticles could not be manipulated even under high-power radiation due to the lack of light scattering, its driving force. These results undoubtedly show that optothermally-gated photon nudging simultaneously exploits optical heating to open the optothermal gate and radiation-pressure forces to drive the particles.

Figure 17:
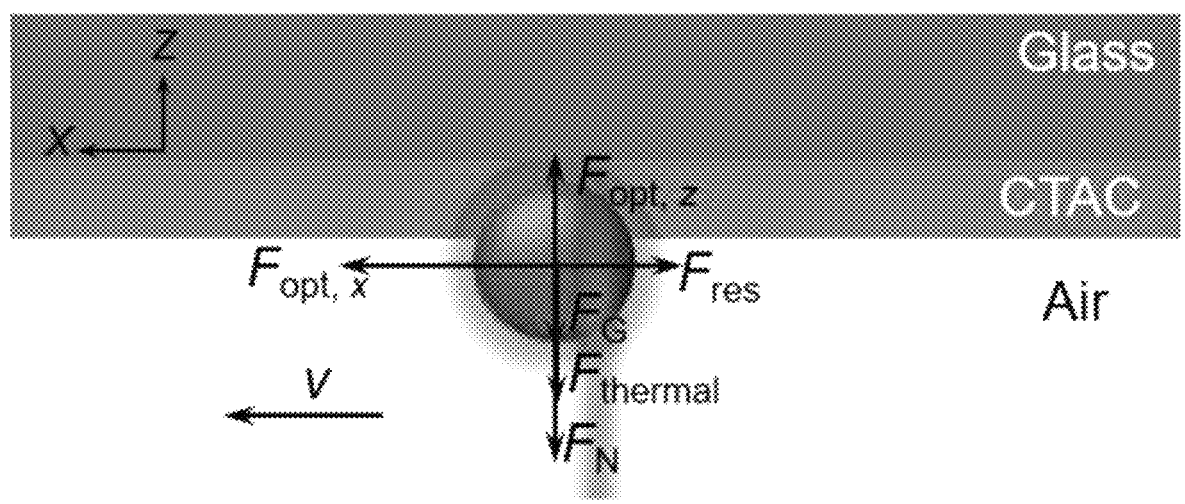
FIG. 17. The scheme of force analysis in optothermally-gated photon nudging platform under laser irradiation. In the Z-direction, there is a gravity force $F_G$, an optical force $F_{opt,z}$, a normal force $F_N$, and a thermal expansion force $F_{thermal}$. Since the particles are moved along the X-Y plane, all forces in the Z-direction are balanced. In the X-direction, there is an optical force $F_{opt,x}$ and a resistance force $F_{res}$. Both particles and the CTAC layer are charged, there are also electrostatic forces $F_{electro}$ which are not depicted in the schematic. The forces shown in the scheme are not scaled.

Supplementary Note 2. Excluding the thermal expansion force and electrostatic force in optothermally-gated photon nudging as the driving forces. Multiple forces exist in this optothermally-gated photon nudging platform, including optical, thermal expansion, electrostatic, and resistance forces (FIG. 17). The thermal expansion and electrostatic force were excluded as the primary driving forces in optothermally-gated photon nudging. In the experimental setup (FIG. 6), the thermal expansion force imposes a downward momentum to the particle and drives the particle away from the CTAC layer (Alam et al ACS Omega 2018, 3, 1213-1219). By directing a laser beam with an increased optical power of 2.7 mW at a 200 nm gold nanoparticle, the immediate launch of the gold nanoparticle to another position was observed. The fact that the gold nanoparticle still remained on the substrate indicates that the out-plane thermal expansion force is not dominant, and the gold nanoparticle was quickly pushed to the new position by the in-plane optical force instead.

Since both particles and CTAC layers are charged, there are electrostatic forces in the optothermally-gated photon nudging system. The cationic CTAC was replaced by an anionic surfactant, (SDS) (Casson et al. J. Phys. Chem. B 1998, 102, 7434-7441), to rule out the electrostatic force. Particles on a SDS layer can be manipulated with the laser beam similar to those on a CTAC layer, confirming the minor role of electrostatic force in optothermally-gated photon nudging.

Figure 12A:
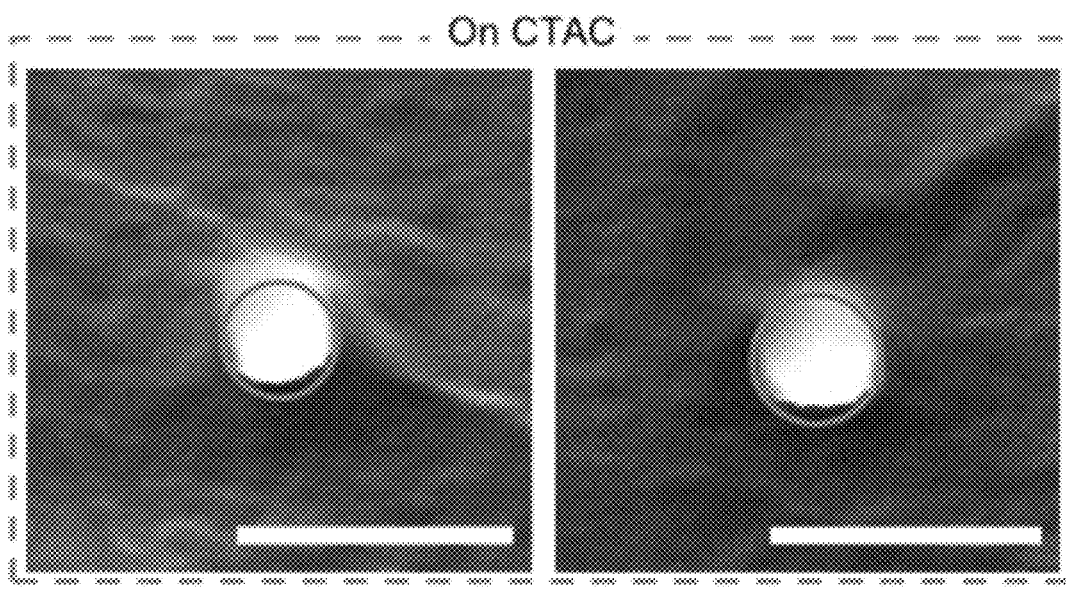
FIG. 12A-FIG. 12B. 45° titled SEM images of 200 nm gold nanoparticles.
Figure 12B:
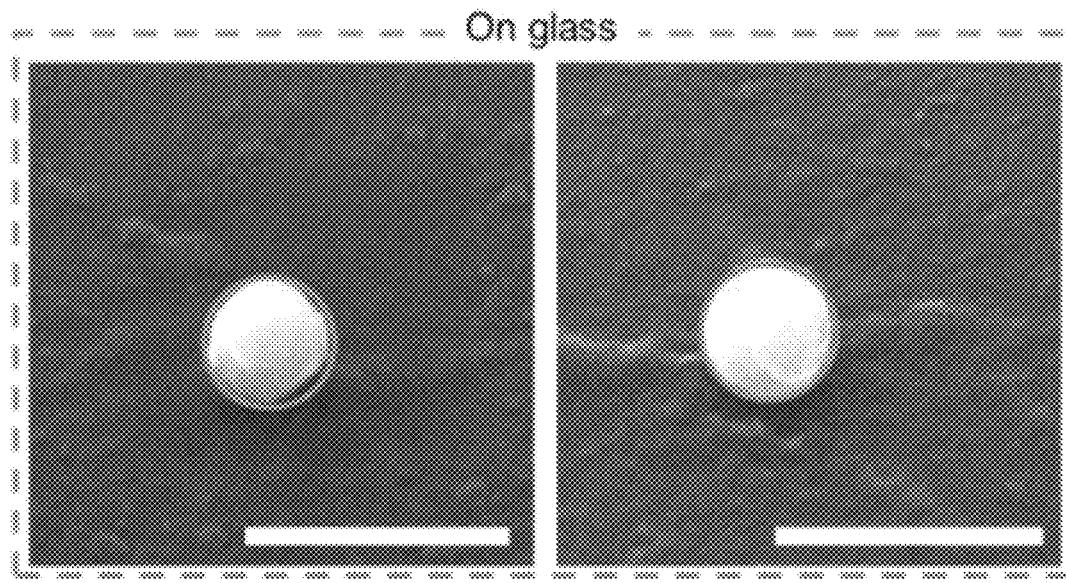
Figure 13A:
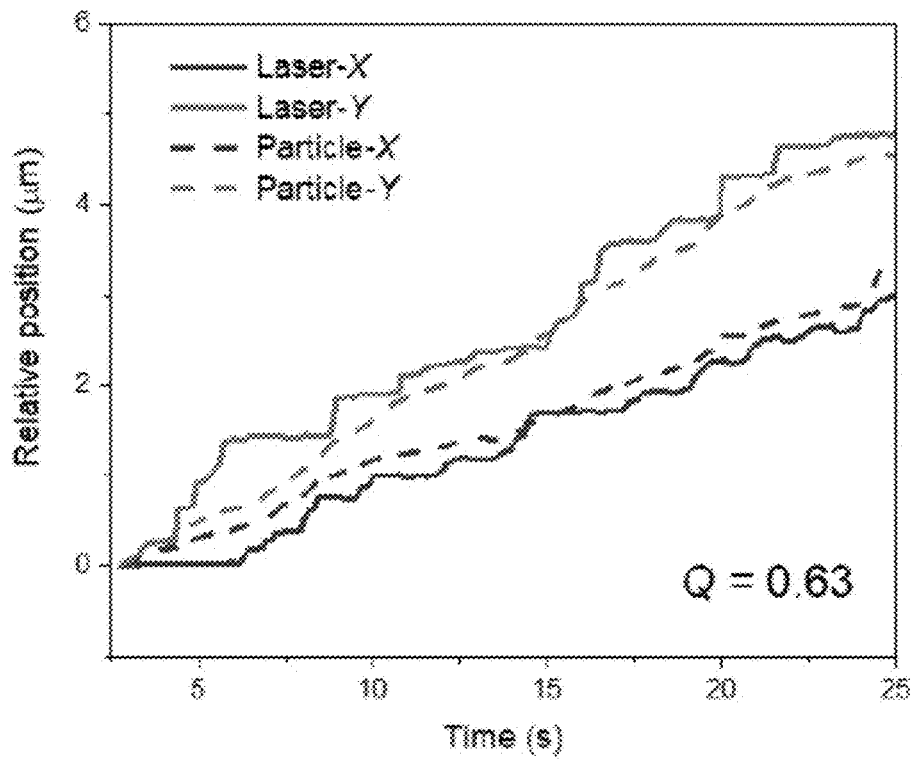
FIG. 13A-FIG. 13E. Trajectories of the particles and laser beam.
Figure 13B:
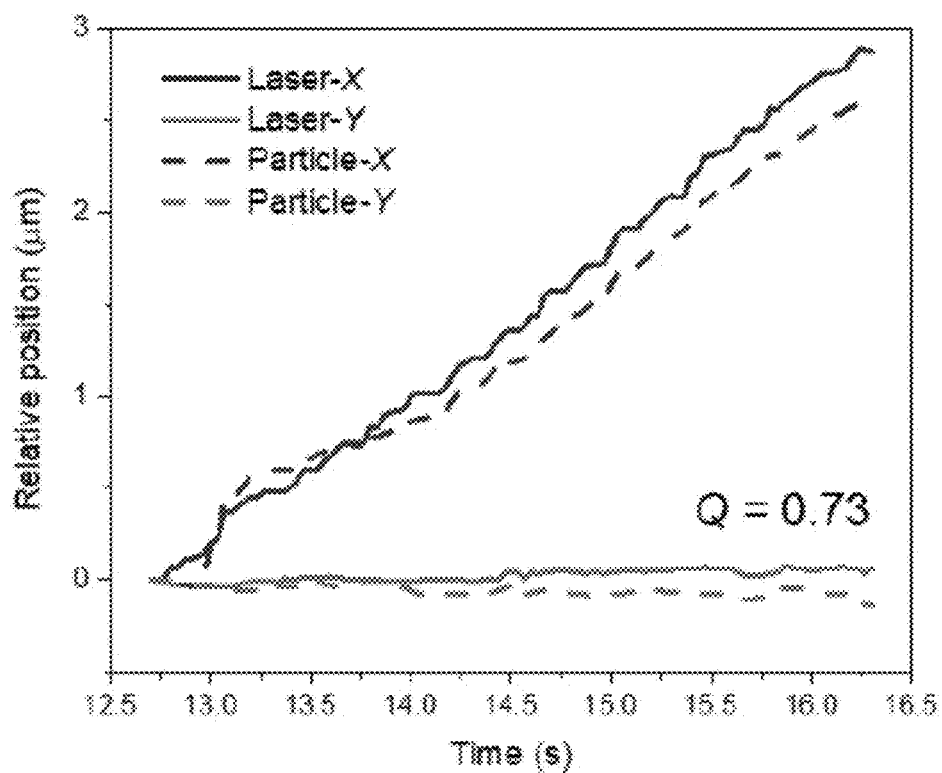
Figure 13C:
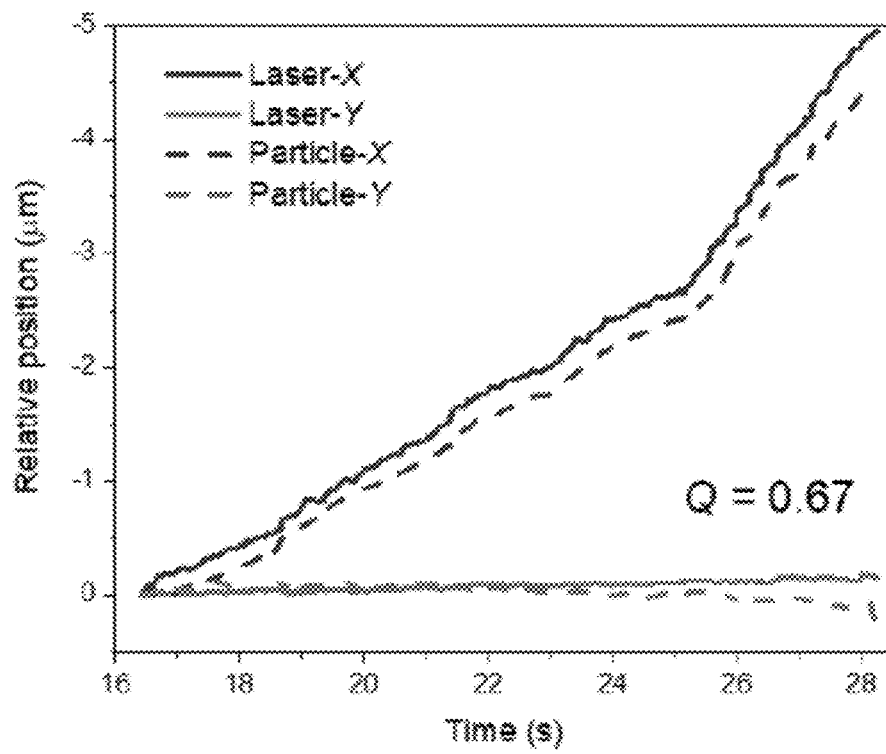
Figure 13D:
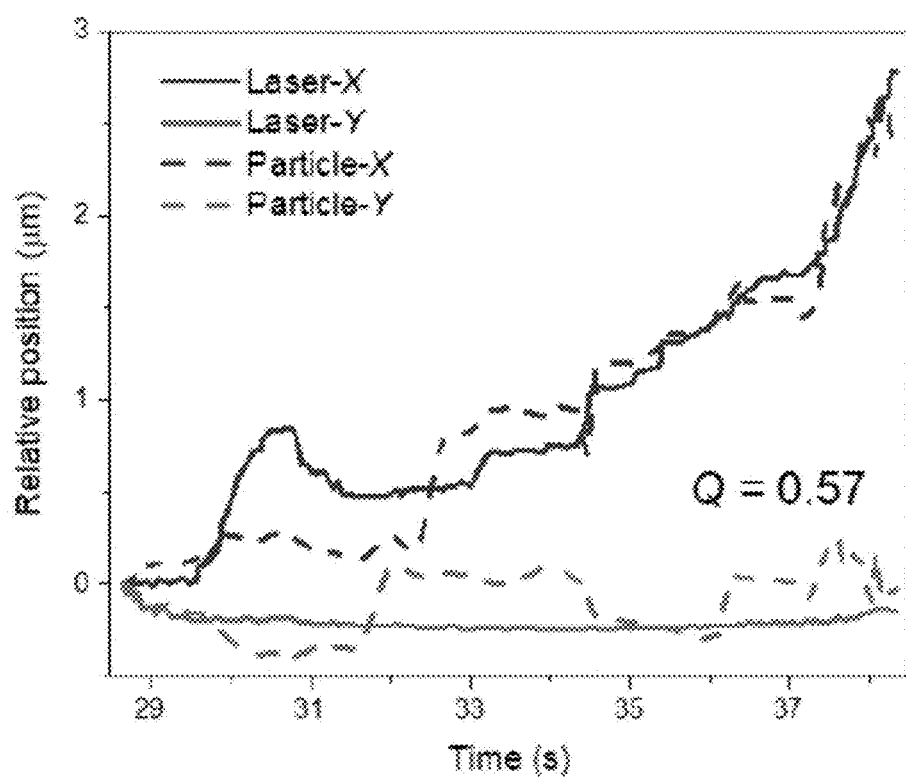
Figure 13E:
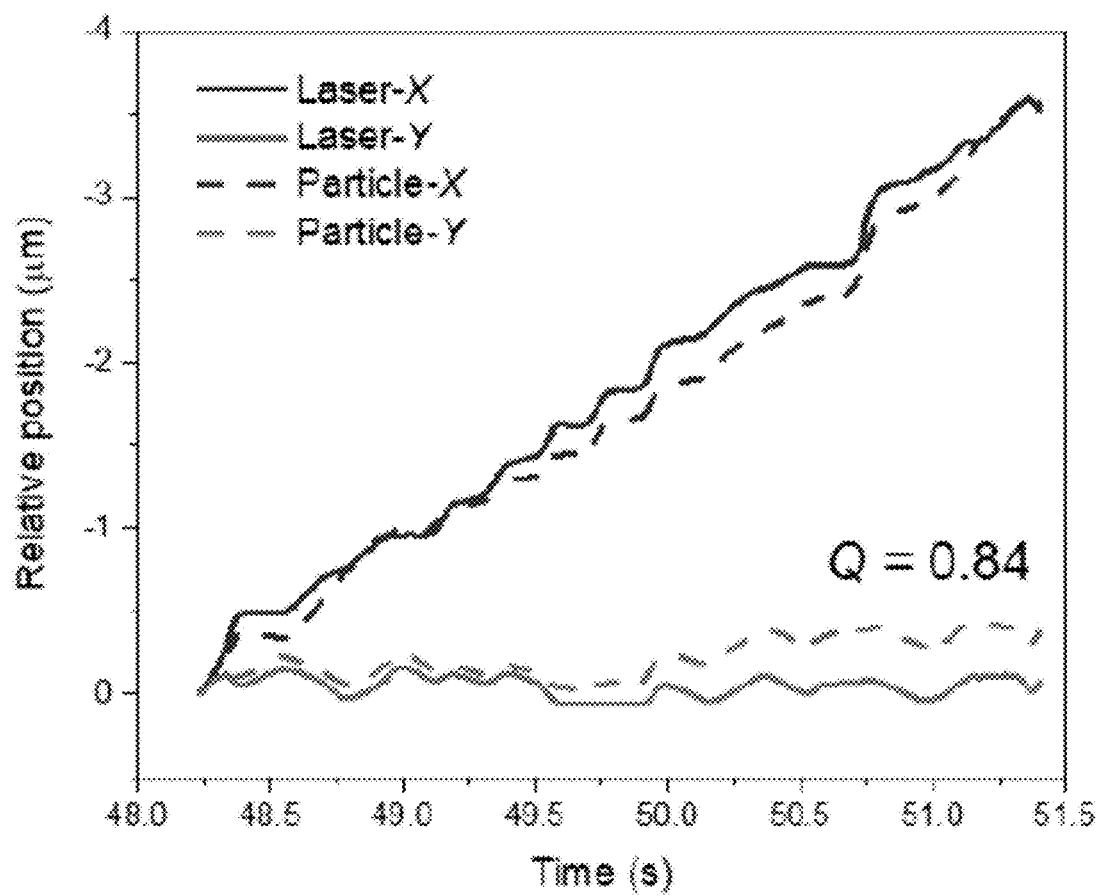

Supplementary Note 3. Calculating resistant forces in optothermally-gated photon nudging. During optothermally-gated photon nudging manipulation, colloidal particles are partially immersed into the quasi-liquid CTAC film (FIG. 12). Thus, the resistance force to the colloidal particle during the manipulation can be modelled as (Kralchevsky et al. Adv. Colloid. Interfaces 2000, 85, 145-192; Danov et al. J. Colloid. Interface Sci. 1995, 175, 36-45):

$$F_{res} = 6\pi\eta R f_d v \quad (1)$$

where $\eta$ is the viscosity of the quasi-liquid CTAC, R is the radius of the particle, $f_d$ is a dimensionless drag coefficient, and v is the velocity of the particle. To calculate $F_r$—, $\eta$ and $f_d$ were determined as discussed below.

3.1 Molecular Dynamics (MD) simulation of the viscosity of the quasi-liquid CTAC. The viscosity of CTAC in its quasi-liquid state was calculated by molecular dynamics (MD) simulations with the LAMMPS package (Plimpton. J. Comput. Phys. 1995, 117, 1-19). The velocity Verlet algorithm was employed in integrating equations of motion, and the time step is 0.25 fs. Initially, the isothermal-isobaric (NPT) ensemble was employed to reach the required temperature and pressure (1 atm). Then, the system was equilibrated under the canonical ensemble (NVT) with the Langevin heat reservoir at the target temperature for 0.5 ps, followed by relaxation under a microcanonical ensemble (NVE) for 0.2 ns. Finally, a production step of 10 ns was adopted under the NVE condition, during which the pressure tensor was calculated every 10 fs to obtain PACF. For each case, four independent simulations were performed with different initial atom velocity assignments, implemented by using different seeds for random number generation. Averaged values were obtained to improve the reliability of the simulation results. The SHAKE algorithm was employed to fix geometries of the water molecules and partial bonds of CTAC molecule (Hockney et al. Computer simulation using particles. CRC Press, 1988). Long-range electrostatic interactions were counted using the particle-particle particlemesh method (Sun. J. Phys. Chem. B 1998, 102, 7338-7364) with a precision of $10^{-6}$.

Figure 18C:
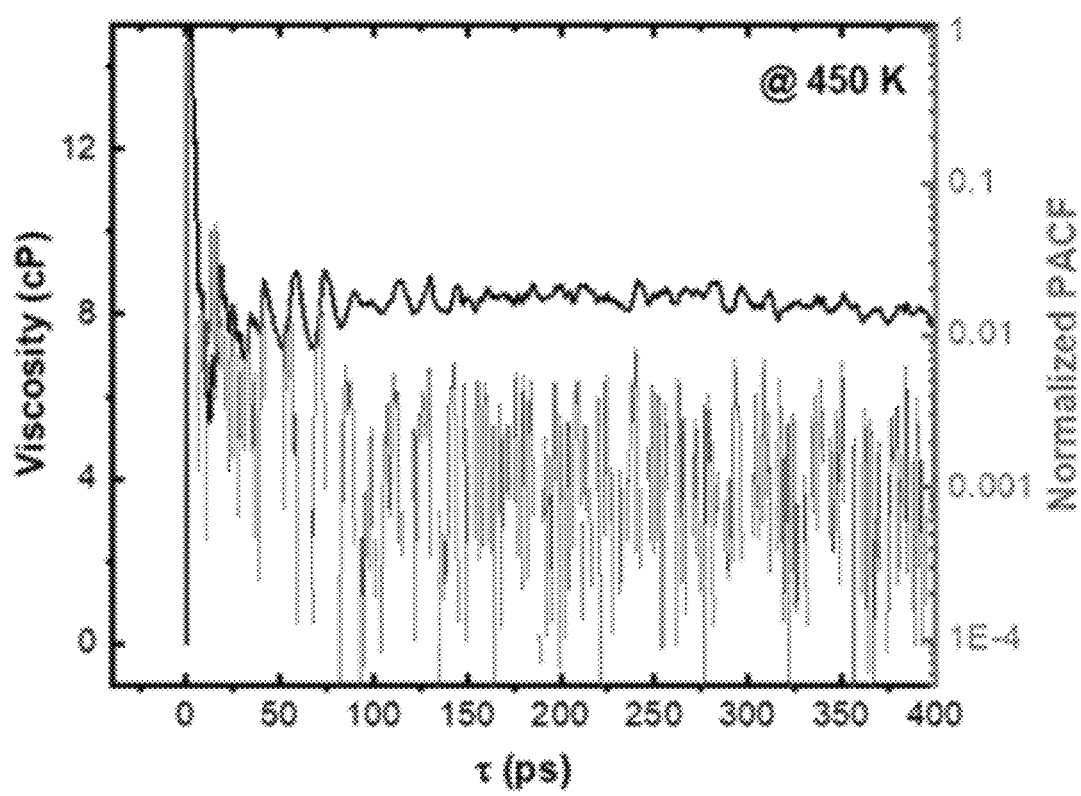
Figure 19:
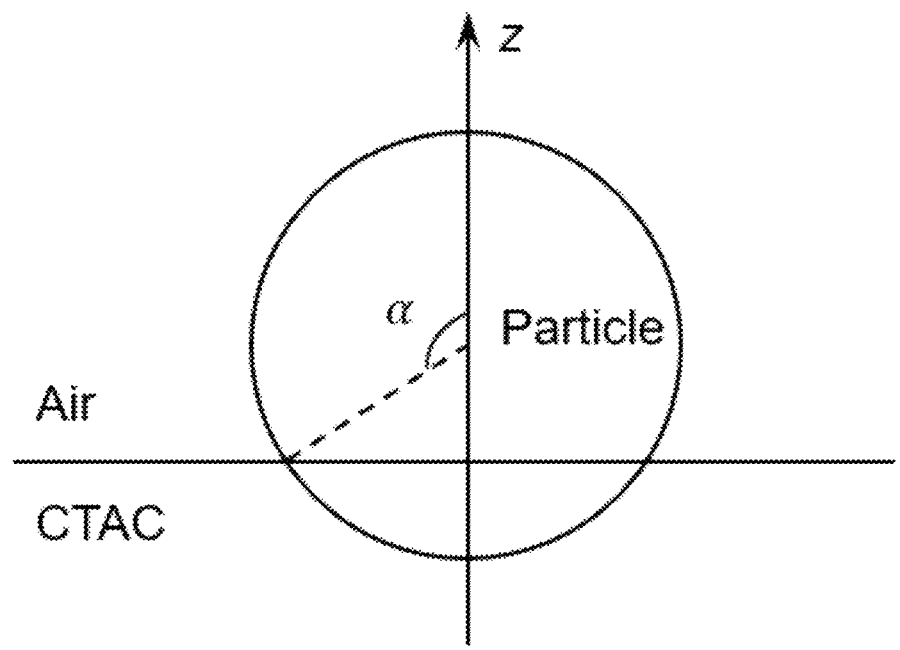
FIG. 19. Geometry of the system to define the contact angle α.

During the optothermally-gated photon nudging manipulation, the temperature of CTAC surrounding the gold nanoparticle exceeds 450 K (FIG. 1D). Thus, the structure and viscosity of CTAC was simulated at 450 K. An order-disorder phase transition of CTAC can clearly be observed when temperature increases from 298 K to 450 K (FIG. 18A and FIG. 18B), confirming the formation of quasi-liquid CTAC. The result is consistent with the reported publications (Tian et al. J. Phys. Chem. C 2016, 120, 23905-23909). The viscosity of the quasi-liquid CTAC is calculated based on Green-Kubo linear response theory by the integral of pressure tensor autocorrelation function (PACF) via (Allen et al. Computer simulation of liquids. Oxford University Press, 2017):

$$\eta = \frac{V}{k_B T} \int_0^\tau \langle P_{\alpha\beta}(0) P_{\alpha\beta}(t) \rangle dt$$

where V is the system volume, $k_B$ is the Boltzmann constant, T is the temperature and $\tau$ is correlation time. The angle bracket denotes time correlation function, also interpreted as ensemble averaging. $P_{\alpha\beta}$ is an off diagonal ($\alpha$, $\beta$=x, y, z; $\alpha\neq\beta$) element of the pressure tensor, which for an N-particle system is calculated by $$P_{\alpha\beta} = \frac{1}{V}\sum_{i=1}^{N}(m_i v_{i\alpha} v_{i\beta} + r_{i\alpha} f_{i\beta})$$

where $m_i$, $v_i$, $r_i$, and $f_i$ are the mass, velocity, position, and force of the atom i, respectively. The simulated viscosity at 450 K was calculated to be 8.7 mPa·s (FIG. 18C). Which was used for calculation of the resistant forces.

3.2 Determination of the drag coefficient. According to the theory developed by Danov et al. (Danov et al. J. Colloid. Interface Sci. 1995, 175, 36-45), when a colloidal particle is half-immersed in a thin liquid film, the drag coefficient $f_d$ is only a function of the contact angle $\alpha$ (FIG. 19) and the surface viscosity. In this system, CTAC has a free surface (no liquid-liquid interface), therefore, the surface viscosity is 0. In this case, $f_d$ is almost independent of the contact angle (Danov et al. J. Colloid. Interface Sci. 1995, 175, 36-45). When $\alpha$ is 90°, fa equals 0.5 corresponding to the half-immersed case. In this case, the contact angle is larger than 90° (FIG. 12), and the corresponding $f_d$ is smaller than 0.5 Based on the results by Danov et al. (Danov et al. J. Colloid. Interface Sci. 1995, 175, 36-45), the drag coefficient in this case was estimated to be ~0.3-0.4 for the calculation of resistant forces. As an example, the resistant force for 200 nm gold nanoparticles were calculated based on the experimental velocities. At the optical power of 1.4 mW, the measured velocity is ~70 μm s$^{-1}$, and the calculated resistant force is ~0.35 pN, which is in similar range of the optical forces.

Figure 20A:
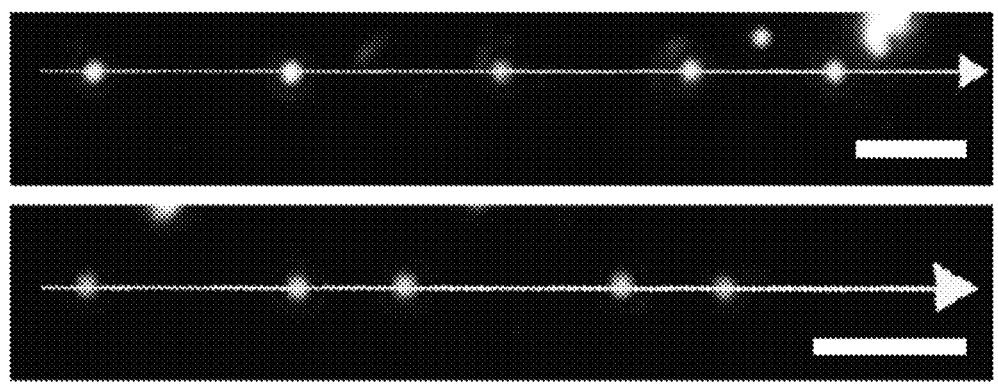
FIG. 20A-FIG. 20C. Precise patterning of 500 nm silicon nanoparticles with the assistance of the software.
Figure 20B:
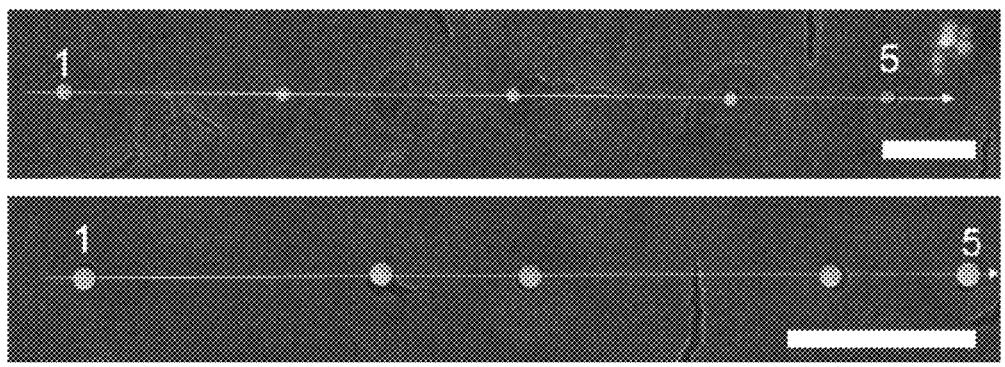
Figure 20C:
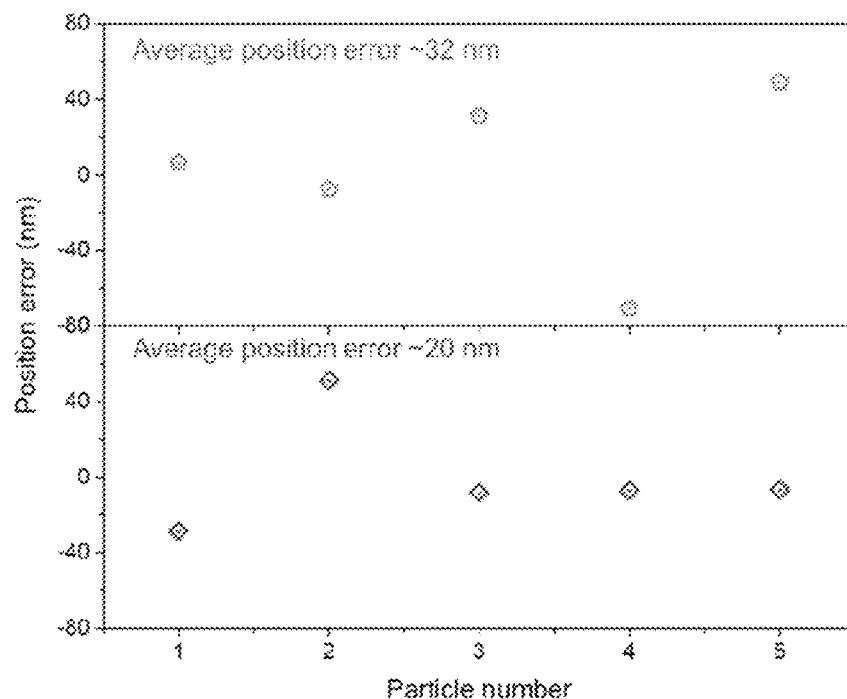

Supplementary Note 4. Improving patterning accuracy with the assistance of the imaging software. The patterning accuracy of optothermally-gated photon nudging is primarily limited by the optical diffraction limit. Additionally, only naked eyes were relied on to estimate the positions of the nanoparticles during the experiments. Here, it was demonstrated that it is possible to apply the predesigned markers or imaging software to define the target lines for particle manipulation. As shown in FIG. 20A, the imaging software was used to define the target line and five silicon nanoparticles were moved to the lines. With the assistance of the target lines, the average position error was reduced to less than ~30 nm (FIG. 20B and FIG. 20C).

Figure 21A:
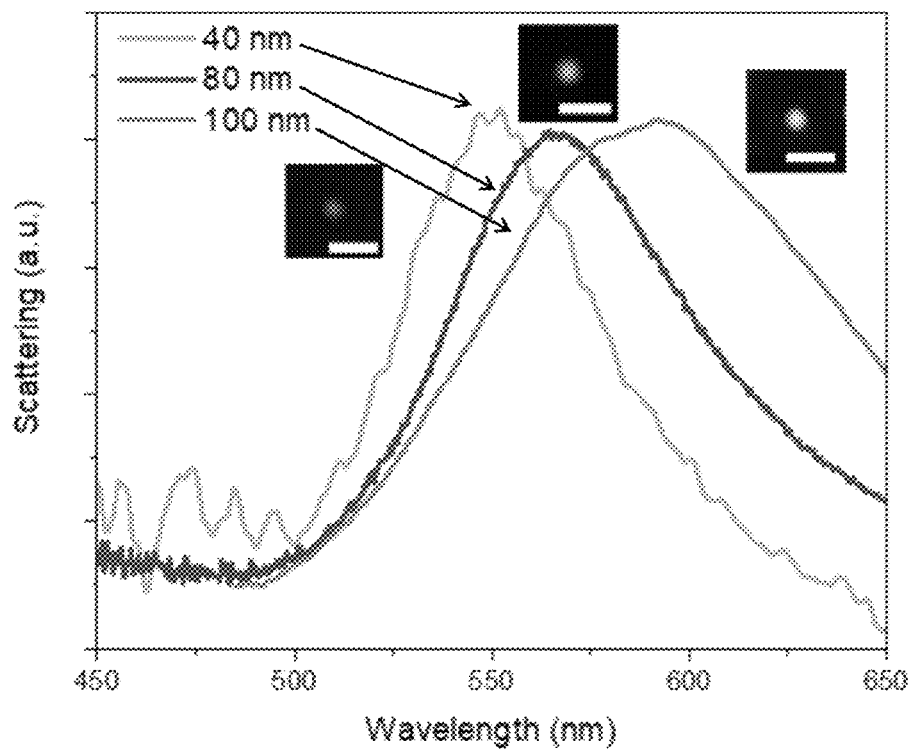
FIG. 21A-FIG. 21B. In situ Scattering spectra of gold nanoparticles and silver nanoparticles.
Figure 21B:
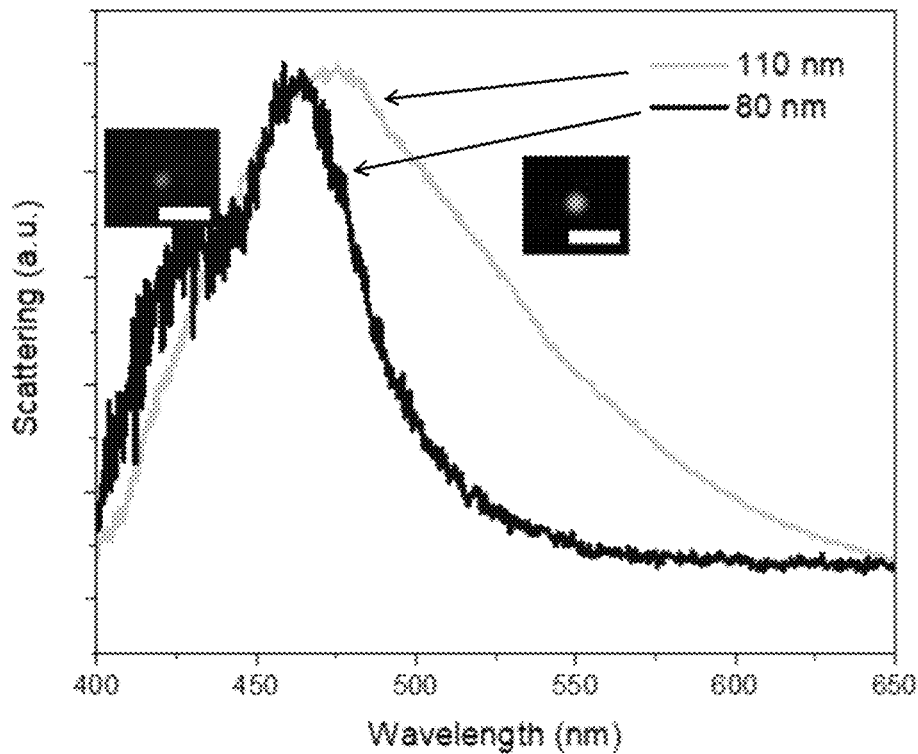

Supplementary Note 5. In situ spectroscopy to distinguish the colloidal particles with different sizes. In situ spectroscopy was applied to measure the experimental spectra to verify the different sizes of the particles. As shown in FIG. 21, the color of the gold nanoparticles changes from green to yellow when the diameter increases from 40 to 100 nm. The corresponding scattering peak redshifts from 545 to 590 nm. Similarly, when the size of silver nanoparticles increased from 80 nm to 110 nm, the hue of the particle changes from blue to cyan, with a redshift of the scattering peak position from 465 to 480 nm. Since the laser is not needed to trap the target colloidal particle during the spectral measurement, the optothermally-gated photon nudging can effectively avoid the interference from the laser beam. For instance, while using a 532 nm laser, the scattering spectra at that specific wavelength can still be recorded (FIG. 21).

Figure 22D:
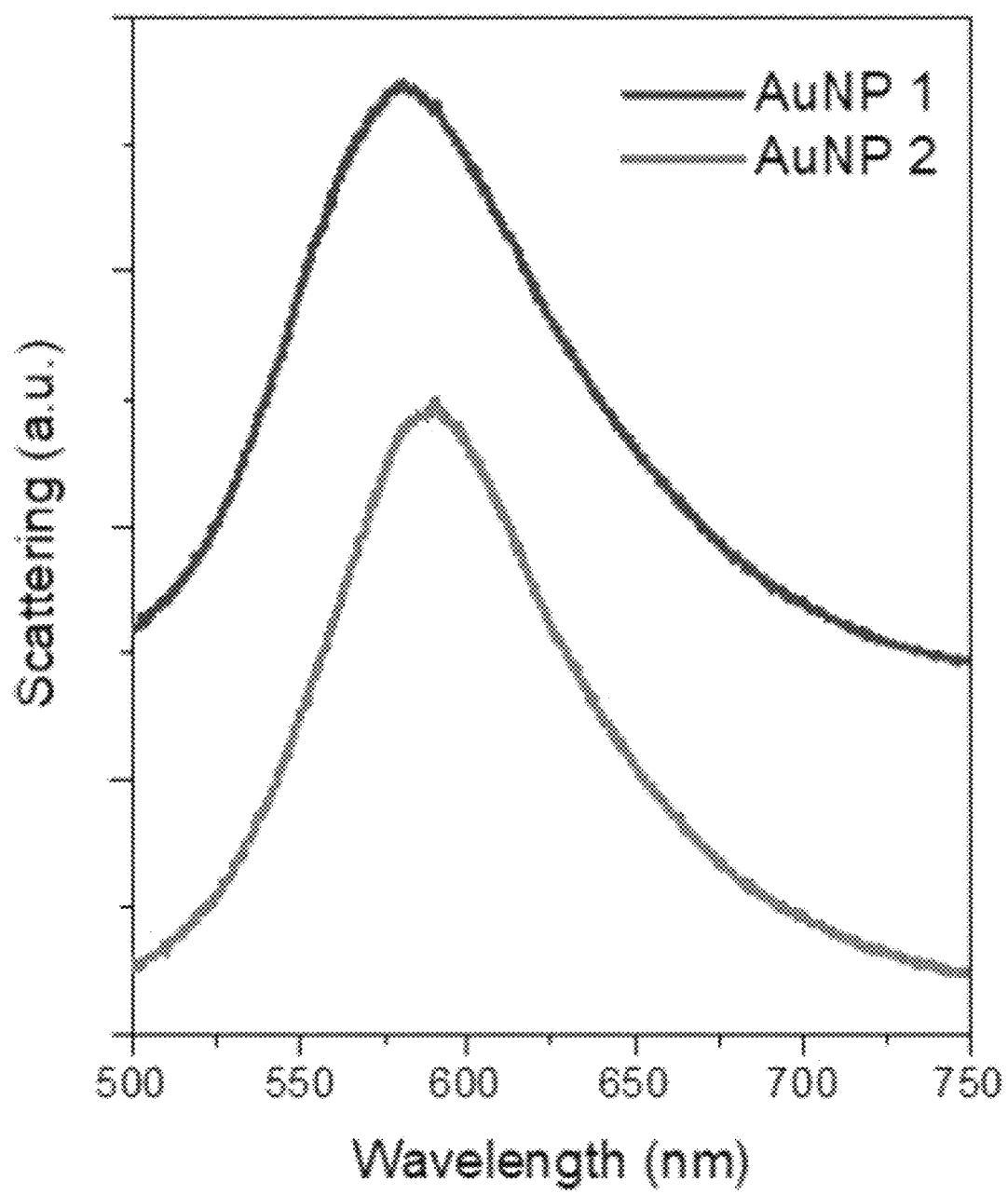
Figure 22E:
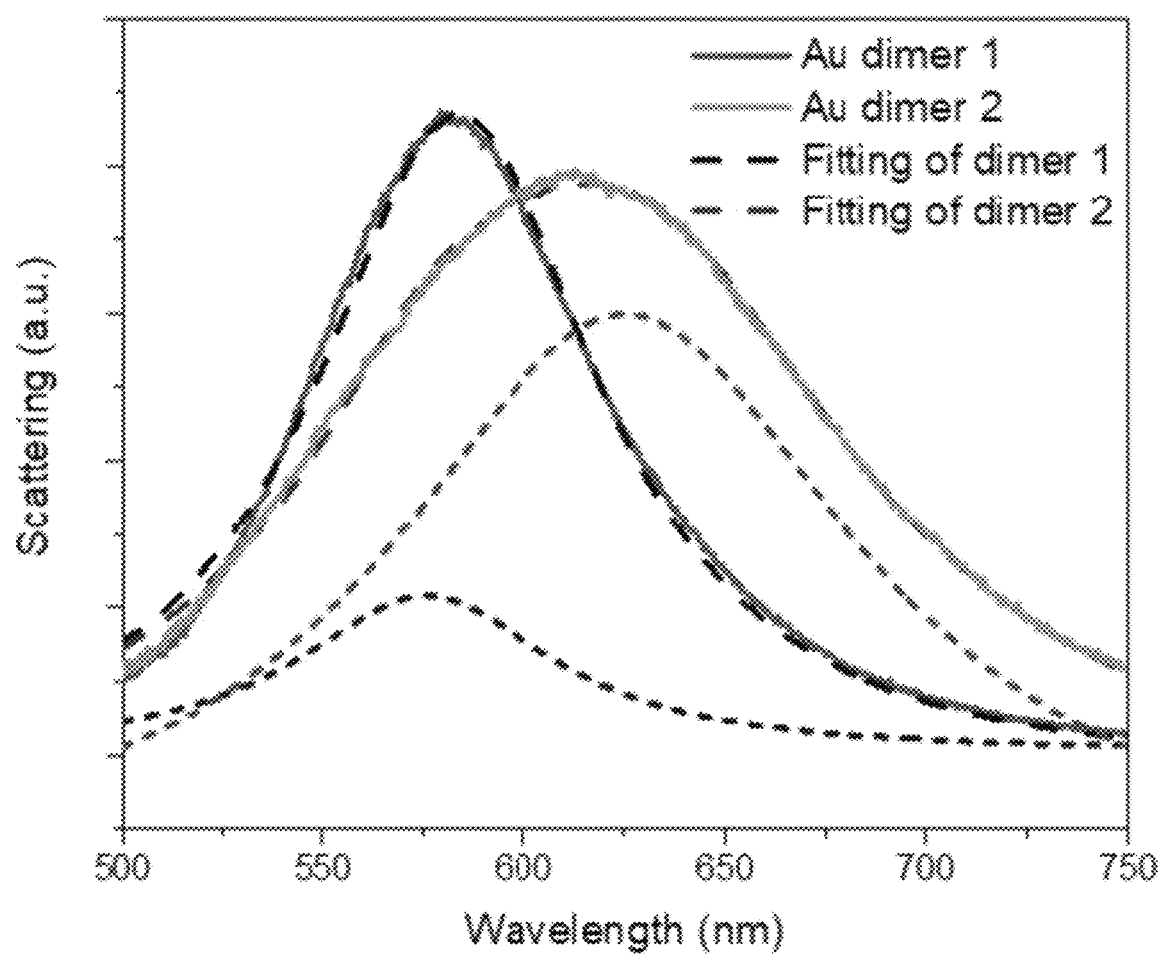

Supplementary Note 6. Reliable fabrication of Au dimers with ~15 nm gap. The diffraction limit in optical microscopic imaging has prevented the measurement of the distance between two close nanoparticles. In this experiment, two 100 nm gold nanoparticles (FIG. 22D) were assembled into a gold nanoparticle dimer. FIG. 22A and FIG. 22B show the dark-field optical images of the gold nanoparticle dimer composed of the same two 100 nm gold nanoparticles with different interparticle distances. It is challenging to distinguish the gap between these two gold nanoparticles based on the optical images. However, taking advantage of in situ optical spectroscopy, one can easily obtain the scattering spectra of the Au dimers. As shown in FIG. 22E, the scattering spectrum of the dimer in FIG. 22A shows a single peak at ~585 nm, which is consistent with that of single gold nanoparticles. The spectrum can also be well-fitted by a single-peak Lorentz function. The result reveals that there is no near-field coupling between two gold nanoparticles, which indicates two gold nanoparticles are separated by a large distance. In contrast, the dimer in FIG. 22B shows two split peaks at ~575 nm and ~635 nm (FIG. 22E), which demonstrate the near-field coupling behavior between these two gold nanoparticles. The peak splitting results are consistent with those shown in FIG. 5. The SEM image further confirmed a gold nanoparticle dimer with a gap of 15 nm (FIG. 22C). In summary, gold nanoparticle dimer with s desired gap can be reliably fabricated by analyzing the scattering spectra with the help of in situ optical spectroscopy. This strategy is generally applicable to all types of nanoparticles and substrates. However, the effects of orientations of anisotropic nanoparticles need be considered in establishing the relationship between the interparticle gaps and scattering spectra. The in situ optical spectroscopy that can monitor the scattering spectra of colloidal structures and estimate the interparticle gaps during the assembly process can significantly benefit the investigation of light-matter interactions and coupling of colloidal particles.

Figure 23A:
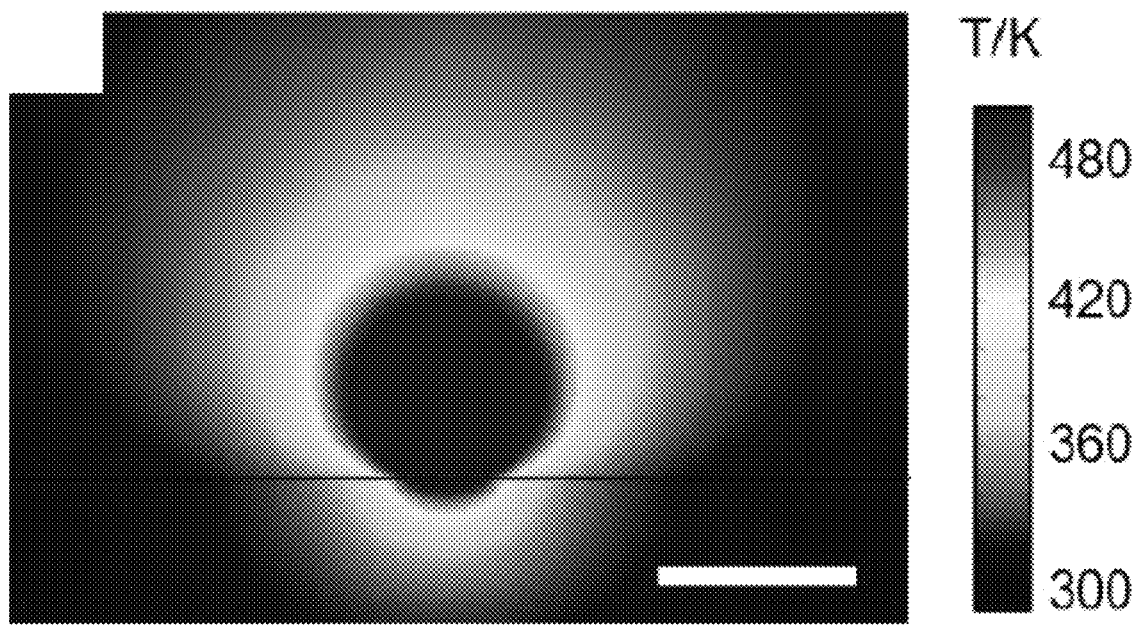
FIG. 23A-FIG. 23C. Optimal working wavelength for optothermally-gated photon nudging.
Figure 23B:
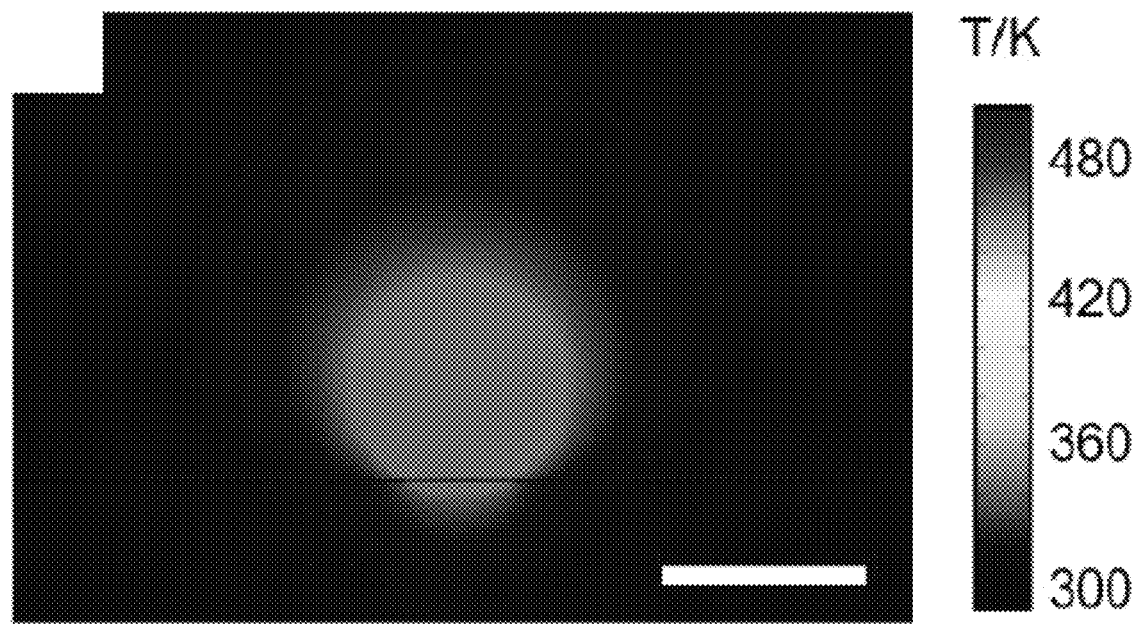
Figure 23C:
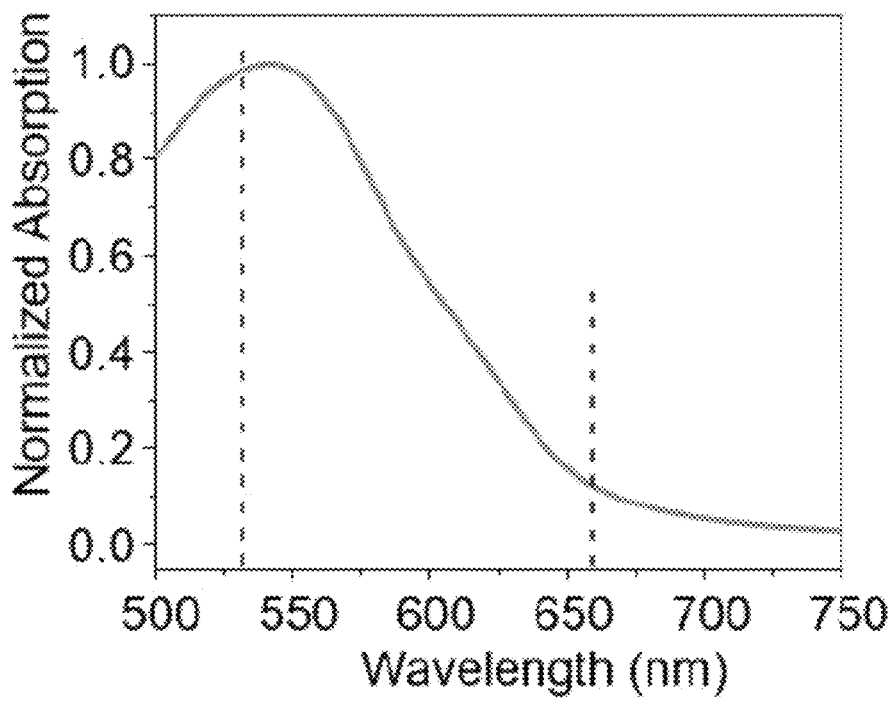

Supplementary Note 7. Optimal wavelength for optothermally-gated photon nudging. The working wavelengths for optothermally-gated photon nudging can be properly optimized to reduce the optical power needed to open the optothermal gate and improve the performance Take the manipulation of 80 nm gold nanoparticles as an example, in which both 532 nm and 660 nm lasers were tested for optothermally-gated photon nudging experiment. The results showed that the 80 nm gold nanoparticles can be readily manipulated by 532 nm laser with a low power of 1.0 mW. In contrast, 660 nm laser does not work even with a much higher power of 2.5 mW. This is because 80 nm gold nanoparticles have much stronger absorption at 532 nm than that at 660 nm (FIG. 23C). The simulated temperature also shows that the temperature surrounding the particle reaches more than 450 K for the 532 nm laser, opening the optothermal gate, while a 660 nm laser produces a temperature of only ~330 K (FIG. 23A and FIG. 23B). Therefore, the optimal working wavelengths for optothermally-gated photon nudging can be selected to match the absorption cross-section of the colloidal particles. In addition, it is also possible to introduce other optothermal materials (such as gold nanoislands) as external heating sources to induce the phase transition of CTAC, thus, the optimal wavelength, in this case, should be chosen based on the absorption of the external optothermal materials to open the optothermal gate.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:
1. A method comprising:
illuminating a first location of an optothermal system with electromagnetic radiation, wherein the optothermal system comprises:
a substrate having a first surface;
a surfactant layer disposed on the first surface of the substrate, wherein the surfactant layer is a solid thin film; and
a first particle disposed on the surfactant layer, such that the surfactant layer is between the first particle and the first surface of the substrate;
wherein the first particle is a first optothermal particle, the substrate is an optothermal substrate, or a combination thereof;
wherein:

when the first particle is the first optothermal particle, then the first optothermal particle is in thermal contact with the surfactant layer; and when the substrate is the optothermal substrate, then the optothermal substrate is in thermal contact with the surfactant layer;

wherein the first location of the optothermal system includes at least a portion of the first particle such that:

the first particle scatters at least a portion of the electromagnetic radiation, thereby producing a first radiation-pressure force on the first particle; and when the first particle is the first optothermal particle, the first optothermal particle converts at least a portion of the electromagnetic radiation into thermal energy;

wherein, when the substrate is the optothermal substrate, the optothermal substrate converts at least a portion of the electromagnetic radiation into thermal energy; and wherein the thermal energy converted by the first optothermal particle, the optothermal substrate, or a combination thereof is sufficient to generate a manipulation region at a location of the surfactant layer proximate to the first location of the optothermal system;

thereby:

generating the manipulation region at the location of the surfactant layer proximate to the first location of the optothermal system, wherein the manipulation region has a temperature sufficient to induce a first-order phase transition from a solid phase to a liquid or quasi-liquid phase in the portion of the surfactant layer within the manipulation region;

inducing the first-order phase transition in the portion of the surfactant layer within the manipulation region;

producing the first radiation-pressure force on the first particle, wherein the first radiation-pressure force is sufficient to translate the first particle from a first location within the manipulation region to a second location within the manipulation region; and translating the first particle from the first location within the manipulation region to the second location within the manipulation region.

2. The method of claim 1, wherein the substrate comprises glass, quartz, silicon dioxide, silicon nitride, a polymer, or a combination thereof.

3. The method of claim 1, wherein the substrate comprises the optothermal substrate and the optothermal substrate comprises a plasmonic substrate, a metal substrate, a dielectric substrate, or a combination thereof.

4. The method of claim 1, wherein the substrate comprises the optothermal substrate and the optothermal substrate comprises a plasmonic substrate and the electromagnetic radiation comprises a wavelength that overlaps with at least a portion of the plasmon resonance energy of the plasmonic substrate such that the manipulation region is generated by plasmon-enhanced photothermal effects.

5. The method of claim 1, wherein the first particle comprises a metal particle, a semiconductor particle, an inorganic particle, or a combination thereof.

6. The method of claim 1, wherein the first particle comprises a semiconductor particle, the semiconductor particle comprising a semiconductor selected from the group consisting of GeAs, GaAs, $TiO_2$, Si, and combinations thereof.

7. The method of claim 1, wherein the first particle comprises an inorganic particle comprising an inorganic perovskite.

8. The method of claim 1, wherein the first particle comprises an inorganic particle comprising barium titanate, titanium nitride, or a combination thereof.

9. The method of claim 1, wherein the first particle comprises the first optothermal particle and the first optothermal particle comprises a plasmonic particle and the electromagnetic radiation comprises a wavelength that overlaps with at least a portion of the plasmon resonance energy of the plasmonic particle such that the manipulation region is generated by plasmon-enhanced photothermal effects.

10. The method of claim 1, wherein the electromagnetic radiation has: a power density of from 0.1 mW/$\mu m^2$ to 15 mW/$\mu m^2$; a power of from 0.1 mW to 5 mW; or a combination thereof.

11. The method of claim 1, wherein the surfactant layer comprises cetrimonium bromide (CTAB), cetrimonium chloride (CTAC), sodium dodecyl sulfate (SDS), poly(methyl methacrylate) (PMMA), or a combination thereof.

12. The method of claim 1, wherein the surfactant layer has an average thickness of from 10 nm to 500 nm.

13. The method of claim 1, wherein the first particle is not damaged during the method.

14. The method of claim 1, further comprising:

illuminating a third location of the optothermal system with electromagnetic radiation, wherein the optothermal system further comprises:

a second particle disposed on the surfactant layer, such that the surfactant layer is between the second particle and the first surface of the substrate;

wherein the second particle is a second optothermal particle, the substrate is the optothermal substrate, or a combination thereof;

wherein:

when the second particle is the second optothermal particle, then the second optothermal particle is in thermal contact with the surfactant layer; and when the substrate is the optothermal substrate, the optothermal substrate is in thermal contact with the surfactant layer;

wherein the third location of the optothermal system includes at least a portion of the second particle such that:

the second particle scatters at least a portion of the electromagnetic radiation, thereby producing a second radiation-pressure force on the second particle; and when the second particle is the second optothermal particle, the second optothermal particle converts at least a portion of the electromagnetic radiation into thermal energy;

wherein, when the substrate is the optothermal substrate, the optothermal substrate converts at least a portion of the electromagnetic radiation into thermal energy;

wherein the thermal energy converted by the second optothermal particle, the optothermal substrate, or a combination thereof is sufficient to generate a second manipulation region at a location of the surfactant layer proximate to the third location of the optothermal system;

thereby:

generating the second manipulation region at the location of the surfactant layer proximate to the third location of the optothermal system, wherein the second manipulation region has a temperature sufficient to induce the first-order phase transition from the solid phase to the liquid or quasi-liquid phase in the portion of the surfactant layer within the second manipulation region;

inducing the first-order phase transition in the portion of the surfactant layer within the second manipulation region;

producing the second radiation-pressure force on the second particle, wherein the second radiation-pressure force is sufficient to translate the second particle from a first location within the second manipulation region to a second location within the second manipulation region; and translating the second particle from the first location within the second manipulation region to the second location within the second manipulation region.

15. The method of claim 1, further comprising:

illuminating a third location of the optothermal system with electromagnetic radiation;

wherein the third location of the optothermal system includes at least a portion of the first particle, such that:
the first particle scatters at least a portion of the electromagnetic radiation, thereby producing the first radiation-pressure force on the first particle;

wherein, when the first particle is the first optothermal particle, the first optothermal particle converts at least a portion of the electromagnetic radiation into thermal energy;

wherein, when the substrate is the optothermal substrate, the optothermal substrate converts at least a portion of the electromagnetic radiation into thermal energy; and wherein the thermal energy converted by the first optothermal particle, the optothermal substrate, or a combination thereof is sufficient to generate a third manipulation region at a location of the surfactant layer proximate to the third location of the optothermal system;

thereby:

generating the third manipulation region at the location of the surfactant layer proximate to the third location of the optothermal system, wherein the third manipulation region has a temperature sufficient to induce the first-order phase transition from the solid phase to the liquid or quasi-liquid phase in the portion of the surfactant layer within the third manipulation region;

inducing the first-order phase transition in the portion of the surfactant layer within the third manipulation region;

producing the first radiation-pressure force on the first particle, wherein the first radiation-pressure force is sufficient to translate the first particle from a first location within the third manipulation region to a second location within the third manipulation region; and translating the first particle from the first location within the third manipulation region to the second location within the third manipulation region.

16. The method of claim 1, further comprising removing the illumination such that the portion of the surfactant layer within the first manipulation region re-solidifies, thereby forming a patterned optothermal system, and optionally removing the surfactant layer from the patterned optothermal system.

\* \* \* \* \*